(12) United States Patent
Coleman

(10) Patent No.: US 9,804,607 B1
(45) Date of Patent: Oct. 31, 2017

(54) FLUID TRANSFER SYSTEMS, DEVICES, COMPONENTS, AND METHODS OF MANUFACTURE

(71) Applicant: Zane Coleman, Elmhurst, IL (US)

(72) Inventor: Zane Coleman, Elmhurst, IL (US)

( * ) Notice: Subject to any disclaimer, the term of this patent is extended or adjusted under 35 U.S.C. 154(b) by 1258 days.

(21) Appl. No.: 13/680,010

(22) Filed: Nov. 16, 2012

Related U.S. Application Data

(60) Provisional application No. 61/560,295, filed on Nov. 16, 2011.

(51) Int. Cl.
*G05D 7/00* (2006.01)
*B23P 11/00* (2006.01)

(52) U.S. Cl.
CPC .............. *G05D 7/00* (2013.01); *B23P 11/00* (2013.01)

(58) Field of Classification Search
CPC .... G05D 7/00; B23P 11/00; F28D 2011/0266; F28D 3/04; F28D 9/00; F28D 9/068; F28D 2001/0266; F28D 9/0068; F28F 3/02; F28F 3/025; F28F 3/046
USPC .................................................. 165/166, 174
See application file for complete search history.

(56) References Cited

U.S. PATENT DOCUMENTS

| | | | | | |
|---|---|---|---|---|---|
| 2,566,310 | A | * | 9/1951 | Burns | F25J 5/002 165/140 |
| 4,384,611 | A | * | 5/1983 | Fung | F28D 9/0025 165/166 |
| 4,473,066 | A | * | 9/1984 | Clark | F24J 2/045 126/621 |
| 2006/0137868 | A1 | * | 6/2006 | Kang | F28D 9/0018 165/166 |
| 2008/0283217 | A1 | * | 11/2008 | Gagnon | F24F 12/006 165/54 |
| 2009/0294110 | A1 | * | 12/2009 | Foust | F03G 7/05 165/152 |
| 2009/0314480 | A1 | * | 12/2009 | Grinbergs | F24F 3/1411 165/174 |
| 2010/0025026 | A1 | * | 2/2010 | Dietz | F28D 9/0068 165/166 |
| 2011/0180242 | A1 | * | 7/2011 | Urata | F28F 9/02 165/166 |

* cited by examiner

*Primary Examiner* — Tho V Duong
(74) *Attorney, Agent, or Firm* — Zane Coleman

(57) ABSTRACT

In one embodiment, a fluid transfer system comprises one or more fluid transfer components and one or more fluid input couplers or fluid output couplers. In one embodiment, the fluid transfer system delivers fluid to an active region, receives fluid from an active region, or passes a fluid through an active region using a fluid transfer component. In another embodiment, the fluid transfer component comprises film-based fluid channels converted from a first spatial arrangement geometry to a second spatial arrangement geometry different from the first spatial arrangement geometry. In another embodiment, the fluid transfer component comprises at least one of a fluid input coupler and fluid output coupler comprising a fluid channel geometry converter comprising re-arranged extended segments of a film comprising the active region fluid channels.

19 Claims, 6 Drawing Sheets

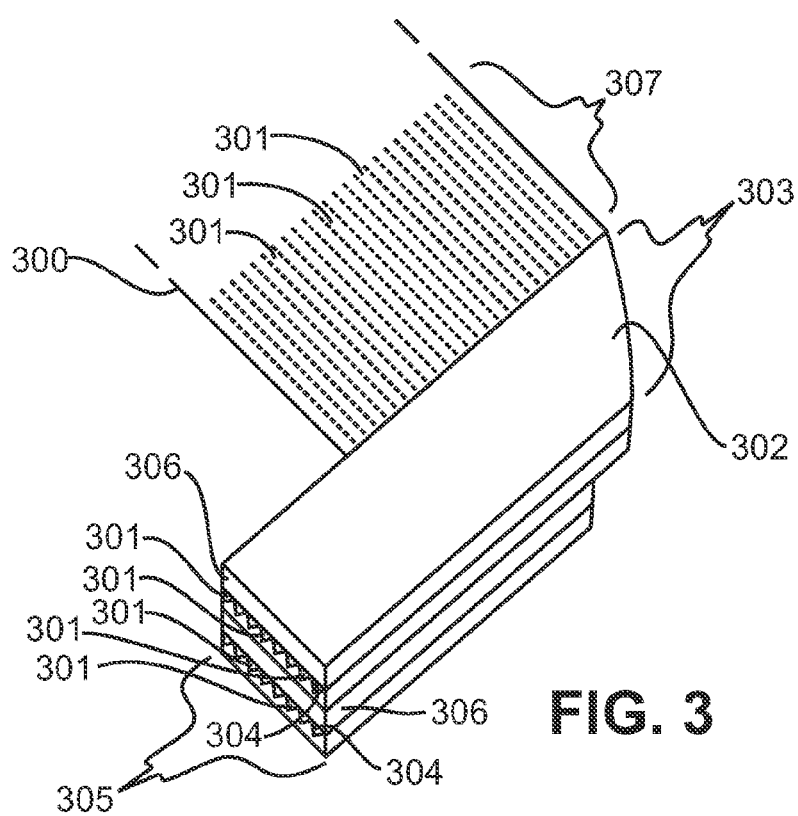
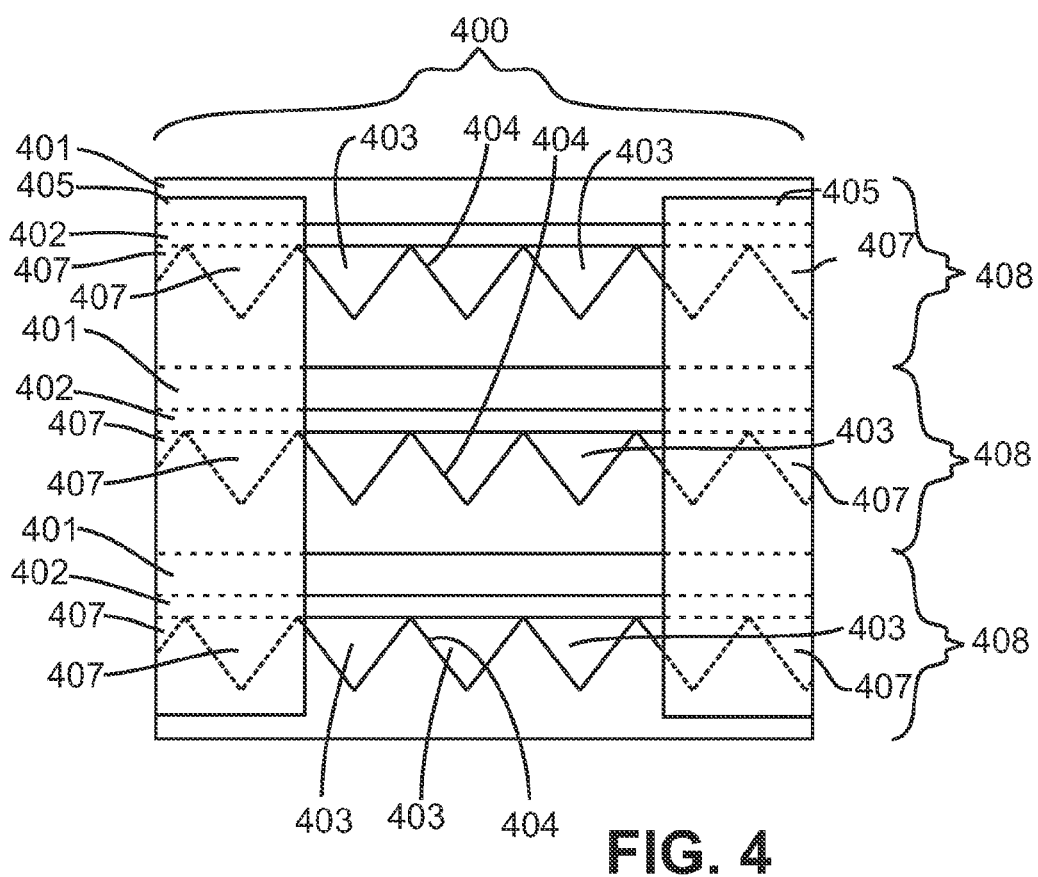

FLUID TRANSFER SYSTEMS, DEVICES, COMPONENTS, AND METHODS OF MANUFACTURE

CROSS-REFERENCE TO RELATED APPLICATIONS

This application claims the benefit of U.S. Provisional Application No. 61/560,295 entitled "Fluid transfer system, devices, components, and method of manufacture" filed Nov. 16, 2011, the entire contents are incorporated by reference herein.

BACKGROUND

Many materials that change their optical properties are typically electrically complex, expensive and have poor long term reliability. Fluid transfer systems are needed that are simple, do not leak or having complex or unreliable coupling to fluid transfer components, or have a high flow resistance.

BRIEF SUMMARY

This invention generally relates to systems, devices, components and methods of their manufacture for transferring fluid from a first location to a second location. The system may comprise a film with film supporting members, such as without limitation, standoffs, or channels. In another embodiment, the system comprises a plurality of hollow fibers or tubes through which fluid flows. The fluid flow may, without limitation, transfer thermal energy or optically modifying materials. Examples include, without limitation, solar heat transfer films or fibers, color changing films or fibers, light transmission changing films or fibers, and optical property changing films or fibers. In one embodiment, a fluid transfer system comprises one or more fluid transfer components and one or more fluid input couplers or fluid output couplers. In a further embodiment, the fluid transfer system comprises one or more transfer fluids. In another embodiment, the fluid transfer system comprises a flow source for moving the fluid in the system. In one embodiment, the fluid transfer system delivers fluid to an active region, receives fluid from an active region, or passes a fluid through an active region. In one embodiment, a first fluid in the active region (or in one or more channels within the active region) of the fluid transfer flows out of the active region and a second fluid different from the first fluid flows into the active region. In another embodiment, the fluid receives or delivers energy, such as thermal energy, in the active region and delivers or receives, respectively, the energy to a second component in the fluid transfer system, such as a heat exchanger. In one embodiment, the active region of the fluid transfer system changes from a first optical state to a second optical state due to fluid transition within one or more channels in a film. In another embodiment, the fluid transfer component comprises at least one liquid input coupler or liquid output coupler. In another embodiment, the liquid input coupler and/or the liquid output coupler comprises a fluid channel geometry converter. In one embodiment, the fluid transfer system comprises a film with one or more layers, wherein a fluid input coupler, an active region, and a fluid output coupler comprise regions of the film. In another embodiment, the fluid transfer component comprises film-based fluid channels converted from a first spatial arrangement geometry to a second spatial arrangement geometry different from the first spatial arrangement geometry. In another embodiment, the fluid transfer component comprises at least one of a fluid input coupler and fluid output coupler comprising a fluid channel geometry converter comprising re-arranged extended segments of a film comprising the active region fluid channels. As used herein a fluid transfer component may control and/or manipulate the flow or transfer of any type of fluid and may comprise channels, chambers and other fluidic component that behave as do most macroscopic systems, or the devices or components can be constructed in a way so that they are considered microfluidic devices.

BRIEF DESCRIPTION OF THE DRAWINGS

FIG. 3 is a perspective view of a portion of an embodiment of a fluid transfer component comprising a fluid channel geometry converter input coupler.

FIG. 4 is a side view of an input end region of an embodiment of a fluid channel geometry converter input coupler comprising a stacked layer of ends of segments extending from a film comprising a cover layer.

DETAILED DESCRIPTION OF THE INVENTION

Figure 1:
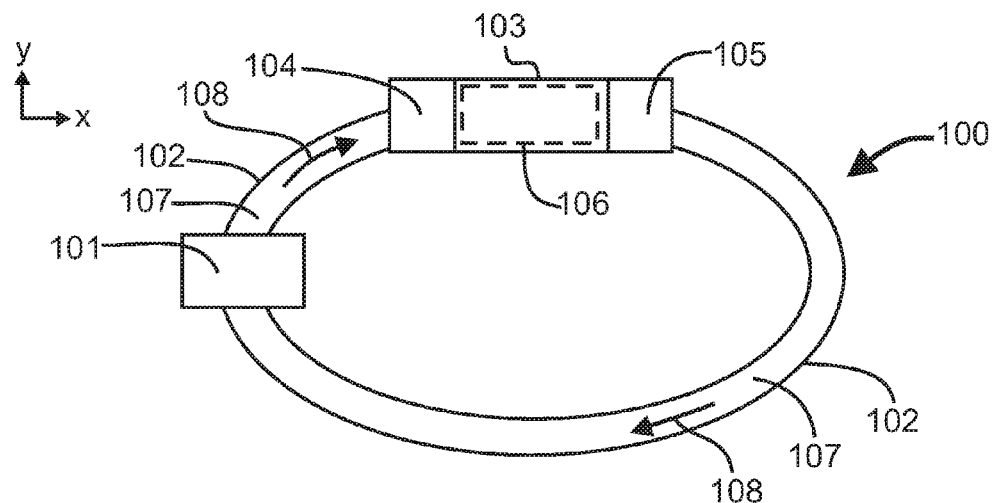
FIG. 1 is a top view of an embodiment of a fluid transfer system comprising a flow source operatively coupled by a fluid connector to a fluid transfer component.

The features and other details of the invention will now be more particularly described. It will be understood that particular embodiments described herein are shown by way of illustration and not as limitations of the invention. The principal features of this invention can be employed in various embodiments without departing from the scope of the invention. All parts and percentages are by weight unless otherwise specified.

Glossary

In describing one or more embodiments, the following terms are defined as set forth below:

"Channel" as used herein is to be interpreted in a broad sense. Thus, it is not intended to be restricted to elongated configurations where the transverse or longitudinal dimension greatly exceeds the diameter or cross-sectional dimension. Rather, such terms are meant to comprise cavities or tunnels of any desired shape or configuration through which fluids may be directed. Such a fluid cavity may, for example, comprise a flow-through cell where fluid is to be continually passed or, alternatively, a chamber for holding a specified, discrete amount of fluid for a specified amount of time. "Channels" may be filled or may contain internal structures comprising valves or equivalent components.

"Flow source" is an element that is capable of supplying energy for doing work that can move a fluid.

"Fluid" as used herein is to be understood, without any restriction thereto, to refer to any type of fluid that may be used, including but not limited to gases, liquids, gels, or plasmas; additionally, the fluid may be a pure materials or a mixture of fluids and molecules, particles, colloids or other types of material may be suspended or solvated within the fluid.

"Polymeric material" means a material that is formed by combining monomers to produce a natural or synthetic organic molecule(s) that contains one or more repeating units regularly or irregularly arranged in the organic molecule(s).

"Surface relief" means a non-planar surface that has defined features extending from (protruding) or receding from (recessed) from a surface in a predetermined, random, or a combination thereof, arrangement.

"Optically coupled" as used herein means connected, whether directly or indirectly, for purposes of transmitting a light beam. A first and a second element may be optically coupled if a beam may be provided from the first element to the second element, whether or not an intermediate component manipulates the beam between the first and second elements.

"Film" as used herein means a sheet of material with a thickness generally equal to or less than 5 millimeters. "Film" may include a generally flexible sheet of polymeric material, a sheet of rubber material, a sheet of inorganic material, a sheet of metal material, or a combination of one or more materials. A "Film" may comprise a plurality of sheets of materials. For example, a "Film" may be a film of silicone material, a fluoropolymer film, a thin sheet of flexible glass, a laminate of a thin glass sheet and a polymer film, a metal foil, a laminate of a fluoropolymer film and a metal foil, or a multi-layer thermoset polydimethylsiloxane film.

Fluid Transfer System

In one embodiment, a fluid transfer system comprises one or more fluid transfer components and one or more fluid input couplers or fluid output couplers. In a further embodiment, the fluid transfer system comprises one or more transfer fluids. In another embodiment, the fluid transfer system comprises a flow source for moving the fluid in the system. In one embodiment, the fluid transfer system delivers fluid to an active region, receives fluid from an active region, or passes a fluid through an active region. In one embodiment, a first fluid in the active region (or in one or more channels within the active region) of the fluid transfer flows out of the active region and a second fluid different from the first fluid flows into the active region. In another embodiment, the fluid receives or delivers energy, such as thermal energy, in the active region and delivers or receives, respectively, the energy to a second component in the fluid transfer system, such as a heat exchanger. In one embodiment, the active region of the fluid transfer system changes from a first optical state to a second optical state due to fluid transition within one or more channels in a film. In another embodiment, the fluid transfer component comprises at least one liquid input coupler or liquid output coupler. In another embodiment, the liquid input coupler and/or the liquid output coupler comprises a fluid channel geometry converter. In one embodiment, the fluid transfer system comprises a film with one or more layers, wherein a fluid input coupler, an active region, and a fluid output coupler comprise regions of the film. In another embodiment, the fluid transfer component comprises film-based fluid channels converted from a first spatial arrangement geometry to a second spatial arrangement geometry different from the first spatial arrangement geometry. In another embodiment, the fluid transfer component comprises at least one of a fluid input coupler and fluid output coupler comprising a fluid channel geometry converter comprising re-arranged extended segments of a film comprising the active region fluid channels. As used herein a fluid transfer component may control and/or manipulate the flow or transfer of any type of fluid and may comprise channels, chambers and other fluidic component that behave as do most macroscopic systems, or the devices or components can be constructed in a way so that they are considered microfluidic devices.

In another embodiment, a fluid channel geometry converter is defined by a plurality of channels physically separated, folded or bent, and stacked to form a fluid input end or output end comprising a plurality of layers comprising channels in a spatial arrangement geometry different from the spatial arrangement geometry of the channels in the active region of the fluid transfer component. In another embodiment, one or more inner surfaces of the channels in the fluid channel geometry converter are defined by a surface of a film comprising surface relief features. In another embodiment, the one or more inner surfaces of the channels in the fluid channel geometry converter comprise a material continuous along a fluid flow path from a first channel geometry to a second channel geometry different from the first. In one embodiment, a plurality of channels configured to receive fluid comprise one or more surfaces defined by a surface of a film continuous throughout the fluid channel geometry conversion.

One or more fluid transfer components may be at least one selected from the group: connected physically, connected mechanically, optically coupled, thermally coupled, electrically connected, connected by a hose, connected by a coupler, connected by manifold coupler, connected by a fluid channel geometry converter coupler, and in fluid communication with another fluid transfer component or system component. The plurality of fluid transfer components may be arranged in a matrix, tiled in one or more directions, or be operatively connected to each other in one or more pre-determined or user selectable configurations. In one embodiment, the fluid transferring components, their methods of manufacture and system configurations suitable or adaptable for use in part in embodiments include fluid collection and transport systems described in U.S. Pat. No. 6,290,685, the entire contents are incorporated by reference herein.

Fluid Transfer Component

In one embodiment, a fluid transfer component comprises at least one fluid flowing channel defined by a non-planar surface separated from a second, opposite surface wherein fluid flows through the channels from an input edge side of a fluid transfer component toward an output side of the fluid transfer component.

The fluid transfer component comprises one or more fluid channels formed along the component. The channels have a channel flow dimension (the dimension of the flow length of the fluid in a channel from the input side of the fluid transfer component to the output side of fluid transfer component) larger than the channel transverse flow dimension. The transverse flow dimension is the average dimension of the channel in a direction orthogonal to the direction of the fluid flow, such as the thickness direction of a film comprising channels or a direction orthogonal to the flow direction and the thickness direction of a film, for example. The active flow ratio for a channel is the ratio of the average channel flow dimension to an average channel transverse flow dimension in the active region of a fluid transfer component. The active flow ratio for a fluid transfer component is average of the active flow ratios of the channels. In one embodiment, the active flow ratio for a channel or fluid transfer component is greater than one or more selected from the group: 1, 2, 5, 10, 15, 20, 50, 100, 200, 500, 1,000, 5,000, 10,000 50,000, 75,000, 100,000, 200,000, 500,000 and 1,000,000. For example, in one embodiment, a fluid transfer system comprises a film-based fluid transfer component that comprises a plurality of channels formed by optically adhering a 1 meter by 1 meter prism film comprising a linear array of 50 micrometer pitch 90 degree apex angle linear prisms with a 25 micrometers prism height to a 25 micrometer adhesive film on a 100 micrometer PET carrier film such that the channels formed have a channel height of 20 micrometers after lamination (due to the adhesive filling in some of the channels). In this example, the flow dimension from one side of the film at the input to the opposite side for the output is 1 meter and the dimension orthogonal to the flow dimension and component is 20 micrometers, and the active flow ratio for the channels and the fluid transfer component is 50,000.

The fluid transfer component may be in the form of one or more selected from the group: film, collection of films, multilayer films, sheet, fiber, collection of fibers (including hollow or open cavity fibers), weave of fibers (including without restriction plain weave, satin weave, twill weave, leno weave, traditional Japanese weave, knitted fibers, stitched fibers, roving, non-woven fibers (including staple nonwovens, spunlaid nonwovens, airlaid paper, wet laid mat, flame attenuated mat, meltblown fibers), panel, window, tile, shingle, laminate, flooring laminate, wallpaper, covering, rug, blanket, sign (including various types such as, without limitation, window signs, road signs, vehicle signs, building signs, billboards) ornamental covering, writing medium, storage medium, furniture, door, desk, housing for an electronic device, display, curtain, carpet, tape (including but not limited to those described U.S. patent application publication no. 20030102076, the entire contents are incorporated by reference herein), medical blanket (including but not limited to those described in U.S. patent application publication no. 20110245077, the entire contents are incorporated by reference herein), vehicle component (such as without limitation, embedded into the outer armor in land craft, water craft or air craft such as a tank, jeep, all-terrain vehicle, plane, helicopter, boat, etc.), or a combination of one or more of the aforementioned forms.

The shape of the fluid transfer component or a region thereof may have a shape that is one or more selected from the group: planar, flat, bent, folded, rolled, curved, creased, in a sine-wave shape, concave, convex, and a shape conforming to a surface region or the entirety of one or more shapes resembling all or a portion of a three dimensional object or a geometric figure (including sphere, cone, pyramid, polyhedron, topological polyhedron, tapered polyhydron, and polytope).

The fluid transfer component comprises an active region operatively configured to provide at least one selected from the group: optical, thermal, physical, and fluid transfer properties to the fluid transfer system to the region.

Film Based Fluid Transfer System

In one embodiment, a fluid transfer system comprises a film-based fluid transfer component comprising at least one fluid flowing channel defined by a non-planar surface separated from a second, opposite surface wherein fluid flows through the channels from an input side of a fluid transfer component toward an output side of the fluid transfer component, at least one film coupler, at least one fluid, and a fluid flow source.

In one embodiment, the film-based fluid transfer component comprises a film with a surface relief profile physically coupled to a second surface wherein the two surfaces substantially form the top and bottom surfaces of channels that permit fluid to flow from the input edge of the component to the output edge of the component. The surface relief profile may be on an outer or inner surface of the film or component. In one embodiment, the film-based fluid transfer system comprises a plurality of films. In another embodiment, the channels are formed from two films laminated, co-extruded, coated, or otherwise physically coupled to each other. In another embodiment, the film-based fluid transfer component comprises a film comprising one or more hollow cavities through which fluid may flow. One or more of the films may comprise one or more input couplers or output couplers disposed along one or more edges operatively configured to input a fluid into the active region of the film-based fluid transfer component or output a fluid from the active region of the film-based fluid transfer component.

Fluid Transfer Film

In one embodiment, the fluid transfer component is a film and is referred to herein as a fluid transfer film. In one embodiment, the fluid transfer film comprises one or more channels defined by a non-planar surface separated from a second surface wherein fluid flows through the one or more channels from an input side of a fluid transfer film toward an output side of the fluid transfer film. Films may be substrates or carriers further comprising a coating (such as an ultraviolet cured embossed microstructure or a thermally embossed microstructure). In one embodiment, the fluid transfer film has a thickness less than one selected from the group of 10, 20, 30, 40, 50, 75, 100, 150, 200, 300, 400, 500, 750, 1,000, and 5,000 micrometers. In one embodiment, the film is reinforced to provide increased strength. In one embodiment, the film comprises one or more selected from the group: one or more fibers, filaments, chain-like links, mesh, weaving of material, roving, particles, multiple layers, a metal layer, a layer of film with a high modulus of elasticity. In one embodiment, the film is a metal sheet comprising surface relief features. In another embodiment, the film is polymeric film comprising carbon fibers or particles.

Multilayer Fluid Transfer Film

In one embodiment, the fluid transfer film is a multilayer film comprising a base layer and a second layer or coating comprising a surface relief profile. In another embodiment, the fluid transfer film comprises two film layers on opposite sides of the channel wherein at least one of the inner surfaces of the film layers or a layer or material between the film layers comprises a surface defining one or more fluid channels. In one embodiment, a fluid transfer film comprises a foil or metal layer opposite the light receiving side of the film.

In another embodiment, the multilayer film comprises a plurality of layers or regions comprising a plurality of channels positioned in different planes in the transverse flow direction. For example, in one embodiment three microstructured films with a substantially planar bottom surface are laminated to each other and a top cover layer using a pressure sensitive adhesive to form 3 layers of channels. The channels in each layer may be oriented in the same direction, orthogonal directions, at an angle to each other, or a combination thereof.

This type of construction multiplies the ability of the component to transport fluid because each layer significantly increases flow capacity. The layers may comprise different channel configurations and/or number of channels, depending on a particular application. Furthermore, this type of stacked construction can be particularly suitable for applications that are restricted in width and therefore require a relatively narrow fluid transfer device from which a certain fluid transfer capacity is desired. Thus, a narrow component can be made having increased flow capacity.

In one embodiment, each layer may have different optical and/or thermal properties. For example, in one embodiment, a multi-color sign comprising a fluid transfer film comprises a composite comprising three fluid transfer films operatively configured to receive a first fluid with a red dye concentration, a second fluid with a green concentration, and a third fluid with a blue concentration. In this example, the color of the active region of the fluid transfer film composite corresponding to the overlapping active regions of the individual films can be changed from transparent to red, to blue, to green, or a combination of colors (such as purple) defined by the gamut enclosed by the three primary colors. In another embodiment, a first layer in a fluid transfer film composite comprises first fluid channels is operatively configured to receive a thermal transfer liquid with a specific heat higher than 4 at 25 degrees Celsius and a second layer in a fluid transfer film comprises second fluid channels operatively configured to receive a black or light absorbing dyed or pigmented fluid or a transparent fluid.

Hollow Component Based Fluid Transfer System

In one embodiment, a fluid transfer system comprises a hollow component based fluid transfer component comprising at least one fluid flowing channel defined at least in part by one or more inner or outer surfaces of the hollow component wherein fluid flows through the channels from an input side of a fluid transfer component toward an output side of the fluid transfer component, at least one coupler, at least one fluid, and a fluid flow source. The hollow component based fluid transfer component may comprise an arrangement of the hollow components that may be collectively arranged to each other, arranged on a substrate or carrier, formed during the formation of transfer component, applied to the transfer component or a substrate or carrier, or otherwise formed or arranged to provide a plurality of channels within the fluid transfer component operatively configured to transfer fluid from the input side to the output side of the fluid transfer component.

Hollow Component

In one embodiment, the hollow component based fluid transfer component comprises one or more selected from the group of capillary elements, hollow fibers, hollow tubes, hollow channels, a hollow channel formed with a cross-sectional shape in at least one region selected from the group: circle, ellipse, rectangle, square, triangle, polygon, irregular shape, amoeba-like shape, random shape, and a combination of one or more of the aforementioned shapes. For example, in one embodiment, a plain weave of hollow fibers is cut and extrusion coated on the top and bottom with an adhesive and carrier film to form a carrier film-adhesive-weave-adhesive-carrier film composite using an adhesive such that fluid may flow through the hollow fibers from one weft end to the opposite weft end and/or one warp end to the opposite warp end.

In one embodiment, the hollow component based fluid transfer component comprises one or more surface relief profiles on one or more internal or external surfaces. For example, in one embodiment, the fiber is a shaped fiber or profile fiber with a cross-sectional macro-shape in substantially concentric circular form and with an outer surface micro-shape with protrusions with triangular cross-sectional shapes along the outer circumference of the fiber. In this embodiment, for example, the protrusions may help maintain the separation between the fibers while reducing the overall density of the component.

In another embodiment, the fiber is a shaped fiber or profile fiber with a cross-sectional macro-shape in substantially concentric circular form and with an inner surface micro-shape with protrusions with triangular cross-sectional shapes along the outer circumference of the fiber. In this embodiment, for example, the inner shapes may help wick the fluid to improve the flow of the fluid.

In one embodiment, the outer surfaces of the shaped or profile fiber create small channels when the fibers are coated, laminated, co-extruded, or otherwise operatively coupled to a substrate or other material such that the interfacial tension between the outer surface profile and the adjacent materials prevents the material from wicking into the gaps of the outer surface profile. In this embodiment, for example, the gaps in the profile can be very small and made at low cost since the fiber profiles can be created from stretching the fiber and shrinking the profile as opposed to mechanical embossing. Furthermore, since these channels can be formed surrounding a fiber (hollow or solid), the fill factor of active channels can be very high in one or more directions.

In one embodiment, the hollow fiber comprises surface relief features on the outer surface of the fiber, on the inner surface of the fiber, or on both the outer and inner surface of the fiber. In another embodiment, the fluid flows by capillary action within the fiber and the inner surface relief features of the hollow fiber have an average dimension transverse to the radial direction less than 100 micrometers.

In one embodiment, the hollow (or solid) fiber comprises a metal or metal alloy fiber or wire such as a drawn hollow aluminum wire, a drawn hollow copper wire, a drawn hollow steel wire. In another embodiment, the hollow (or solid) fiber comprises at least one of an organic material, inorganic material, polymer, rubber (such as silicone), polyurethane, thermoplastic polymer, thermoset polymer, transparent polymer, translucent polymer, white polymer, and colored polymer.

Fluid Transfer System Type

The fluid transfer system may be an open system or closed loop system. For example, in one embodiment, wherein two fluids are mixed or variable amounts of an additive such as a dye are added to a fluid, it may be desirable to remove from a reservoir the mixed fluid that has passed out of the active region of the fluid transfer component. In another embodiment, a closed loop fluid transfer system is used for a solar thermal transfer fluid wherein the fluid absorbs (directly or indirectly) the heat energy from solar radiation, the system transfers the fluid to a heat exchanger in a building to provide heating, and returns the fluid to absorb the heat energy. In one embodiment, the fluid transfer system is an open system that transfers a fluid to the environment or receives a fluid from the environment.

The fluid transfer system may have one or more fluid transfer components with one or more operating states in one or more active regions. For example, the system may be bistable (switching from an optically clear to a black state and back to a clear state, etc., for example), tri-stable, multi-stable, continuously changing, single state (such as with a continuous thermal transfer system) or a combination of states in one or more operating modes. In another embodiment, the fluid transfer component has one or more active regions with different active states at the same or different times. For example, in one embodiment, a sign comprising a white backlight may contain bright letters in a first active region of the fluid transfer component comprising a transparent fluid of air in the first active region surrounded by a black active region comprising a second liquid in with carbon black micro-pigments creating white letters on a black background. In this example, the fluid flow could be operatively switched such that air is flowed into the area surrounding the letters and the black fluid could be directed to flow through the letters to create black letters on a white background.

The fluid transfer system may provide other fluid management or operational configuration such as switching, responding to internal or external variables or conditions, fluid control, fluid mixing, mixing a component within the fluid.

Material of the Fluid Transfer Component

In one embodiment, film-based fluid transfer components comprise surface relief features and channels capable of spontaneously and uniformly transporting liquids along the film channels. Two general factors that influence the ability of the channels to spontaneously transport liquids (e.g., water, glycol, liquid silicone, salt solutions, beverages, condensate, cleaning solutions, etc.) are (i) the geometry or topography of the surface (capillarity, size and shape of the channels) and (ii) the nature of the film surface (e.g., surface energy). To achieve the desired amount of fluid transfer capability the designer may adjust the structure or topography of the channels and/or adjust the surface energy of one or more channel surfaces or a film surface from which they may be formed. In one embodiment, a closed channel wick made from a film-based fluid transfer component is sufficiently hydrophilic to allow the desired liquid to wet the surface. Generally, to facilitate spontaneous wicking in open channels, the liquid must wet the surface of the film, and the contact angle be equal or less than 90 degrees minus one-half the notch angle. The channels or surface relief features of the fluid transfer component can be of any geometry that provides desired fluid or liquid transport, and preferably one that is readily replicated.

The fluid transfer component can be formed from any polymeric materials suitable for casting or embossing including, for example, polyolefins, polyesters, polyamides, poly(vinyl chloride), polyether esters, polyimides, polyesteramide, polyacrylates, polyvinylacetate, hydrolyzed derivatives of polyvinylacetate, etc. Polyolefins may be used, particularly polyethylene or polypropylene, blends and/or copolymers thereof, and copolymers of propylene and/or ethylene with minor proportions of other monomers, such as vinyl acetate or acrylates such as methyl and butylacrylate. In one embodiment, polyolefins are preferred because of their excellent physical properties, ease of processing, and typically lower cost than other thermoplastic materials having similar characteristics. Polyolefins readily replicate the surface of a casting or embossing roll. They are tough, durable and hold their shape well, thus making such films easy to handle after the casting or embossing process. In another embodiment, hydrophilic polyurethanes are used for their physical properties and inherently high surface energy.

Alternatively, fluid transfer components can be cast from thermosets (curable resin materials) such as polyurethanes, acrylates, epoxies and silicones, and cured by exposure radiation (e.g., thermal, UV or E-beam radiation, etc.) or moisture. Suitable fluid transfer components also can be manufactured using pressure sensitive adhesive materials. In some cases the channels may be formed using inorganic materials (e.g., glass, ceramics, or metals). Preferably, the fluid transfer component substantially retains its geometry and surface characteristics upon exposure to liquids. Structured layers and surface relief profiles can be cast from curable resin materials such as acrylates or epoxies and cured through free radical pathways promoted chemically, by exposure to heat, UV, or electron beam radiation. Examples of suitable materials for substrates include, but are not limited to poly(methylmethacrylate) polycarbonates, polyesters, and polyimides, fluoropolymers, polyimides, and multilayer films comprising one or more layers of polymers, foils or materials (such as fiber weaves). Examples of suitable photocurable resin compositions include, but are not limited to alkyl acrylates and methacrylates (e.g., polymethyl methacrylate). The composition may also include a photoinitiator. Examples of suitable photoinitiators include benzoin ethers such as benzoin methyl ether and benzoin isopropyl ether; substituted acetophenones such as 2,2-diethyoxacetophenone, 2,2-dimethoxy-2-phenyl-1-phenylacetophenone, and dimethoxyhydroxyacetophenone; substituted alpha-ketols such as 2-methyl-2-hydroxy propiophenone; aromatic sulfonyl chlorides such as 2-naphthalene sulfonyl chloride; and photoactive oximes such as 1-phenyl-1,2-propanedione-2-(O-ethoxycarbonyl) oxime.

Fluid transfer components can comprise one or more materials selected from the group: glass (including ultrathin glass, metals (including foils and sheets), alloys, polymers, copolymers, thermoplastic polymers, thermoset polymers, curable polymers, rubbers (including silicone), polyurethane. In one embodiment, the active region of the fluid transfer component comprises a glass layer and a polymer layer. As used here, thermoplastic, as differentiated from thermoset, refers to a polymer which softens and melts when exposed to heat and re-solidifies when cooled and can be melted and solidified through many cycles. A thermoset polymer, on the other hand, irreversibly solidifies when heated and cooled. A cured polymer system, in which polymer chains are interconnected or crosslinked, can be formed at room temperature through use of chemical agents or ionizing irradiation.

Polymers useful in forming one or more selected from the group: substrate, carrier, layer, structured surface or layer, and surface relief profile of fluid transfer components in embodiments include but are not limited to polyamides, polyimides, high heat resistant polyimide, thermoplastic polyimide, polystyrene, acrylonitrile butadiene styrene (ABS), polymethyl methacrylate, polycarbonate, polyvinyl chloride, polyvinylidene chloride, polyvinyl acetate, polyethylene-vinyl acetate copolymers, polyvinyl alcohol, polyethylene-polyvinyl alcohol copolymers, fluoro resins, silicon resins, natural rubber, polyisoprene rubber, polybutadiene rubber, styrene-butadiene copolymers, butyl rubber, halogenated butyl rubber, chloroprene rubber, acryl rubber, polybutene, ethylene propylene diene monomer (M-class) rubber (EPDM), cross-linked EPDM, acrylonitrile-butadiene copolymers, fluoro rubber, silicone rubber, silicone polymers, fluoropolymers having a low index of refraction, for example, silicone polymers such as polydimethylsiloxane polymer, polymethylphenylsiloxane polymer, fluorosilicone polymers, fluoropolymers such as polytetrafluoroethylene (PTFE), ethylene tetrafluoride-propylene hexafluoride copolymers (FEP), ethylene tetrafluoride-perfluoroalkoxyethylene copolymers (PFE), polychlorotrifluoroethylene (PCTFE), ethylene tetrafluorideethylene copolymers (ETFE), polyvinylidene fluoride, polyvinyl fluoride, vinylidene fluoride-trifluorinated ethylene chloride copolymers, vinylidene fluoride-propylene hexafluoride copolymers, vinylidene fluoridepropylene hexafluoride-ethylene tetrafluoride terpolymers, ethylene tetrafluoride-propylene rubber, fluorinated thermoplastic elastomers, polyolefins such as polyethylene, polypropylene, polypropylene copolymers, polyethylene copolymers, CFC (chlorofluorocarbon), ECTFE (polyethylenechlorotrifluoroethylene), ETFE (ethylene trifluoroethylene), FEVE (Fluoroethylene-Alkyl Vinyl Ether), FPM/FKM (Fluorocarbon [Chlorotrifluoroethylenevinylidene fluoride]), FFPM/FFKM (Perfluorinated Elastomer [Perfluoroelastomer]), HFC (hydrofluorocarbon), HCFC hydrochlorofluorocarbon, HFP (hexafluoropropylene), Nafion, PBOS (perfluorobutanesulfonyl fluoride), PCTFE (Kel-F, CTFE) (polychlorotrifluoroethylene), Perfluoropolyoxetane, fluoroelastomers, PFA (perfluoroalkoxy polymer), PFOA (perfluorooctanoic acid), PFOS (perfluorooctane sulfonate), PFPE (Perfluoropolyether), PMTFPS (polymethyltrifluoropropylsiloxane), POSS (polyhedral oligomeric silsesquioxane), PPVE (perfluoropropyl vinyl ether), PTFE (polytetrafluoroethylene), (PVDF) polyvinylidene diflouride, PVF (polyvinylfluoride), TEOS (tetraethoxysilane), TFE(tetrafluoroethylene), acetates, cellulose ethers, polyvinyl alcohols, polysaccharides, polyesters, polyamides, poly(vinyl chloride), polyurethanes, polyureas, polycarbonates, silicone (meth)acrylate copolymer, EVA (ethylene vinyl acetate), PET (polyethylene terephthalate), polystyrene, fluoropolymers such as those discussed in U.S. Pat. No. 6,507,688, the entire contents are incorporated by reference herein, and polyimide films or other layers such as disclosed in U.S. Pat. No. 7,243,703, the entire contents are is incorporated by reference herein.

Component Material Additives

The component may also comprise additives that impart various properties into the polymeric structured layer. For example, plasticizers can be added to decrease elastic modulus to improve flexibility. The additives may also include surface energy modifiers (such as surfactants and hydrophilic polymers), plasticizers, antioxidants, pigments, release agents, antistatic agents, monohydroxy and polyhydroxy compounds, thixotropic agents, toughening agents, pigments, fillers, abrasive granules, stabilizers, light stabilizers, antioxidants, flow agents, bodying agents, flatting agents, colorants, binders, blowing agents, fungicides, bactericides, surfactants, glass and ceramic beads, and reinforcing materials such as woven and non-woven webs of organic and inorganic fibers. For example in one embodiment, a based fluid transfer component is a polymer film including carbon particles or carbon fibers to improve thermal conductivity and/or increase the melt temperature.

The component may further comprise additives known in the polymer processing and polymer film industry to improve UV resistance, weathering resistance, ozone resistance, chemical resistance, tear resistance, optical properties, thermal properties, physical properties, mechanical properties, or processing properties. In one embodiment, the component material comprises a chemical or additive to prevent algae growth or the growth of other biofouling organisms. For example, in one embodiment, the component material comprises copper sulfate.

Properties of the Fluid Transfer Component

The fluid transfer component may comprise physical, thermal, mechanical, optical and other properties sufficient to operatively provide fluid transfer, reliability, usability, ease of manufacturing, and other qualities needed depending on the application. For example, the flexibility of the fluid transfer component may be sufficiently high to enable the fluid transfer component to be used as a cover to lay across an article or as a drape to lay across a patient. In one embodiment the Young's Modulus of the fluid transfer component is less than one selected from the group: 20, 15, 10, 5, 4, and 3 Gigapascals. In one embodiment, the fluid transfer component has a change in yellowness index ($\Delta YI$) less than one selected from the group of 7, 5, 4, 3, 2, and 1 when exposed to 1000 hours of weathering time by Xenon 1200 (DIN53387 test). In one embodiment, the fluid transfer component does not significantly degrade when exposed to 5,000 hours of exposure to solar radiation.

Physical Properties of the Fluid Transfer Component

In one embodiment, the fluid transfer component comprises a dimension in at least first direction larger than one or more selected from the group of 5 mm, 1 cm, 10 cm, 20 cm, 50 cm, 75 cm, 1 meter, 1.5 meters, 2 meters, and 3 meters.

In one embodiment, the fluid transfer component is transferred from a substantially planar film form or sheet form into a non-planar shape by at least one selected from the group: thermoforming, vacuum forming, insert molding, in-mold decoration, heat pressing, curing (photo or thermal) and heat and/or pressure lamination.

Shape of Fluid Transfer Component

In one embodiment, the fluid transfer component is in the form of a film, sheet, or roll and cut in the shape of a square, rectangle, ellipse, circle, polygon, arcuate shape, or a combination thereof. In another embodiment, the fluid transfer component is in the shape of a wave-like film (where the film has a sinusoidal curve, for example), corrugated, sawtooth-like, lenticular film, flat film, cylinder, rectilinear, polygon, sphere, ellipsoid, or a combination of one or more of the aforementioned shapes. In one embodiment, the fluid transfer component substantially conforms to the surface upon which it positioned, such as for example, a patient when it is a drape, roofing shingles when positioned on a roof, a vehicle when positioned on a vehicle, or an article of clothing when positioned on the article. In another embodiment, the shape of the fluid transfer component is variable in a first state and substantially fixed in a second state. In one embodiment, the shape of the fluid transfer component is fixed upon exposure to energy, temperature, or radiation (such as ultraviolet light exposure). The shape of the fluid transfer component may be fixed onto an object by UV exposure, thermal exposure radiation exposure, thermosetting, cross-linking, methods of polymerization, or using an adhesive or epoxy such as a pressure sensitive adhesive. For example, in one embodiment, the fluid transfer component comprises a thermosetting material that sets when exposed to a temperature above 40 degrees Celsius. In this example, the fluid transfer component is a film that sets in the shape conforming to the surface structure of a roof upon which it is placed when the film is exposed to high temperatures in a solar thermal transfer application. In another example, the fluid transfer component is applied to a surface of an article of clothing or a vehicle, conforms to the shape the surface to which it is applied, and is locked into the shape by UV exposure, heat, or other methods of polymerizing, thermosetting, or cross-linking.

Thickness

In one embodiment, the thickness of the fluid transfer component, the average thickness of the fluid transfer component, the average thickness of the fluid transfer component substrate, the average thickness of the fluid transfer component superstrate, or the average thickness of the active region of the fluid transfer component is less than one selected from the group 5, 4, 3, 2, 1, 0.5, 0.4, 0.3, 0.2, 0.1, 0.9, 0.08, 0.07, 0.06, 0.05, 0.04, 0.03, 0.02, 0.01 and 0.09 millimeters. For example, in one embodiment, the substrate of a film-based fluid transfer component is less than 0.1 millimeters such that when the film is segmented, folded, and stacked, the area of the fluid input end defined by the ends of the stacked segments forming a fluid channel geometry converter occupied by the substrate is minimized. In one embodiment, the fluid transfer component comprises a thermal insulation layer in the active region that does not extend to the fluid input end formed by a fluid channel geometry converter. In another embodiment, the average thickness of the fluid transfer component in the active region is greater than 0.5 millimeters and the average thickness of each segment of a film comprising one or more surfaces of the channels collectively forming a fluid input end when stacked in the fluid channel geometry converter is less than 0.5 millimeters. In another embodiment, the average thickness of the fluid transfer component in the active region is greater than 1 millimeters and the average thickness of each segment of a film comprising one or more surfaces of the channels collectively forming a fluid input end when stacked in the fluid channel geometry converter is less than 1 millimeters. In another embodiment, the average thickness of the fluid transfer component in the active region is greater than 2 millimeters and the average thickness of each segment of a film comprising one or more surfaces of the channels collectively forming a fluid input end when stacked in the fluid channel geometry converter is less than 2 millimeters. In another embodiment, the average thickness of the fluid transfer component in the active region is greater than 0.2 millimeters and the average thickness of each segment of a film comprising one or more surfaces of the channels collectively forming a fluid input end when stacked in the fluid channel geometry converter is less than 0.2 millimeters.

Fluid Channels

In one embodiment, the fluid transfer component comprise one or more fluid channels comprising cavities or tunnels of any desired shape or configuration through which fluids may be directed. In one embodiment, the fluid transfer element comprises channels with parallel linear topographies. In one embodiment, the channels are defined, at least in part, by a first surface relief profile. In another embodiment, the channels are defined by objects disposed between two or more surfaces (that may be planar or non-planar) such that the objects define and separate the surfaces. In another embodiment, the channels are defined by a hollow or cavity comprising component such that when operatively coupled with a surface channels are formed that can operatively flow fluid from an input side to an output side of the fluid transfer component. In a further embodiment, the fluid transfer component is formed by one or more methods selected from the group: extrusion, embossing, coating, and injection molding such that internal channels are formed or cavities are formed external to the component that can be operatively coupled to a surface to form channels.

In one embodiment, the fluid channels have an average flow dimension less than one selected from the group of 10, 20, 30, 40, 50, 75, 100, 150, 200, 300, 400, 500, 750, 1,000, and 5,000 micrometers. In one embodiment, sidewalls of a channel assist in maintaining separation between two layers of material such as a top and bottom substrate film. In another embodiment, the channels direct flow in predetermined direction without substantial cross-contamination or interference that could increase flow resistance, inhibit analysis when the fluid transfer component is used for chromatography or assay analysis for example, or cause non-uniform fluid thickness in the active region that could reduce thermal or optical performance, for example.

As used here, channel aspect ratio means the ratio of a channel's length to its hydraulic radius, and hydraulic radius is the wettable cross-sectional area of a channel divided by its wettable inner surface perimeter (the distance around the portion of the inner surface of the channel in a cross-section that is wet). In one embodiment, a structured surface that is a microstructured surface defines discrete flow channels that have a minimum aspect ratio (length/hydraulic radius) of 10:1, in some embodiments exceeding approximately 100:1, and in other embodiments at least about 1000:1. The aspect ratio could be indefinitely high but generally would be less than about 10,000,000:1. In one embodiment, the hydraulic radius of a channel is no greater than about 300 micrometers. In many embodiments, it can be less than 100 micrometers, and may be less than 10 micrometers. A smaller hydraulic radius may be used in some applications and the hydraulic radius could be less than one micrometer in size. In some embodiments, the hydraulic radius is greater than about 1 micrometer.

In one embodiment, the fluid channels are separated by non-planar surfaces or walls. For example, in one embodiment, the cross-section of a fluid transfer component comprises a fluted corrugated film defining fluid channels due to the wave-like film.

Inner Surfaces of the Channels

In one embodiment, the channels are defined by inner surfaces of one or more materials or layers of a fluid transfer component. In another embodiment, one or more inner surfaces of the channels comprise a surface relief profile that may be constant, regular, or varying in one or more directions such as the fluid flow direction or a direction transverse to the fluid flow. The inner surfaces of the channels may comprise coatings and/or surface relief features to improve the fluid transfer component performance such as fluid transfer efficiency.

Surface Relief Profile

In one embodiment, the fluid transfer component comprises one or more surface relief profiles selected from the group: prismatic, linear, diffractive, semicircular cross-sections, polygonal cross sections, arrays of features, arrays of groups of features. Examples of features include but are not limited to those discussed in U.S. Pat. No. 6,431,695, the entire contents of which are incorporated herein by reference. Other examples of shapes or cross sectional shapes suitable for use as a surface relief profile in one or more embodiments include corner cubes, inverted corner cubes, truncated prisms, truncated corner cubes, truncated pyramids, linear prisms, truncated linear prisms, hemispheres, truncated hemispheres, optically refracting surface features such as used in optical films (including with limitation, brightness enhancing films, reverse prism films, lenticular films, transmissive right angle films, and image directing films), substantially rectangular cavities (such as in structural polycarbonate panels also known as multi-walled polycarbonate sheets, hollow polycarbonate sheets, and fluted polycarbonate sheets), an inverted shape of one the aforementioned shapes, and a combination of one or more of the aforementioned shapes. In one embodiment, the surface relief profile of one or more layers, materials, or regions of a fluid transfer component defines a channel with the cross-sectional shape of the inverted surface relief profile of the surface. For example, a fluid transfer component comprising a lenticular film with convex lenticules bonded to a planar surface using a planar pressure sensitive adhesive forms channels with plano-concave cross sections.

One or more of the surface relief profiles may be oriented in the up direction down direction, lateral direction, parallel to the flow direction, orthogonal to the flow direction, or at an angle to the outer surface of the component. The surface relief profile of one channel may be different, and thus the cross-sectional shape of the channel may be different between two neighboring or distant channels.

In one embodiment, the surface relief profile has a first set of surface relief profile shapes that define one or more channels and a second set of surface relief profiles that define an interior surface of the channel.

In one embodiment, the surface relief profile has a surface roughness, Ra, greater than one selected from the group: 0.25 micrometers 0.5 micrometers, 1 micrometer, 2 micrometers, 5 micrometers, 10 micrometers, 20 micrometers, 25 micrometers, 50 micrometers, 100 micrometers, 200 micrometers, and 500 micrometers. In another embodiment, the surface relief profile has a surface roughness, Ra, less than one selected from the group: 0.25 micrometers 0.5 micrometers, 1 micrometer, 2 micrometers, 5 micrometers, 10 micrometers, 20 micrometers, 25 micrometers, 50 micrometers, 100 micrometers, 200 micrometers, and 500 micrometers. In one embodiment, the surface relief profile has a surface roughness between 0.25 micrometers and 10 micrometers, 0.5 micrometers and 5 micrometers, or 0.25 micrometers and 50 micrometers.

In one embodiment, the surface relief profile is substantially absent (the corresponding surface is substantially planar or has a substantially smaller surface roughness) in a first region of the fluid transfer component. In another embodiment, the surface relief profile is substantially absent around the periphery of a fluid transfer component. For example, in one embodiment, the inner regions of a fluid transfer component comprise a surface relief profile defining channels while the periphery of the active region of the fluid transfer component comprise substantially planar surfaces that provide a seal preventing fluid flow out of the active region except in regions corresponding to the input and output couplers.

The surface relief profile may comprise shapes or features on the top or bottom surface of a fluid transfer component or the top or bottom of an inner surface of a fluid transfer component and may be oriented up, down, or at an angle to the top direction, bottom direction or a surface of the component.

The structured surface can also be provided with a very low profile. Thus, fluid transfer components may comprise a structured polymeric layer with a thickness less than 5000 micrometers, and even possibly less than 1500 micrometers. To do this, the channels may be defined by peaks that have a height of approximately 5 to 1200 micrometers and that have a peak distance of about 10 to 2000 micrometers.

In one embodiment, the surface relief profile is a microstructured surface that defines discrete flow channels that have a minimum aspect ratio (length/hydraulic radius) greater than one selected from the group of 10:1, 100:1, 1000:1, 5,000:1, 10,000:1, and 100,000:1. 500,000:1, 1,000,000:1, 5,000,000:1, 10,000,000:1, and 20,000,000:1. The hydraulic radius is the wettable cross-sectional area of a channel divided by its wettable channel circumference. In one embodiment, the hydraulic radius of a channel is at most one or more selected from the group 5 mm, 2 mm, 1 mm, 750 micrometers, 500 micrometers, 300 micrometers, 100 micrometers, 50 micrometers, 25 micrometers, 15 micrometers, 10 micrometers, 5 micrometers, 2 micrometers, 1 micrometer, and 0.5 micrometers.

The making of structured surfaces, and in particular microstructured or nanostructured surfaces, on a layer such as a polymeric layer in the form of a polymeric film for example, and materials suitable for making the structured surfaces are disclosed in U.S. Pat. Nos. 5,069,403; 5,133,516; 5,691,846; 5,514,120; 5,158,557; 5,175,030; 4,668,558; and U.S. Pat. Publications Nos. 20110192233 and 20110077172, the entire contents of each are incorporated by reference herein.

In one embodiment, the surface relief profile of the channel is a nano/microstructured porous material infused with a lubricating fluid, such as a SLIPS (Slippery Liquid-Infused Porous Surface) surface. In one embodiment, the inner surface of one or more channels of a fluid transfer component is a lubricated porous surface or the fluid transferred through the one or more channels lubricates the porous surface. In one embodiment, the SLIPS coating is optically transparent. Examples of lubricated porous surfaces and their methods of manufacture are disclosed in WIPO patent application publication number (WO) 2012100099, the entire contents of which are incorporated by reference herein.

In one embodiment, one or more surfaces of the fluid transfer component comprise corner cube type retroreflecting surface features. In this embodiment, portions of the cube surfaces may define one or more surfaces of one or more channels or one or more channels may comprise side walls and the corner cube-shaped surface features may be disposed along the top and/or bottom surface of the one or more channels. The cube surfaces may be oriented off axis from the normal to the surface of the fluid transfer component such that, for example, in a solar thermal application where the fluid transfer component comprises a film and is positioned conformably on the angled roof of a building, the optical axis of the corner cubes may be oriented at a first angle theta, where theta is greater than zero degrees and less than 90 degrees, to the normal of the film such that solar incident radiation may be optimally retroreflected during the summer months.

Channel Wall Thickness

In one embodiment, the average thickness of one or more walls (such as a side wall, top wall, or bottom wall) of one or more channels in a fluid transfer component is less than one selected from the group: 3, 2, 1, 0.5, 0.4, 0.2, 0.1, 0.05, 0.04, 0.03, 0.02, 0.01, and 0.005 millimeters. In one embodiment, the average thickness of all of the walls (including side walls, top wall, and bottom wall if present) of one or more channels in a fluid transfer component is less than one selected from the group: 3, 2, 1, 0.5, 0.4, 0.2, 0.1, 0.05, 0.04, 0.03, 0.02, 0.01, and 0.005 millimeters.

Surface Relief Shape within a Shape

In some embodiments, the surface relief structures have a larger scale cross-sectional shape and a smaller scale cross-sectional shape within the larger scale shape. In other words, the surface relief structures can have different length scales of structures. For example, in one embodiment, on a scale of 100's of microns, the channel has the cross-sectional shape of a rectangle, whereupon further magnification, one can see that the surface walls of the rectangular shape comprise linear wall protrusions on the scale of micrometers or tens of micrometers wide along the sides of the rectangle directed toward the interior of the rectangle. Similarly, in another example, on a scale of micrometers, the channel has the cross-sectional shape of a circle, whereupon further magnification, one can see that the surface walls of the circular shape comprise linear surface protrusions along the sides of the circle directed toward the interior of the circle. In another embodiment, the smaller scale features protrude away from the center of the channel. In one embodiment, the smaller scale features provide increased wettability and the larger scale features provide a larger scale channel size for providing the thickness of the fluid layer, providing a sufficient volume of fluid for fluid flow, or providing the wall structures for channeling the fluid in the channels independently without interaction from neighboring channels.

Surface Energy

In one embodiment, the fluid transfer film comprises a material on one or more surfaces defining one or more channels with a surface free energy (SFE) at 20° C. in mN/m less than one selected from the group: 50, 45, 40, 35, 30, 25, 20, and 10. In other embodiments, a higher surface free energy on one or more surfaces defining one or more channels is desired and the surface free energy (SFE) at 20° C. in mN/m is greater than one selected from the group: 50, 45, 40, 35, 30, 25, 20, and 10.

In one embodiment, two fluids (such as air and a liquid) are positioned within the active region of the fluid transfer component. In one embodiment, when the fluid is in contact with one or more surfaces that define one or more channels within the fluid transfer component, the liquid creates small air pockets beneath the liquid and the surface. In one embodiment, the surface, liquid, and air create a condition of contact angle hysteresis. In one embodiment, the contact angle hysteresis is a thermodynamic hysteresis based on surface roughness or surface homogeneity. In one embodiment, the surface relief profile comprises a randomly rough surface and a low contact angle hysteresis, which means that the liquid droplet is not able to wet the microstructure spaces between the protruding surface relief features.

In one example, $\gamma \cos \theta^* = f(\gamma_{1,sv} - \gamma_{1,s1}) + (1-f_1)\gamma$ where $\gamma$ is the Cassie-Baxter surface tension between the liquid and gas, the $\gamma_{1,sv}$ is the solid vapor surface tension and $\gamma_{1,s1}$ is the solid liquid surface tension, $f_1$ is the fraction of solid surface area wet by the liquid, and $\theta^*$ is the apparent contact angle which corresponds to the stable equilibrium state (i.e. minimum free energy state for the system).

Wettability

In one embodiment, the fluid transfer film comprises a material on one or more surfaces with a high degree of wettability with the fluid. In one embodiment, the contact angle of the fluid with one or more surfaces of fluid transfer film defining one or more channels is less than one or more selected from the group: 90, 80, 70, 60, 50, 40, 30, 20, 10, 5 and 1 degree. In another embodiment, the fluid transfer film comprises a material on one or more surfaces with a low degree of wettability with the fluid. In one embodiment, the contact angle of the fluid with one or more surfaces of fluid transfer film defining one or more channels is greater than one or more selected from the group: 90, 100, 110, 120, 130, 140, 150, 150, 170, 175, and 179 degrees. In one embodiment, one or more channels comprise alternating regions of high wettability and low wettability in the flow direction or a direction orthogonal to the flow direction.

Wettability Gradients

In one embodiment, one or more channels comprise alternating high and low wettability regions or wettability gradients smoothly or discretely varying in the flow direction or a direction orthogonal to the flow direction. Wettability gradients can assist with fluid flow by providing a self-propelling interaction between a surface and a fluid. For example, a channel with alternating hydrophobic and hydrophilic surface features along one or more of the inner channel surfaces in the flow can promote fluid flow through the channel, thus requiring less energy for a fluid flow source such as a pump, for example.

Leidenfrost Effect

When a liquid drop is placed on a surface held at a temperature much higher than the liquid's boiling point (such as a drop of water in a very hot pan) it hovers on its own vapor cushion, without wetting the surface. This phenomenon is called film-boiling and occurs beyond a surface temperature called the Leidenfrost point (about 200-300° C. for water on flat surfaces, depending on surface quality). In one embodiment, the fluid transfer component comprises a fluid within a channel defined by surface relief features wherein when the surface temperature is at the Leidenfront point temperature or higher for the surface and fluid the flow resistance is reduced. In another embodiment, the fluid transfer component comprises a fluid within a channel defined by surface relief features asymmetrically shaped in the flow direction wherein when the surface temperature is at the Leidenfront point temperature or higher for the surface and fluid the fluid self-propels or a proportion of the fluid flow is derived from the Leidenfrost effect. In one embodiment, the asymmetrically shaped surface features are substantially continuous around the perimeter in the plane orthogonal to the fluid flow direction. For example, in one embodiment, the surface features of in inner surface of a fluid transfer component defining one or more channels comprises skewed triangular grooves in a cross-sectional view parallel to the fluid flow direction. In one embodiment, the asymmetrically shaped surface may be ratcheted to promote flow in the flow direction when the temperature of the surface reaches or exceeds the Leidenfrost temperature.

In one embodiment, the fluid transfer component comprises one or more gas channels operatively coupled to one or more liquid channels such that the vapor generated in the liquid channels may flow into the gas channel. In one embodiment, the ratio of the average inner dimension (such as a diameter of the circle if the channel has a circular cross-section) of the liquid channel to the average inner dimension of the gas channel is greater than one selected from the group: 1, 2, 4, 6, 8, and 10. Examples of channel geometries, methods of manufacturing, gas channel and liquid channel combinations, and using the Leidenfrost effect to propel a liquid are disclosed in WIPO patent application publication number (WO) 2006121534, the entire contents of which are incorporated by reference herein.

In one embodiment, the temperature of the surface of one or more channels of a fluid transfer component is increased to a temperature above the Leidenfrost temperature for the fluid and surface by solar absorption. For example, in one embodiment, the bottom surface relief profile defining the bottom of one or more channels in a fluid transfer component used in solar thermal heating system is absorbing to solar radiation (such as a black or IR absorbing material) such that the temperature of the bottom surface increases to a temperature at or above the Leidenfrost temperature and the liquid self-propels or a proportion of the fluid flow rate is derived from the Leidenfrost effect. In another embodiment, the entire or inner surface of the channel, or a portion thereof, absorbs a portion of solar radiation. In a further embodiment, the liquid in the channel absorbs solar radiation such that a vapor is generated between the liquid and the surface of the channel and in combination with the asymmetric shapes of the surface relief features defining the channel in the flow direction, the fluid is self-propelled or the flow rate is increased. In one embodiment, the fluid transfer component comprises a solar thermal powered non-mechanical pump employing the Leidenfrost effect.

Multiple Fluid Channel Layers

In one embodiment, the fluid transfer component comprises a plurality of fluid channels in two directions orthogonal to the flow direction of the fluid in the channels. For example, in one embodiment, a fluid transfer component comprises a film including an array of surface features defining a first linear array of channels and a second film layer beneath the first layer comprising a second array of surface features defining a second linear array of channels where the first plurality of channels and second plurality of channels are separated from each other in the thickness direction. In one embodiment, a first plurality of fluid channels is disposed adjacent a second plurality of channels in the thickness direction. In another embodiment, the first plurality of channels comprises a liquid or gas and the second plurality of channels comprises a liquid or gas. For example, in one embodiment, a fluid transfer component comprises a first plurality of channels comprising air are positioned to receive light and transmit the light to a liquid within a second plurality of channels beneath the first plurality of channels. In this example, the air in the first plurality of channels may provide thermal insulation for the fluid (and the material comprising the second plurality of channels) such that the heat can efficiently be maintained within the fluid for a solar thermal application, for example.

In one embodiment, one or more fluid channels in a layer may be oriented at an angle greater than 0 degrees to one or more fluid channels in a second layer. In one embodiment, the flow direction of one channel is at an angle greater than 0 degrees to the flow direction in one or more other channels in fluid transfer component. In one example, the flow direction of a fluid in a first layer comprising a first plurality of channels is in a flow direction oriented 180 degrees (opposite) the flow direction of the fluid in a second plurality of channels.

Dynamic Channel Features

In one embodiment, the dimensions of one or more channels changes in the flow direction or changes in time. In one embodiment, the cross-sectional shape of one or more channels in a fluid transfer component change from a first point to a second point in the active region, throughout the active region, or from the fluid input coupler input end to the fluid output coupler output end. In one embodiment, the width of the channel increases, decreases, or a combination thereof in the direction of the fluid flow in the channel. In one embodiment, the channel splits into two channels (such as in a Y shaped junction or a T shaped junction) or more channels (such as a 1 to 3 channel splitter, or 1 to 4 channel or larger splitter).

In one embodiment, the size of one or more dimensions of one or more fluid channels increases or decreases with time. In one embodiment, the size of one or more channels increases. For example, in one embodiment, a plurality of thermally insulating channels may inflate due to air being pumped through the channels to inflate the channel and improve thermal resistance. In another embodiment, one or more channels may increase or decrease in response to an increase or decrease in fluid pressure and change the optical, thermal, physical or mechanical properties of one or more regions of the fluid transfer component. In one embodiment, for example, channels comprising air in a fluid transfer component in the form of a pool cover may be inflated such that they increase in size to contain a larger volume of air and increase the buoyancy of the fluid transfer component. In another embodiment, the dimensions of one or more channels in a fluid transfer component increases and decreases in size at a frequency greater than 1 cycle per second. In one embodiment, the change in dimension of a dimension of one or more channels changes at a rate of an audio frequency such that the fluid transfer component functions as a speaker. In another embodiment, the size, shape, configuration of the channels, pump pressure or flow source pressure and the rate of change of pressure are controlled such that the ambient air pressure wavefront generated from the expansion and/or contraction from one or more channels are in phase with each other.

Channel Openings

In one embodiment, one or more channels comprise one or more openings that fluidly connect the channel to a different layer or the ambient environment. For example in one embodiment, the fluid transfer component is configured to deliver a liquid through an array channel openings to an area of an object adjacent the active region of the fluid transfer region such as in the case of applying an array of chemicals to a substrate comprising biological or chemical reagents or assays. In another example, the fluid transfer component is configured to deliver warm and/or cool air through an area comprising a plurality of channel openings (or ports or tunnels fluidly connected to the channels) distributed across the area to provide more uniformly distributed warming and/or cooling to an environment. Similarly, a fluid may be collected across an area of the active region comprising channel openings by reducing the pressure in channels such that the fluid flows from the environment into one or more channels through one or more channel openings (or ports or tunnels fluidly connected to the channels). In one embodiment, a laser generates one or more openings in one or more channels by ablating one or more areas of material between a layer adjacent the one or more channels and the one or more channels or between the environment and the one or more channels. In another embodiment, one or more channel openings, ports, and/or tunnels are formed by a replication process, a perforation process, an etching process or other methods known to generate openings, perforations, or holes in polymers in the polymer processing industry.

Bending or Looping Channels

In one embodiment, one or more channels in the fluid transfer component comprise a loop or curve in the channel. In another embodiment, one or more channels are angularly redirected by one or more curves such that the flow direction is rotated by about 90 degrees through a single 90 degree bend, two 45 degree bends, two non-45 degree bends combining to form a 90 degree change in flow direction, or three or more bends resulting in a 90 degree change in flow direction. In another embodiment, one or more channels are angularly redirected by one or more curves such that the flow direction is rotated by about 180 degrees through a single 180 degree bend, two 90 degree bends, two non-ninety degree bends combining to form a 180 degree change in flow direction, or three or more bends resulting in a 180 degree change in flow direction. By bending channels, the flow of the fluid can be directed to input couplers on adjacent sides of the active region of the fluid transfer element (such as in the case of channels with a total flow direction change of 90 degrees) or the fluid can be directed back to the same coupler or an output coupler along the same side of the fluid transfer component. In embodiments where the channels flow back to the same fluid coupler, a first portion of the fluid coupler may function as a fluid input coupler (such as the side of the coupler surface closer to the active region in a fluid channel geometry converter coupler) and a second portion of the fluid coupler may function as the fluid output coupler (such as the side of the coupler surface further from the active region in a fluid channel geometry converter coupler). Similarly, in some embodiments where the channels flow back to the same fluid coupler, a first portion of the fluid coupler may function as a fluid input coupler (such as the side of the coupler surface comprising the longer segment in a fluid channel geometry converter coupler) and a second portion of the fluid coupler may function as the fluid output coupler (such as the side of the coupler surface comprising the shorter segment in a fluid channel geometry converter coupler). In the embodiments where the channels loop back to the same coupler, first pipes, tubes, or fluid carrying members may be positioned adjacent (in a horizontal or vertical direction, for example) to second pipes, tubes, or fluid carrying members to provide fluid supply and fluid return. In this example, the supply and return lines may be advantageously positioned adjacent each other, which can provide reduced parts, sharing of common supply or return insulation or other plumbing benefits. In another embodiment, one or more channels comprise a 180 degree bend such that the channels from a first input coupler fluid channel geometry converter extend through the active region, bend, pass back through the active region and extend into the output end of a fluid channel geometry converter output coupler along the same side of the active region. In this embodiment, the fluid and supply lines may be positioned along the same side of the active region of the fluid transfer component which may enable a smaller volume or more compact configurations.

Separation Channels

In one embodiment, one or more channels may be configured to be separation channels that perform one or more of the functions: facilitate separation of the channels, maximize the yield, volume, or area of material comprising the channels, and guide the separation of segments of channels such that the separation does not extend into two channels where fluid could leak. In one embodiment, a separation channel is positioned between two channels and in a cross-section of the fluid transfer component, the dimension of the separation channel in a direction transverse to the direction of fluid flow is less than the dimension of the two channels in the same direction. For example, in one embodiment, fluid flow channels have relatively wide cross-sectional widths and in order to reduce the wasted volume of material and maximize coupling area in an input coupler, the cross-sectional width of a separation channel between two fluid flow channels is less than the cross-sectional width of the fluid flow channels. In one embodiment, a fluid transfer component comprises at least one separation channel comprising at least one separation feature such as a groove, perforation, or thinner side wall wherein separation of the segments of the fluid transfer component on either side of the separation feature is facilitated. For example, in one embodiment, a fluid transfer component comprises a plurality of channels with a cross-sectional profile in the shape of a standard multi-walled polycarbonate panel (though not necessarily made of polycarbonate nor of the same size scale as traditional multiwall polycarbonate panels) with substantially rectangular fluid flow channels and the fluid transfer component further comprises separation channels between the rectangular channels. In this embodiment, one or more top and/or bottom surfaces of the separation channels may be perforated such that strip segments extending from a film based fluid transfer component may be formed by readily tearing, cutting or separating regions of the film based fluid transfer component comprising pluralities of fluid flow channels. In another embodiment, the top and/or bottom walls of the separation channel are thinner than the top and/or bottom walls of the fluid flow channels such that the fluid transfer component may be more readily torn, cut, or have regions separated along the channel by tearing, cutting, or separating the flow channels along the top and/or bottom surface of the separation channels. In one embodiment, the thickness of one or more walls, surfaces, or perforations of one or more walls or surfaces is generated by the microreplication or channel forming manufacturing step. For example, in one embodiment, a film used to create corrugated flutes in a film that define fluid flow channels comprises a perforation line parallel to the flow direction at a repeated or regular interval such that the film may be more readily torn, cut, or separated along the line. In another embodiment, the fluid transfer component comprises one or more separation channels configured along or near the peripheral edges of the active region of the fluid transfer element to facilitate extraneous material removal or define and/or separate a plurality of active regions.

Channel Defining Elements

In one embodiment, the channel supporting and/or defining elements comprise one or more surfaces or elements selected from the group: surface relief surface of a layer or component, cover layer, adhesive joining two or more components, a sealant between two surfaces, inner or outer walls of a surface relief component or hollow component (such as hollow fibers), a substrate layer, a protective layer, a coating, or other region, layer, or material within the fluid transfer element or system.

Channel Number and Thickness

In one embodiment, the fluid transfer component comprises a multitude of microstructured channels. In one embodiment, the fluid transfer component comprises a single channel or more than 1, 2, 3, 4, 5, 10, 20, 50, 100, 1,000, 10,000, 100,000, 1,000,000, or 10,000,000 channels. The more channels that are connected to a flow source allow the desired effect (such as optical or thermal) to be more highly distributed. Channels defined by one or more microstructured surfaces in accordance with one or more embodiments provide fluid transfer components in which the fluid volume of the system is highly distributed in the active region of the fluid transfer component. That is, the fluid volume that passes through channels in the active region of the fluid transfer component is distributed over a large area. In one embodiment, the fluid transfer component comprises a channel density at the fluid input coupler, fluid output coupler, or across the active region of the fluid transfer component in a first direction greater than one selected from the group 1, 2, 5, 10, 15, 20, 40, 60, 100, 200, 500, 1000, 10,000, 20,000, 50,000, and 100,000 channels per centimeter.

The number of channels may reduce or increase in one or more directions. For example one or more channels may merge or split together. For example, the channels could have varying cross-sectional widths along the channel length; that is, the channels could diverge and/or converge along the length of the channel. The channel sidewalls could also be contoured rather than being straight in the direction of extension of the channel, or in the channel height. Generally, any channel configuration that can provide at least multiple discrete channel portions that extend from the input side to the output side within the fluid transfer component are contemplated.

Coatings or Layers Surfaces or Regions within Component

In one embodiment, one or more selected from the group: the fluid, a surface defining a channel for the fluid, and the volume of the material defining one or more surfaces of a channel comprises a surfactant. In one embodiment, one or more surfaces defining one or more fluid channels are modified through vapor deposition or covalent grafting of functional moieties using ionizing radiation. Methods and techniques for graft-polymerization of monomers onto polypropylene, for example, by ionizing radiation are disclosed in U.S. Pat. Nos. 4,950,549 and 5,078,925, the entire contents of each are incorporated by reference herein. In one embodiment, a coating or layer surface, or a region within a fluid transfer component comprises a coating applied by co-extrusion, wet coating, gravure coating, chemical vapor deposition, plasma enhanced vapor deposition, vacuum deposition, lamination, or material transfer.

Any suitable known method may be utilized to achieve a desired wettability, such as a highly or superhydrophilic surface, on one or more surfaces of fluid transfer components in one or more embodiments. Surface treatments may be employed such as topical application of a surfactant, plasma treatment, vacuum deposition, polymerization of hydrophilic monomers, grafting hydrophilic moieties onto the film surface, corona or flame treatment, etc. Alternatively, a surfactant or other suitable agent may be blended with the resin as an internal characteristic altering additive at the time of film extrusion. It is typically preferred to incorporate a surfactant in the polymeric composition from which the fluid transfer component is made rather than rely upon topical application of a surfactant coating, since topically applied coatings may tend to fill in (i.e., blunt), the notches of the channels, thereby interfering with the desired liquid flow to which the embodiment is directed. When a coating is applied, it is preferably thin to facilitate a uniform thin layer on the structured surface. An illustrative example of a surfactant that can be incorporated in fluid transfer components comprising polyethylene is TRITON™ X-100 (available from Union Carbide Corp., Danbury, Conn.), an octylphenoxypolyethoxyethanol nonionic surfactant, e.g., used at between about 0.1 and 0.5 weight percent.

Other surfactant materials that are suitable for increased durability requirements for industrial applications of the present embodiment include Polystep® B22 (available from Stepan Company, Northfield, Ill.) and TRITON™ X-35 (available from Union Carbide Corp., Danbury, Conn.).

As discussed above, a surfactant or mixture of surfactants may be applied to the surface of the fluid transfer component or impregnated into the article in order to adjust the properties of the fluid transfer component or a region thereof. For example, it may be desired to make the inner surface of a surface relief feature defining one or more surfaces of a fluid channel in a fluid transfer component more hydrophilic than the surface would be without such a component.

Preferred embodiments of the present embodiment retain the desired fluid transfer properties throughout the life of the product into which the fluid transfer component is incorporated. In order to ensure the surfactant is available throughout the life of the fluid transfer component the surfactant preferably is available in sufficient quantity in the article throughout the life of the article or is immobilized at the surface of the fluid transfer component. For example, a hydroxyl functional surfactant can be immobilized to a fluid transfer component by functionalizing the surfactant with a di- or tri-alkoxy silane functional group. The surfactant could then be applied to the surface of the fluid transfer component or impregnated into the article with the article subsequently exposed to moisture. The moisture would result in hydrolysis and subsequent condensation to a polysiloxane. Hydroxy functional surfactants, (especially 1,2 diol surfactants), may also be immobilized by association with borate ion. Suitable surfactants include anionic, cationic, and non-ionic surfactants, however, nonionic surfactants may be preferred due to their relatively low irritation potential. Polyethoxylated and polyglucoside surfactants are particularly preferred including polyethoxylated alkyl, aralkyl, and alkenyl alcohols, ethylene oxide and propylene oxide copolymers such as "Pluronic" and "Tetronic", alkylpolyglucosides, polyglyceryl esters, and the like. Other suitable surfactants are disclosed in U.S. patent application Ser. No. 08/576,255, the entire contents are incorporated by reference herein.

As discussed above, a surfactant such as a hydrophilic polymer or mixture of polymers may be applied to the surface of the fluid transfer component or impregnated into the article in order to adjust the properties of the fluid transfer component or article. Alternatively, a hydrophilic monomer may be added to the article and polymerized in situ to form an interpenetrating polymer network. For example, a hydrophilic acrylate and initiator could be added and polymerized by heat or actinic radiation.

Suitable hydrophilic polymers include: homo and copolymers of ethylene oxide; hydrophilic polymers incorporating vinyl unsaturated monomers such as vinylpyrrolidone, carboxylic acid, sulfonic acid, or phosphonic acid functional acrylates such as acrylic acid, hydroxy functional acrylates such as hydroxyethylacrylate, vinyl acetate and its hydrolyzed derivatives (e.g. polyvinylalcohol), acrylamides, polyethoxylated acrylates, and the like; hydrophilic modified celluloses, as well as polysaccharides such as starch and modified starches, dextran, and the like.

As discussed above, a hydrophilic silane or mixture of silanes may be applied to the surface of the fluid transfer component or impregnated into the article in order to adjust the properties of the fluid transfer component or article. Suitable silane include the anionic silanes disclosed in U.S. Pat. No. 5,585,186, the entire contents are incorporated by reference herein, as well as non-ionic or cationic hydrophilic silanes. Cationic silanes may be preferred in certain situations and have the advantage that certain of these silanes are also believed to have antimicrobial properties.

Physical Coatings or Layers

In one embodiment, one or more surfaces defining one or more channels in the fluid transfer component comprises a substantially or completely amorphous film including carbon, and optionally including one or more additional components selected from the group of hydrogen, nitrogen, oxygen, fluorine, silicon, sulfur, titanium, and copper. Other elements may be present in certain embodiments. In one embodiment, the substantially or completely amorphous film is a "diamond like" film discussed in U.S. Pat. Nos. 6,749,813 and 6,696,157, the entire contents of each are incorporated by reference herein. For fluid handling surfaces, hydrophilic diamond-like films can provide hydrophilic surfaces that enhance fluid transfer. Furthermore, if desired, such films can include linking agents for affixing reactants or otherwise altering the surface chemistry. The films can also function as a barrier to liquid evaporation and transmission through the substrate of which the device is made. In one embodiment, the fluid transfer component comprises a class of interpenetrating diamond-like films. These diamond-like thin films are called DYLYN and are interpenetrating systems of two materials. These interpenetrating diamond-like thin films are disclosed in U.S. Pat. No. 5,466,431, the entire contents are incorporated by reference herein.

In one embodiment, one or more surfaces of the fluid transfer component defining a channel comprise one or more coatings that alter one or more selected from the group: surface tension, antibacterial properties, anti-algae properties, thermal conductivity, electrical conductivity, Young's modulus, heat deflection temperature, oxygen permeability, moisture permeability, and flexibility. In one embodiment, the fluid transfer component comprises a polymeric film substrate having a first major surface and a second major surface opposite the first major surface, and a protective structure provided on at least the first major surface of the substrate, wherein the protective structure comprises a layer of boron oxide and an inorganic barrier layer. A protective structure may also be provided on the second major surface of the substrate. Organic electronic components may be formed on or attached to the protected polymeric films. Examples of films and configurations with a boron oxide coating are disclosed in U.S. Pat. No. 7,468,211, the entire contents are incorporated by reference herein.

In one embodiment, one or more surfaces of the fluid transfer component comprises a hydrophilic coatings comprising a transparent gel material including a polymerized monofunctional poly(alkylene oxide) macromonomer component and a surface modified nanoparticle component such as disclosed in U.S. patent application publication 2011/0245077, the entire contents are incorporated by reference herein.

Optical Coatings or Layers

Optical coatings or layers may be used with the fluid transfer component to affect the optical properties or performance of the fluid transfer component. In one embodiment, the fluid transfer component comprises one or more optical coatings selected from the group: ultraviolet light absorbing, ultraviolet light reflecting, infrared light absorbing, infrared light absorbing, visible light reflecting, visible light absorbing, anti-reflection, diffuse surface reflecting, optically clear hardcoating or scratch-resistant coating, black layer or coating, reflective metal foil layer or coating, coating or layer comprising reflective particles (such as aluminum or coated silver particles), titanium dioxide particles, or barium sulfate particles, coating or layer comprising light absorbing or reflecting flakes, coating or layer comprising one or more lenses, coating or layer comprising an array of linear lenses, coating or layer comprising an array of concave lenses, coating or layer comprising an array of convex lenses, coating or layer comprising diffractive features, coating or layer comprising refractive lenses, coating or layer comprising total internal reflection features, a birefringent coating or layer, and a birefringent coating or layer comprising birefringent particles.

Methods for applying the coatings include, but are not limited to spray deposition, chemical vapor deposition, plasma enhanced chemical vapor deposition, evaporation, sputtering, dipping, wet coating, inkjet coating, gravure coating, electroplating, or using other coating methods.

Spatially Varying Optical Coatings or Layers

In one embodiment the fluid transfer component comprises spatially varying optical coatings or layers. In one embodiment, the optical coating or layer varies in the fluid flow direction, or a direction orthogonal to the fluid flow direction. For example, in one embodiment, the fluid transfer component comprises an array of apertures in a layer with a flexible membrane beneath the layer. When fluid pressure is increased beneath the flexible membrane, the membrane expands and forms convex lenses that focus light.

Thermally Insulating Layers or Regions

In one embodiment, a fluid transfer component comprises a thermally insulating layer or region between the plurality of channels and the outer surface of the fluid transfer component in the active region. In another embodiment, a fluid transfer component comprises a thermally insulating layer or region between the plurality of channels and both outer surfaces of the fluid transfer component in the active region. A thermally insulating layer or region can reduce thermal losses in at least the active region due to thermal radiation, convection, conduction. For example, in one embodiment, a thermal transfer component comprises a first thermally insulating layer comprising a light transmitting porous material is positioned between the outer light receiving surface of a fluid transfer component and interior fluid flow channels. A second thermally insulating layer comprising a light reflective porous material is positioned between the opposite major surface of the fluid transfer component (the surface opposite the light receiving surface) and the interior fluid flow channels. In this embodiment, the first thermally insulating layer thermally insulates the fluid and/or the channels comprising the fluid from the ambient environment at the front of the fluid transfer component. In this embodiment, the first thermally insulating layer reduces thermal losses due to thermal convection and thermal conduction. In this embodiment, the second thermally insulating layer thermally insulates the fluid and/or the channels comprising the fluid from the ambient environment at the back of the fluid transfer component. In this embodiment, the second thermally insulating layer reduces thermal losses due to thermal convection, thermal conduction, and thermal radiation since a portion of the thermal radiation from the fluid and/or the material defining the channels is reflected back into the fluid and/or channel region of the fluid transfer component. In one embodiment, one or more thermally insulating layers comprises surface relief features that form regions wherein two surfaces are separated by an air gap. In one embodiment, the surface of a thermally insulating layer comprises surface relief structures separated by an air gap or other fluid gap from a planar surface or surface comprising surface relief features. In one embodiment, the thermally insulating layer is defined in the active region of the thermal transfer component by one or two substantially planar surfaces. For example, in one embodiment, the thermal transfer component comprises two glass sheets (such as window panes) between the outer surface of the thermal transfer component exposed to the outer ambient environment and a plurality of channels wherein the two glass window panes are separated and may comprise air or an inert gas between the glass sheets. In another embodiment, the fluid transfer component is positioned between two glass sheets such that an air or other fluid is positioned between the thermal transfer component and either glass pane and the air or other fluid functions as a thermally insulating layer.

In one embodiment, the thermal transfer component comprises one or more thermally insulating layers with a thermal conductivity less than one selected from the group: 100, 10, 5, 1, 0.5, 0.1, 0.05, 0.025, 0.02, and 0.01 $W \cdot m^{-1} \cdot K^{-1}$ at 298 degrees Kelvin.

In one embodiment, the thermally insulating layer comprises a silica aerogel; hollow beads (glass or polymeric); a mesh, collection, weave, or roving of fibers (solid or porous fibers); a porous material such as a film comprising pores generated through orientation and/or stretching of the film or a porous insulating material such as disclosed in U.S. patent application publication no. 20030129379, the entire contents are incorporated by reference herein; a nanostructured material; or a microstructured material. In one embodiment, the thermally insulating material, layer, or region is formed or the thermal conductivity is reduced by inflating the thermally insulating material, layer, or region. In another embodiment, the thermally insulating layer is inflated by pumping air or other gas through one or more channels in one or more layers of the fluid transfer component.

Active Region Area

The corresponding planar area of the active region of a fluid transfer component is the area of the plane defined by the outer edges of the active region when the active region of the fluid transfer component is shaped in a flat format (such as rolled out onto a flat surface or the fluid transfer film before thermoforming into a non-planar shape). In one embodiment, the fluid transfer component comprises an active region with a corresponding planar surface area greater than one selected from the group 0.01, 0.05, 0.1, 0.2, 0.4, 0.6, 0.8, 1, 1.2, 1.4, 1.6, 1.8, and 2 square meters. In one embodiment, the fluid transfer component comprises an active region with a corresponding planar surface area less than one selected from the group 0.01, 0.05, 0.1, 0.2, 0.4, 0.6, 0.8, 1, 1.2, 1.4, 1.6, 1.8, and 2 square centimeters.

Active Region Thermal Properties

In one embodiment, the active region of the fluid transfer component captures heat from its surroundings and transfers the heat through fluid flow. For example, in one embodiment, the fluid transfer component is operatively configured to conductively receive heat from an organic light emitting diode panel or an inorganic light emitting diode and transfer a portion of the heat to a fluid that transfers the heat away from the panel or diode. In one embodiment, one or more selected from the group: surface relief profile defining one or more fluid channels, fluid channel surface, layer thermally coupled to the fluid in the active region, substrate layer, optical layer, hollow component, fluid additives, coating, outer surface, and layer in a fluid transfer component comprises a first material with a thermal conductivity greater than one selected from the group: 0.1, 0.2, 0.5, 1, 2, 5, 10, 20, 30, 40, 50, 60, 70, 80, 100, 150, 200, 250, 300, 400, 500, 750, 1,000, 1,500, 2,000, 3,000, and 4,000 $W \cdot m^{-1} \cdot K^{-1}$.

In another embodiment, the active region of the fluid transfer component provides changing optical or other properties and insulates one or more regions of the component or a device or component proximate the fluid transfer component from heat. For example, in one embodiment, the active region of the fluid transfer transitions from a transparent state to a light absorbing black state. In this embodiment, the black fluid absorbs solar radiation and layers, regions, or coatings on one or both sides of the fluid channels insulates one or more layers or regions of the fluid transfer component from the heat in the fluid to reduce thermal degradation and/or maximize heat transfer. In one embodiment, one or more selected from the group: surface relief profile defining one or more fluid channels, fluid channel surface, layer thermally coupled to the fluid in the active region, substrate layer, optical layer, hollow component, fluid additives, coating, outer surface, and layer in a fluid transfer component comprises a first material with a thermal conductivity less than one selected from the group: 0.02, 0.025, 0.04, 0.05, 0.1, 0.2, 0.5, 1, 2, 5, 10, 20, 30, 40, 50, 60, 70, 80, 100, 150, and 200 $W \cdot m^{-1} \cdot K^{-1}$.

Active Region Optical Properties

In one embodiment, the optical properties of the active region of the fluid transfer component are dynamic and change from first optical state to a second optical state. Examples of optical state changes include, but are not limited to light reflecting state, light scattering state, light absorbing state, light transmitting state, and light emitting state. The active region may also change the degree or level of the property of the state. For example, the active region could change from a weakly scattering state to a strongly scattering state or from a strongly absorbing state to a weakly absorbing state. The active region could change from state with a first level of a first property to a second level of a second property, such as changing from a strongly reflecting state to a weakly absorbing state. In another embodiment, the active region may be multiple states and/or levels simultaneously, such as a diffuse light transmitting state and a forward light scattering state.

The optical properties may change based on internal or external stimulus, from a controller, a period of time, a specific time or event, response from a user, automatic conditions, feedback (electrical, optical, mechanical, thermal), response from a sensor and controller, response from a temperature sensor (such as a fluid temperature sensor or ambient air temperature) or other methods of control suitable for controlling electronic, optical, or thermal devices.

In another embodiment, the active region comprises multiple layers or regions, comprising optical states and levels that may be similar or different. For example, in one embodiment, the fluid transfer component comprises a fluid channel layer operatively configured to receive red fluid, a second channel layer operatively configured to receive blue fluid, and a third layer operative configured to receive green fluid such that a specific color (transmitted or reflected) can be achieved. In another embodiment, the active layer comprises a plurality of channels (on the same or different layers) wherein the optical state and/or level or degree of the property or state is different in two or more of the channels. For example, in one embodiment, a fluid transfer component comprises an array of channels wherein a red channel is adjacent a blue channel which is adjacent to a green channel which is adjacent a red channel.

In addition to the dynamic optical properties of the active region, the active region may comprise one or more layers, coatings, regions, or spatially varying regions that have substantially static optical properties. These static optical properties may be light reflecting, light scattering, light absorbing, light transmitting, and light emitting. For example, in one embodiment, the surface relief profile defining surfaces of the fluid channels significantly scatters incident light when the fluid has a refractive index different from the surface by more than 0.01.

In one embodiment, for example, a fluid transfer component comprises a plurality of channels defined by one or more surface relief features in a film between a light transmitting thermally insulating layer and a white, light reflecting thermally insulating layer. In this embodiment, when the fluid transfer component is positioned on a roof of a building as part of a solar thermal system, a black, light absorbing fluid may be pumped or otherwise propelled by a flow source through the plurality of channels in the winter or times of cold ambient temperatures to absorb solar radiation and transfer the heat to a heat exchanger located in a building. In the summer or warm months, a substantially transparent liquid, substantially clear liquid, a liquid having a high solar transmittance, or a liquid that scatters or reflects solar radiation with significant absorption, or a gas may flow or substantially fill the plurality of channels. In this example, air may be pumped through the channels to permit the light reflecting rear thermally insulating layer to reflect ambient solar radiation from the fluid transfer component or a fluid that reflects (by scattering or reflective surfaces, for example) the solar radiation, transmits a significant portion of the solar radiation, or partially reflects and partially transmits the incident solar radiation may be pumped continuously through the channels or pumped to fill the channels for a period of time (for the entire winter season, for example).

Light Reflecting State

In one embodiment, the active region of the fluid transfer component transitions from a first state to a light reflecting state. The active region has a light reflecting state when it reflects more than a first average reflection percentage of the incident light in a first wavelength or first wavelength band incident from a first angle or first angular range. In one embodiment, the first reflection percentage is greater than one selected from the group 5%, 10%, 20%, 30%, 40%, 50%, 60%, 70%, 80%, 90%, 95%, 98%, 99%, and 99.5%. In one embodiment, the first wavelength or first wavelength band (in nanometers unless otherwise specified) is one or more selected from the group: 300-400, 400-700, 450-650, 350-1750, 350-1000, 400-1000, 700-1000, 700-900, 900-1200, 440-490 (blue), 520-570 (green), 630-740 (red), 450-460 (NVIS blue), 505-560 (NVIS Green A), 560-590 (NVIS Yellow), 585-615 (NVIS red), laser wavelengths such as 632.8 (HeNe), 454.6, 488.0, 514.5, 351, 363.8, 457.9, 465.8, 476.5, 472.7, 528.7, 244, 257 (Argon including frequency doubled), 416, 530.9, 568.2, 647.1, 676.4, 752.5, 799.3 (Krypton), 337.1 (Nitrogen), 10.6 micrometers, 9.4 micrometers (Carbon dioxide), 2.6-4 micrometers, 4.8 to 8.3 micrometers (carbon monoxide), 193, 248, 308, 353 (Excimer), 2.7-2.9 micrometers (HF), 3800 (deuterium floride), 1.315 micrometers (chemical oxygen-iodine), 390-435 (stilbene dye), 460-515 (coumarin 102), 570-640 (rhodamine 6G), 441.56, 325 (HeCd), 567, 615 (HeHg), 224.3 (HeAg), 430.5 (Strontium vapor), 248.6 (Neon Copper), 510.6, 578.2 (Copper vapor), 627 (Gold vapor), 694.3 (Ruby), 1.064 micrometers, 1.32 micrometers (Nd:YAG), 2.94 micrometers (Er:YAG), 1.047 micrometers, 1.053 micrometers (Nd:YLF), 1064 (Nd:YVO$_4$), 1060, 530 (Nd:YCOB and harmonic), 650-1100 (Ti:Sapphire), 2000 (Tm:YAG), 1.03 micrometers (Yb:YAG), 1 micrometer (Ytterbium), 2.1 micrometers (Ho:YAG), 2.2-2.8 micrometers (Cr:ZnSe), 280-316 (Ce:LiSAF or Ce:LiCAF), 933, 1098 (Promethium 147 doped phosphate glass), 1.53-1.56 micrometers (Erbium doped and erbium-ytterbium codoped glass), 2.5 micrometer (U:CaF$_2$), 708.5 (Sm:CaF$_2$), 0.4-20 micrometer (Semiconductor laser diode), 0.4 micrometer (GaN), 630-900 (AlGaInP, AlGaAs), 1.0-2.1 micrometers (InGaAsP), 3-20 micrometers (lead salt), 850-1500 (VCSEL), 7.3 (Nickel-like" Samarium), 1-2 micrometers (Raman), and other lasing wavelengths known to be produced from semiconductor laser diodes, quantum cascade lasers, hybrid silicon lasers, free electron lasers, HeSe lasers, and Xenon lasers.

The first angle or first angular range in degrees may be one or more selected from the group comprising: 0, 30, 60, 45, −90 to +90, −5 to +5, −10 to +10, −20 to +20, −30 to +30, −40 to +40, −50 to +50, −60 to +60, −70 to +70, −80 to +80, 0 to +10, 0 to +20, 0 to +30, 0 to +40, 0 to +50, 0 to +60, 0 to +70, 0 to +80, 0 to +90, +80 to +90, +70 to +90, +60 to +90, +50 to +90, +40 to +90, +30 to +90, +20 to +90, +10 to +90, +30 to +60, and +40 to +50 in one or more planes of incidence.

In one embodiment, the degree or level of reflectance in the active region is a light reflecting state that reflects an average of one or more selected from the group 10%, 15%, 20%, 25%, 30%, 35%, 40%, 45%, 50%, 51%, 55%, 60%, 65%, 70%, 75%, 80%, 85%, 90%, 95%, and 99% of the incident light in a first wavelength or first wavelength band incident from a first angle or first angular range.

In one embodiment, the degree or level of reflection in the active region is a light reflecting state with a solar emissivity less than one selected from the group: 0.01, 0.05, 0.1, 0.2, 0.3, 0.4, 0.5, 0.6, 0.7, 0.8, and 0.9.

In another embodiment, the degree or level of reflection in the active region is a light reflecting state with a solar emissivity greater than one selected from the group: 0.01, 0.05, 0.1, 0.2, 0.3, 0.4, 0.5, 0.6, 0.7, 0.8, and 0.9.

In one embodiment the degree or level of reflectance in the active region is a light reflecting state that reflects an average of one or more selected from the group 10%, 15%, 20%, 25%, 30%, 35%, 40%, 45%, 50%, 51%, 55%, 60%, 65%, 70%, 75%, 80%, 85%, 90%, 95%, and 99% of the incident light polarized with a first polarization state selected from the group: unpolarized, linearly polarized, s-polarized, p-polarized at 45 degrees, linear polarized at 90 degrees, circularly polarized, left-handed circular polarization, right-handed circular polarization, elliptically polarized, left-handed elliptical polarization, right-handed elliptical polarization, in a first wavelength or first wavelength band incident from a first angle or first angular range.

In one embodiment, the active region has a light reflecting state and retroreflects an average of more than 5% of the incident light in a first wavelength or first wavelength band incident from a first angle or first angular range back toward the direction from which it arrived. Examples of retroreflective materials include without limitation, corner cubes, corner cube arrays, beaded arrays or films (such as those used for reflective sheeting for signs and vehicles).

The different degrees, levels, or reflecting properties of the light reflecting state include, but are not limited to shifting from a first reflecting wavelength or first reflecting wavelength band to a second reflecting wavelength or second reflecting wavelength band different from the first, shifting from a first reflecting incident angle or first reflecting incident angular range to a second reflecting incident angle or second reflecting incident angular range different from the first, increasing or decreasing the reflectance, and changing the polarization state of the light that is reflected.

For example, in one embodiment, a fluid transfer film comprises an active region comprising a white oriented PET film comprising Titanium dioxide disposed beneath a layer comprising channels defined by surface relief structures and a transparent cover film wherein the optical properties of the active region change from a black absorbing state when a black fluid comprising carbon black nanoparticles is flowing through the channels to a diffusely reflecting white state when a substantially clear fluid (that may be refractive index matched to the material of the surface defining the channels) is pumped through the channels.

Light Scattering State

In one embodiment, the active region of the fluid transfer component transitions from a first state to a light scattering state. The scattering may be forwardly scattering (diffuse transmission) or backward scattering (diffuse reflection). The active region has a light scattering state when it redirects incident light of a first wavelength or first wavelength band from a first angle or first angular range such that the light has one or more properties selected from the group: the light incident from a first angle or first angular range is redirected to a second angle or second angular range different from the first angle or first angular range; the light incident from a first angle is redirected to an angular range with a full angular width at half maximum intensity in degrees greater than one selected from the group: 0.5, 1, 2, 4, 5, 10, 15, 20, 25, 30, 450, 45, 50, 60, 70, 80, and 90 when measured using laser light of the first wavelength with a divergence less than 5 milliradians; and the active region of the fluid transfer component has an ASTM D1003 haze greater than one selected from the group of 0.3%, 0.5%, 1%, 3%, 5%, 10%, 20%, 30%, and 40%. The scattering may be due to interaction with surface features, interfaces, or materials with a size scale of tens of nanometers to a few centimeters or more and includes, without limitation, one or more selected from the group: forward or backward light scattering particles, domains, voids, interfaces, or features; guided mode optical elements; coupled mode optics; optical metamaterials; photonic crystals; diffractive elements; holographic elements; regular or irregular surface features or interfaces; refractive elements; and reflective elements reflecting light at a different angle than the angle of incidence.

In one embodiment, the first wavelength or first wavelength band for a light scattering state is a wavelength or wavelength band discussed previously in the light reflecting section. In another embodiment, the first incident angle or first incident angular range is one or more first angles or first angular ranges (discussed for a light reflection state previously in the light reflecting section) for a light scattering plane.

The different degrees, levels, or scattering properties of the light scattering state include, but are not limited to shifting from a first scattering wavelength or first scattering wavelength band to a second scattering wavelength or second scattering wavelength band different from the first, shifting from a first scattering incident angle or first scattering incident angular range to a second scattering incident angle or second scattering incident angular range different from the first, increasing or decreasing the haze, increasing or decreasing the full angular width at half maximum intensity of the scattered light, and changing the polarization state of the light that is scattered.

For example, in one embodiment, a fluid transfer film comprises an active region comprising a birefringent polyethylene naphthalate film with grooves oriented along an axis of birefringence that define one or more surfaces of the fluid channels and the active region of the fluid transfer film changes from a polarization sensitive scattering state with less than 10% of the incident light scattered and polarized to greater than 10% of the incident light scattered forward for a first polarization state when fluid of a first refractive index is pumped through the channels. In one embodiment, the active region of the fluid transfer component transitions from a scattering polarizer to a scattering film.

For example, in one embodiment, a fluid transfer system comprises a fluid transfer component comprising a plain weave of hollow fibers is cut and extrusion coated on the top and bottom with an adhesive and carrier film to form a carrier film-adhesive-weave-adhesive-carrier film composite using an adhesive. In this example, fluid may flow through the hollow fibers from one weft end to the opposite weft end and/or one warp end to the opposite warp end. In one embodiment, the weft ends of the fluid transfer component are not cut such that the fluid flows from the first warp end to the second warp end. In this example, if a refractive index matching adhesive is used that substantially matches the fiber material and the carrier film and a fluid with the same refractive index is flowed through the hollow fibers, the composite will be substantially transparent with a full-angular width at half maximum intensity less than 0.4 degrees when fluid flows through the hollow fibers and will be light scattering with a full angular width at half maximum intensity of 10 degrees when air is pumped through the hollow fibers. In one embodiment, the fibers are formed from a substantially amorphous material and may be oriented or stretched to minimize fiber birefringence.

Light Absorbing State

In one embodiment, the active region of the fluid transfer component transitions from a first state to a light absorbing state. The active region has a light absorbing state when it absorbs more than a first average absorption percentage of the incident light of a first wavelength or first wavelength band incident from a first angle or first angular range. In one embodiment, the first absorption percentage is greater than one selected from the group 5%, 10%, 20%, 30%, 40%, 50%, 60%, 70%, 80%, 90%, 95%, 98%, 99%, and 99.5%. In one embodiment, the first wavelength or first wavelength band for a light absorbing state is a wavelength or wavelength band discussed previously in the light reflecting section. In another embodiment, the first incident angle or first incident angular range is one or more first angles or first angular ranges (discussed for a light reflection state previously in the light reflecting section) for a light absorbing plane.

In one embodiment, the degree or level of absorption in the active region is a light absorbing state that has an average absorption of one or more selected from the group 10%, 15%, 20%, 25%, 30%, 35%, 40%, 45%, 50%, 51%, 55%, 60%, 65%, 70%, 75%, 80%, 85%, 90%, 95%, and 99% of the incident light at a first wavelength or in a first wavelength band incident from a first angle or angular range.

In one embodiment, the degree or level of absorption in the active region is a light absorbing state with a solar absorption greater than one selected from the group: 0.2, 0.3, 0.4, 0.5, 0.6, 0.7, 0.8, 0.9, 0.94, 0.96, 0.98 and 0.99.

In one embodiment, the active region of the fluid transfer component is a selective solar absorber. Selective solar absorber selectivity is defined as the ratio of solar radiation-absorption to thermal infrared radiation-emission. In one embodiment, the degree or level of absorption in the active region is a selected solar absorber with selectivity greater than one selected from the group: 1, 2, 3, 4, 5, 7, 10, 12, 15, 20, 30, 40, and 50.

In one embodiment the degree or level of absorption in the active region is an absorbing state that absorbs an average of one or more selected from the group 10%, 15%, 20%, 25%, 30%, 35%, 40%, 45%, 50%, 51%, 55%, 60%, 65%, 70%, 75%, 80%, 85%, 90%, 95%, and 99% of the incident light polarized with a first polarization state selected from the group: unpolarized, linearly polarized, s-polarized, p-polarized at 45 degrees, linear polarized at 90 degrees, circularly polarized, left-handed circular polarization, right-handed circular polarization, elliptically polarized, left-handed elliptical polarization, right-handed elliptical polarization, in a first wavelength band or wavelength incident from a first angle or angular range.

The different degrees, levels, or absorbing properties of the light absorbing state include, but are not limited to shifting from a first absorbing wavelength or wavelength band to a second absorbing wavelength or wavelength band different from the first, shifting from a first absorbing incident angle or angular range to a second absorbing incident angle or angular range different from the first, increasing or decreasing the absorption, increasing or decreasing the selective solar absorber selectivity, increasing or decreasing the solar absorption, and changing the polarization state of the light that is absorbed.

For example, in one embodiment, a fluid transfer film comprises an active region comprising fluid channels defined by surfaces comprising a black nickel oxide coating on an stainless steel sheet and a transparent cover film wherein the optical properties of the active region change from a black absorbing state when transparent water is flowing through the channels to a diffusely reflecting white state when a white, diffusely reflecting liquid comprising titanium dioxide nanoparticles and/or microparticles with a dispersing agent is pumped through the channels.

In another example, the active region of the fluid transfer component changes from a first absorbing state with the channels comprising a liquid comprising a red dye to a second absorbing state by flowing a fluid comprising a blue dye into and/or through the channels. In one embodiment, the user, a controller based on sensor information, or the system itself automatically adjusts the level of absorption or color of the active region of the fluid transfer component. In another example, the color of the fluid transfer component or the active region of the fluid transfer component is chosen to match the color a specific surrounding element, such as asphalt shingles for example. In another embodiment, the active region comprises static structures, regions, or areas with a static optical property. In one embodiment, the fluid transfer film comprises lines and/or rectangular sections with a fixed color (such as black, for example) that can resemble a feature in the environment or provide a graphic, image, or other representation in the active region. For example, in one embodiment, a fluid transfer component in a solar thermal system comprises dark lines formed into a material (such as by printing, dyeing, or lamination of a dark or black material) that create the appearance of the edges of shingles such that when the fluid transfer component is positioned on a roof of a home with shingles, the appearance substantially matches the appearance of the roof. In another embodiment, the color of the fluid in one or more channels and/or the visible pattern of the lines or outlines of the shingles is chosen or modified on-site or during production of the fluid transfer component to match the color and appearance of the shingles of roof on the home to which it will be applied.

Light Emitting State

In one embodiment, the active region of the fluid transfer component transitions from a first state to a light emitting state. The active region has a light emitting state when it emits an average of more than 0.5 mW/cm$^2$ at a first wavelength or in a first wavelength band at a first angle or in a first angular range. In one embodiment, the first wavelength or first wavelength band for a light emitting state is a wavelength or wavelength band discussed previously in the light reflecting section. In another embodiment, the first incident angle or first incident angular range is one or more first angles or first angular ranges (discussed for a light reflection state previously in the light reflecting section) for a light emitting plane.

In one embodiment, the active region of a fluid transfer component emits light within an angular range with a full angular width at half maximum intensity in degrees greater than one selected from the group: 0.5, 1, 2, 4, 5, 10, 15, 20, 25, 30, 450, 45, 50, 60, 70, 80, 90, 100, 110, 120, 130, and 140.

In one embodiment, the degree or level of emittance in the active region is a light emitting state that emits a total flux (in Watts) greater than one or more selected from the group: 0.01, 0.1, 1, 5, 10, 20, 30, 40, 50, 75, 100, 200, 300, 500, 1,000, 1,500, 2,000, 3,000, 5,000, and 10,000 in a first wavelength or first wavelength band in a first angle or first angular range.

In one embodiment, the degree or level of emittance in the active region is a light emitting state that emits a total flux (in Lumens) greater than one or more selected from the group: 1, 5, 10, 20, 30, 40, 50, 75, 100, 200, 300, 500, 800, 1,000, 2,000, 3,000, 5,000, 7,000, and 10,000.

In another embodiment, the degree or level of emittance in the active region is a light emitting state that emits an average flux density (in Watts/cm2) greater than one or more selected from the group: 0.01, 0.1, 1, 5, 10, 20, 30, 40, 50, 75, 100, 200, 300, 500, and 1,000 in a first wavelength or first wavelength band.

In another embodiment, the degree or level of emittance in the active region is a light emitting state that emits light such that the outer surface of the fluid transfer component has an average luminance (in Cd/cm$^2$) greater than one or more selected from the group: 0.01, 0.1, 1, 5, 10, 20, 30, 40, 50, 75, 100, 200, 300, 500, 750, 1,000, 1,500, 2,000, 3,000, and 5,000 at a first angle or in a first angular range.

In one embodiment the degree or level of emittance in the active region is a light emitting state that emits an average of one or more selected from the group 10%, 15%, 20%, 25%, 30%, 35%, 40%, 45%, 50%, 51%, 55%, 60%, 65%, 70%, 75%, 80%, 85%, 90%, 95%, and 99% of the light in a first polarization state selected from the group: unpolarized, linearly polarized, s-polarized, p-polarized at 45 degrees, linear polarized at 90 degrees, circularly polarized, left-handed circular polarization, right-handed circular polarization, elliptically polarized, left-handed elliptical polarization, right-handed elliptical polarization, in a first wavelength or first wavelength band into first angle or first angular range.

The different degrees, levels, or emitting properties of the light emitting state include, but are not limited to shifting from a first emitting wavelength or first emitting wavelength band to a second emitting wavelength or second emitting wavelength band different from the first, shifting from a first emittance angular range or first emittance angular range to a second emittance angle or second emittance angular range different from the first, increasing or decreasing the full angular width at half maximum intensity in degrees of the emitted light, increasing or decreasing the total emitted flux, increasing or decreasing the average emitted flux density, increasing or decreasing the luminance at a first angle or in a first angular range, and changing the polarization state of the light that is emitted.

In one embodiment, the light emitted from the active region is due to one or more selected from the group: chemiluminescence, electroluminescence, light emitting diode, semiconductor light emitting devices, organic light emitting diodes, fluorescence, phosphorescence, cathodoluminescence, photoluminescence, bioluminescence, triboluminescence, incandescence, sonoluminescence, mechanoluminescence, radioluminescence, electron stimulated luminescence, and gas discharge. In one embodiment, the fluid comprises a phosphorescent material such as a phosphorescent pigment, the phosphorescent material receives excitation energy in an area outside of the active region, and the fluid flows to the active region such that it emits light in the active region of the fluid transfer component. In one embodiment, an ultraviolet, violet, or blue light source (such as a light emitting diode) excites the phosphorescent material (in the pump or region near the pump, for example) in a fluid transfer system comprising the fluid transfer component and the phosphorescent material emits visible light in the active region of the fluid transfer component when flowed into or while within the fluid channels of the fluid transfer component. In this embodiment, for example, a large, thin light emitting panel can be generated using a fluid transfer component and a fluid comprising a phosphorescent material such as microparticles or nanoparticles of zinc sulfide or strontium aluminate.

Transition Speed

In one embodiment, the transition from the first optical state to the second optical state occurs over a duration less than one selected from the group: 100, 50, 20, 10, 5, 2, 1, 0.5, 0.1, 0.05, 0.01, 0.005, and 0.001 seconds. In one embodiment, the average thickness of the channels in the active region is less than 100 micrometers and the volume of fluid required to flow through the active region to transition from the first optical state to the second optical state is less than one 1 liter. In one embodiment, the average thickness of the channels in the active region of the fluid transfer component is less than 20 microns and the transition duration from a first optical state to a second optical state is less than one second. In another embodiment, the average thickness of the channels in the active region of the fluid transfer component is less than 10 microns and the transition duration from a first optical state to a second optical state is less than 0.5 seconds. In another embodiment, the average thickness of the channels in the active region of the fluid transfer component is less than 5 microns and the transition duration from a first optical state to a second optical state is less than 0.1 seconds.

Supporting Members for Fluid Transfer Film

In one embodiment, the fluid transfer film comprises supporting members including without limitation, protrusions, standoffs, supports, or a surface relief layer that provides support for maintaining separation between two or more surfaces sufficient to enable fluid flow between the surfaces or within a channel at least partially defined by the surfaces. In one embodiment, the supporting members are one or more selected from the group: fibers, protrusions from a surface structured film, spacers, beads, spheres, and flowing solid material disposed within the fluid.

In one embodiment, the supporting members have a high yield strength. In another embodiment, the supporting members are very flexible. In one embodiment, the supporting materials are a thermoplastic, thermoset, or inorganic material.

In one embodiment support members are used to keep a space between two flat-sheet membranes to provide for conveyance of fluid to or from the space between the membranes via a manifold connected to the flat-sheet membrane modules. Support members may be in the form of a permeable mesh designed to keep the membrane module from collapsing under any internal vacuum or external pressure. Alternatively, support layers can be in the form of a paper mesh, a non-woven or a woven-fiber based material. Some examples of support layers are disclosed in U.S. Pat. No. 4,701,234, U.S. Pat. Nos. 3,679,059, 4,871,456, 4,264,447, and European Pat. No. 0,602,560-B1, the entire contents of each is incorporated by reference herein.

Fluid Input and Output Couplers

In one embodiment, the fluid transfer component comprises one or more fluid input couplers positioned on an input side of the fluid transfer component disposed to input the fluid into the active region of the fluid transfer component. In one embodiment, the fluid transfer component comprises one or more fluid output couplers positioned on an output side disposed to receive the fluid from the active region of the fluid transfer component. In one embodiment, the input side or output side is along one or more edges of a fluid transfer film or component. In another embodiment, the input edges and output edges are disposed on opposite sides or edges of the fluid transfer component. The fluid input couplers and fluid output couplers are in fluid communication with one or more channels and one or more fluid flow sources.

In one embodiment, the fluid input coupler or the fluid output coupler may take on essentially any adaptation that enables the fluid to flow to or from the flow source to one or more channels. Fluid input and output couplers include without limitation, manifolds, fluid channel geometry converters, compression couplings, and seals and gaskets that fluidly join a conduit to the flow channels and permit the isolation or partition of regions of higher and lower flow from the surrounding environment. In one embodiment, the input output couplers comprise one or more capillary fibers, for example, less than 10 micrometers in inner diameter, each in fluid communication with an individual channel to allow individual fluids to flow discretely through separate channels. The input or output coupler could also be a molded chamber(s), a microstructured fluid conduit integrally or non-integrally disposed relative to the discrete flow channels, or a system or mechanism that allows the discrete microstructured flow channels to be seated in a centrifuge or that allows a flow stream such as a jet to be directed at channel inlets or outlets.

Manifold Coupling

In one embodiment, the fluid input coupler or the fluid output coupler comprises a manifold coupler. In one embodiment, the manifold coupler is in fluid communication with one or more fluid channels and is in fluid communication with one or more flow sources.

In one embodiment, the manifold coupler comprises a plenum that is defined internally therein and which is in fluid communication with fluid channels. In one embodiment, the plenum may simply comprise a chamber within the manifold that is operatively connected to at least a plurality of the channels. The manifold coupler may be flexible, semi-rigid, rigid, or have substantially the same flexibility (or Young's modulus) as the fluid transfer component or active region of the fluid transfer component. In one embodiment, the manifold coupler comprises a pipe or tube with a slit or one or more discrete openings along at least one edge through which one or more edges of the fluid transfer component extend into the pipe, film, or tube, and an adhesive or sealant between or covering the seam between fluid transfer component and the tube or pipe wall.

Fluid Channel Geometry Converter

In one embodiment, the fluid transfer system comprises one or more fluid channel geometry converter input or output couplers. A fluid channel geometry converter coupler comprises one or more segments or regions of the fluid transfer component comprising fluid channels (into strips, for example) that are physically separated, folded or bent, and stacked to form a fluid input end comprising a plurality of layers comprising fluid flow channels in a geometry different from within the active region of the fluid transfer component. In one embodiment, the fluid channel geometry converter input or output coupler converts a geometrical arrangement of channels arranged in a first and second direction to a second geometrical arrangement with less channels in the first direction and more channels in the second direction. In one embodiment, the first direction is parallel with the transverse direction or machine direction of a web-based manufactured film and the second direction is the thickness direction of the film wherein the film comprises surface relief features that define one or more surfaces of one or more channels or supporting members in a fluid transfer component.

In one embodiment, a fluid transfer system comprises a fluid channel geometry converter wherein the total cross-section of the area of the channels comprising a fluid (or operatively configured to comprise a fluid during operation) is the same as the cross-sectional area of the channels at the input end or output end of the fluid channel geometry converter. In another embodiment, a fluid transfer system comprises a fluid transfer component comprising a fluid channel geometry converter and the flow path through one or more channels from a supply line (such as a tube or pipe) to the active region of the fluid transfer component or the flow path through one or more channels from the active region to the return line (such as a tube or pipe) does not comprises any right angle bends, elbows, or angled planar surface bends in the flow path. In another embodiment, a fluid transfer system comprises a fluid transfer component comprising a fluid channel geometry converter and the flow path through one or more channels from a supply line (such as a tube or pipe) to the active region of the fluid transfer component or the flow path from the active region to the return line (such as a tube or pipe) does not comprise an expanding and/or contracting cross-section. In another embodiment the cross sectional dimension of the flow path channels does not expand or contract in a first cross sectional plane. In another embodiment, the cross-sectional plane is orthogonal to the direction of the fluid flow. In a further embodiment, the cross-sectional plane is parallel to the direction of the fluid flow.

For example in one embodiment, a fluid transfer film 1 meter by 1 meter in size comprises fluid channels formed from a surface relief profile in the form of a linear array of 10,000 prismatic lenses with the length of the prisms in the x direction. A cover sheet is adhered to the top surface of the prismatic lenses and the surface of the cover sheet or adhesive in combination with the top surface of the prismatic lenses defines individual channels within the regions between the intersection of adjacent prisms and the cover sheet (or adhesive) to form a fluid transfer film with a thickness of 200 micrometers and an array of about 1×10,000 fluid channels. The fluid transfer film is cut near an input side and near an output side into 50 strips parallel to the x axis that are each 10 centimeters long and 2 centimeters wide extending from the active region of the fluid transfer film on the input side and output side of the film and contain about 200 channels each. The input strips are folded 90 degrees such that their ends are aligned to form an input region with a fluid channel geometric arrangement different from the fluid channel geometric arrangement of the active region of the fluid transfer film and cut in the thickness direction to form an input end. In this example, the input region is 2 centimeters wide in the x direction (since the strips are folded 90 degrees the prisms are now oriented orthogonal to the x direction) and has a dimension of 10 millimeters in the transverse flow direction (thickness direction of the film) and comprises a fluid channel geometric arrangement of 50×200 channels. Similarly, the output strips are folded and aligned to create an input region 2 centimeters wide in the x direction and has a dimension of 10 millimeters in the transverse flow direction (thickness direction of the film) comprising geometric arrangement of 50×200 fluid channels. In this simplified example, the possible loss of definition of one or more channels at the edges of the film or at the edges of the strips due to cutting are not taken into account for simplicity. It is understood that in some embodiment, the cutting or separating of the strip regions or segments of the film and/or fluid transfer component may open up one or more channels such that they are not well defined and/or not usable for effective fluid flow for the application.

By using continuous fluid channels without sharp corners, bends or sharp radii of curvature, the flow resistance or drag of a fluid channel geometry converter input or output coupler is reduced relative to a manifold input or output coupler. Furthermore, using channels with a constant cross-sectional shape in the direction of the flow from the input to the active region and/or from the active region to the output end, spurious currents, flows, or vortices that increase the resistance of the flow can be reduce or eliminated. The level of flow resistance can be calculated based on the coefficient of flow resistance. The channel contraction coefficient of flow resistance, $K_{cont}$, is defined herein by the equation:

$$K_{cont} = k_1 \left(1 - \frac{A_a}{A_i}\right)^{.75}$$

where $k_1$ is a geometry coefficient and may be for example 0.5, $A_i$ is the cross-sectional input area of a channel in at the input end of a fluid input coupler and $A_a$ is the cross-sectional area of the corresponding channel in the active region. One can see that for the case of a fluid channel geometry converter type fluid input coupler where one or more cross-sectional dimensions of the channel can be constant, (i.e. the cross-sectional dimension in a plane does not change from the input end of the fluid input coupler and the active region for a channel) the channel cross-sectional shape can be continuous, and not change in size (in a plane such as a plane orthogonal to the direction of fluid flow) as the collective geometric arrangement of the channels changes. Since in this example, the channel size does not change, the ratio $$\frac{A_a}{A_i}$$

is 1 and the channel contraction coefficient of flow resistance is 0. In the case of a manifold-based fluid input coupler, where a there are smaller channels fluidly coupled to a single larger channel or pipe or tube, the channel contraction coefficient of flow resistance is greater than 0 as the channel geometry is converted from a single channel to 1 by 500 channels, for example and the cross sectional area of a channel decreases from the input end to the active region. Similarly, the average channel contraction coefficient of flow resistance for a plurality of channels may also be zero for a fluid channel geometry converter fluid input coupler and the average channel contraction coefficient of flow resistance for a plurality of channels in a manifold-based fluid input coupler is greater than zero.

In one embodiment, a fluid transfer system comprises a fluid transfer component and a fluid channel geometric converter fluid input coupler with a geometry coefficient of 0.5, and the coefficient of flow resistance, $K_{cont}$, due to the change in geometry of the channels (or absence thereof) is zero, or less than one or more selected from the group: 0.5, 0.4, 0.3, 0.2, 0.1, 0.05, and 0.01.

The channel expansion coefficient of flow resistance in one plane, $K_{exp}$, is defined herein by the equation:

$$K_{exp} = k_1 \left(1 - \frac{A_a}{A_o}\right)^2$$

where $k_1$ is a geometry coefficient and may be for example 0.5, $A_o$ is the cross-sectional output area of a channel at the output end of a fluid output coupler, and $A_a$ is the total cross-sectional area of the corresponding channel in the active region. One can see that for the case of a fluid channel geometry converter type fluid output coupler where one or more cross-sectional dimensions of the channel can be constant, (i.e. the cross-sectional dimension in a plane does not change from the active region to the end of the fluid output coupler for a channel) the channel cross-sectional shape can be continuous, and not change in size (in a plane such as a plane orthogonal to the direction of fluid flow) as the collective geometric arrangement of the channels changes. Since in this example, the channel size does not change, the ratio $$\frac{A_a}{A_o}$$

is 1 and the channel expansion coefficient of flow resistance is 0. In the case of a manifold-based fluid output coupler, where a there are smaller channels fluidly coupled to a single larger channel or pipe or tube, the channel expansion coefficient of flow resistance is greater than 0 as the channel geometry is converted from 1 by 500 channels to a single larger channel, for example, and the cross sectional area of a channel increases from the active region to the output end of the fluid output coupler. Similarly, the average channel expansion coefficient of flow resistance for a plurality of channels may also be zero for a fluid channel geometry converter fluid output coupler and the average channel expansion coefficient of flow resistance for a plurality of channels in a manifold-based fluid output coupler is greater than zero.

In one embodiment, a fluid transfer system comprises a fluid transfer component and an output coupler with a geometry coefficient of 0.5, and the coefficient of flow resistance, $K_{exp}$, due to the change in geometry of the channels is zero, or less than one or more selected from the group: 0.5, 0.4, 0.3, 0.2, 0.1, 0.05, and 0.01.

In one embodiment, a fluid transfer system comprises a fluid transfer component, an input coupler, and an output coupler wherein there are zero or less than one selected from the group of 6, 5, 4, 3, 2, and 1 right angle bends in the fluid path between the input region and the output region.

In one embodiment, a fluid transfer system comprises a fluid transfer component, an input coupler, and an output coupler wherein the total coefficient of flow resistance from the input region to the output region is less than one selected from the group: 0.9, 0.8, 0.7, 0.6, 0.5, 0.4, 0.3, 0.2, 0.1, 0.05, and 0.01.

In one embodiment, the fluid channel geometry in a fluid transfer system comprising an array of (1×N) channels in the active region of a fluid transfer component is converted to a (M×P) geometry at the input region or output region (corresponding to the channels in the active region of the fluid channel geometry converting input coupler or output coupler, respectively) where M×P=N; and M and P are greater than 1. In another embodiment, the fluid channel geometry in a fluid transfer system comprising an array of (1×N) channels in the active region of a fluid transfer component is converted to geometric arrangement of (N/C×C) channels where C is an integer at the input or output region of a fluid channel geometric converter input coupler or output coupler, respectively. In a further embodiment, the fluid channel geometry in a fluid transfer system comprising an array of (M×N) channels in the active region of a fluid transfer component (where M and N are integers) is converted to geometric arrangement of (C·M×N/C) channels where C is an integer greater than 1 at the input or output region of a fluid channel geometric converter input coupler or output coupler, respectively. For example, in one embodiment, the fluid channels are arranged in a 4×100 matrix in the active region and at the input end of a fluid channel geometry converter the fluid channels are arranged in a 20×20 matrix.

In another embodiment, the fluid channel geometric converter spatially transforms the positions of the one or more ends of two or more channels of a fluid transfer component. In another embodiment, the fluid channel geometry converter is an integrally formed extension of the channels in the active region configured to convert the geometric arrangement of the fluid channels. For example, in one embodiment, the fluid channel geometry converter is integrally formed from a region of a film comprising fluid channels where along one side of the film a portion of the film is separated into strips that are folded and stacked.

In one embodiment, the edges along the sides of the strips are sealed to prevent fluid from escaping from the edges. In another embodiment, the rear surface of one strip forms the top surface for one or more channels in the strip regions. In another embodiment, the surface relief profile of the fluid transfer film does not extend into the strip regions. In another embodiment, the sides (lateral edges) of the strips are sealed (welded together) during the cutting process (such as by using a carbon dioxide laser to cut the strips).

In another embodiment, the radius of curvature of the bend in the strips for the input coupler and/or output coupler is less than one selected from the group: 5 cm, 2 cm, 1 cm, 5 mm, 2 mm, 1 mm, 0.5 mm, 0.2 mm, and 0.1 mm.

In one embodiment, the fluid in one channels mixes with the fluid in one or more other channels in one or more selected from the group: the active region, the input coupler, the output coupler, the flow source, a component between the flow source and the input coupler, and a component between the output coupler and the flow source. In another embodiment, a fluid transfer system comprises a fluid transfer component, a fluid input coupler, and a fluid output coupler wherein the flow from the channels within the active region do not mix with each other from the input region of the fluid input coupler to the output region of the fluid output coupler.

In one embodiment, the channels near the strip cuts in the input region and/or output region are sealed at the input region surface or the output region surface. By sealing channels (such as one or two columns of channels) near the cut edges on the input end, the fluid does not flow through these outer channels and does not leak out the lateral sides of the strips (thus alleviating the need to seal the edges of the strips). The channels near the cut edges at the input or output region of the input our output coupler may be sealed by one or more selected from the group: adhering a sealant covering the channels, adding an epoxy covering the channels, adhering a blocking gasket to the region, thermally sealing the channel entrances by melting, plugging with a component, and backfilling and sealing from within the channels with a curable or thermoset material.

In another embodiment, a fluid transfer system comprises one or more fluid connectors, such as a tube or pipe transferring the fluid from the flow source to one or more input or output couplers. In one embodiment, the fluid connectors comprise an exit area that is smaller than the area comprising the channels extending into the active region and when in fluid communication with the input or output region does not transfer fluid into the channels near the edges of the input region or output region.

In one embodiment, the fluid connector is coupled to the input region and/or output region of the fluid channel geometry converting input coupler or output coupler, respectively and the seal for fluid is provided by a heat shrink tubing around the fluid connector and the coupler or by placing the input region and/or output region within the fluid connector (such as a pipe or tube) and sealing and/or adhering with a sealant, epoxy, or adhesive. In one embodiment, the width of the strips cut for fluid channel geometry converter vary such that when the strips are stacked with their centers aligned or an edge aligned, the shape of the cross-section of the stack substantially fills an non-rectangular supply or return pipe, line, tube, or hollow material. For example, in one embodiment, the strips are cut with their width increasing from an edge toward the center and decrease from the center to the opposite edge along the input side and/or output side of the active region of the fluid transfer component. In this embodiment, when the strips are stacked and folded, they can form a stack with an outer cross-section in the form of a polygon with more than 4 sides that occupies more area of the circular flow path in a pipe with a circular inner surface cross-section.

In one embodiment, the pressure of the fluid in a channel remains substantially constant from the input coupler, through the active region and through the output coupler. In another embodiment, the input coupler and output coupler of a fluid transfer component are fluid channel geometry converters and the pressure of the fluid flowing through the fluid transfer component is substantially constant.

In one embodiment, the ratio of the pressure of the transfer fluid after having just entered a channel (say less than 5 millimeters from the input end, for example) at the entrance to a fluid channel geometry converter fluid input coupler to the pressure of the fluid in the same channel in the active region of the fluid transfer component is one selected from the group 0.5 to 1, 0.6 to 1, 0.7 to 1, 0.8 to 1, 0.9 to 1, 0.95 to 1, 0.98 to 1, 0.99 to 1 and 1 at 25 degrees Celsius or a first operating temperature or temperature range. In another embodiment, the ratio of the pressure of the transfer fluid in a channel in the active region of the fluid transfer component to the pressure of the fluid in the same channel just before exiting the fluid channel geometry converter fluid output coupler (say less than 5 millimeters from the output end, for example) is one selected from the group 0.5 to 1, 0.6 to 1, 0.7 to 1, 0.8 to 1, 0.9 to 1, 0.95 to 1, 0.98 to 1, 0.99 to 1 and 1 at 25 degrees Celsius or a first operating temperature or temperature range. In a further embodiment, the ratio of the pressure of the transfer fluid after having just entered a channel (say less than 5 millimeters from the input end, for example) at the entrance to a fluid channel geometry converter fluid input coupler to the pressure of the fluid in the same channel just before exiting the fluid channel geometry converter fluid output coupler (say less than 5 millimeters from the output end, for example) is one selected from the group 0.5 to 1, 0.6 to 1, 0.7 to 1, 0.8 to 1, 0.9 to 1, 0.95 to 1, 0.98 to 1, 0.99 to 1 and 1 at 25 degrees Celsius or a first operating temperature or temperature range.

In one embodiment, using input and output fluid channel geometry converters reduces the pressure required to couple from a single supply line, pipe, or tube fluid into multiple channels within an active region, flow the fluid through the channels in the active region, and couple the fluid out of the channels into a single return line, pipe, or tube. In addition, the surface feature defining the channel and/or coatings affecting the wettability of the surfaces of the channels can reduce the pressure require for fluid flow and transfer. By reducing the pressure required, the walls of the channels may be made thinner while avoiding rupture. By making the walls thinner, the input coupling efficiency and output coupling efficiency can be increased in a fluid channel geometry converter since the fluid from a supply line, pipe, or tube encounters a lower surface area cross-section of the channel-defining walls, and the flow resistance due to contraction of the fluid flow at the fluid input coupler is less than it would be with larger wall thickness. Similarly, the fluid flow resistance due to expansion would be less with thinner walls at the fluid output coupler.

Coupling to Other Layers or Components

In one embodiment, the fluid transfer component or a layer thereof is operatively coupling to a light absorbing layer, a light reflecting layer, a support, a film, a housing, a membrane, a foil, a device, or another component of the fluid transfer system, by lamination, co-extrusion, insert molding, film insert molding, vacuum forming, thermoforming, coating, adhering or physical bonding.

Physical Connectors

In one embodiment the fluid transfer component comprises one or more physical connectors to physically couple the fluid transfer component to one or more other fluid transfer components, components of the fluid transfer system, components of a different fluid transfer system, a device, a structure such as a building, a component of a building, roof of a building, an inner wall surface of a building, an outer surface of a building, a vehicle or a component of a vehicle (such as a roof, dash, upholstery, seat, fender, hood, outer surface, or inner surface of a land craft, aircraft, spacecraft, car plane, tank, helicopter, armored vehicle, etc.). In one embodiment, the physical connector comprises one or more selected from the group: pipe with a clamp, tube with a clamp, anchor bolt, batten, brass fastener, buckle, button, cable tie, captive fastener, clamp (or cramp), hose clamp, clasps, Bocklebee Clasp, lobster clasp, cleko, clips, circlip, hairpin clip, paper clip, terry clip, clutch, drawing pin (thumbtack), flange, frog, grommet, hook-and-eye closure, latch, nail, pegs, clothespin, tent peg, PEM nut, pins, bowtie cotter pin, circle cotter, clevis fastener, cotter, dowel, linchpin, R-clip, split pin, spring pin, tapered pin, retaining rings, circlip, e-ring, rivet, rubber band (or bands of other materials), screw anchor, snap fastener, staple, stitches, strap, threaded fastener, captive threaded fasteners, nut, screw, threaded insert, threaded rod, tie, toggle bolt, treasury tag, twist tie, hook-and-loop strips, wedge anchor, and zipper.

Piping or Fluid Flow Connectors or Couplers

In one embodiment, the fluid transfer component comprises one or more input or output connectors, pipes, hoses, tubes, fluid conveyors, or fluid carrying extensions that connect the fluid flow in one or more channels of the first fluid transfer component to one or more channels in a second fluid transfer component. For example in one embodiment, a first roofing shingle comprises a first fluid transfer component and an output pipe to connect into an input pipe connector of a second fluid transfer component of a second roofing shingle to create a fluid transfer system with two or more fluidly connected roofing shingles comprising two or more fluidly connected channels within fluid transfer components of the two or more roofing shingles. In another embodiment, a first fluid transfer component comprises two or more fluid input couplers or two or more fluid output couplers and the first fluid transfer component comprises two or more connectors to fluidly couple the two or more fluid input couplers or two or more fluid output couplers to the corresponding input or output couplers of a second fluid transfer element. In one embodiment, a fluid transfer component comprises a first input coupler fluidly coupled to the active region and a second input coupler fluidly connected to a channel that flows through the fluid transfer element to the output coupler without passing through the active region. For example, in one embodiment, a roofing shingle or solar thermal device comprises a fluid transfer component with three fluid input couplers and three fluid output coupler. In this example, the first fluid input coupler is fluidly connected to the channels in the active region of the fluid transfer component and the second and third input couplers are positioned to receive a fluid supply from a first and second side of the four sided shingle and direct fluid flow to the second and third fluid output coupler on the third and fourth sides of the shingle without passing through the active region. In this example, the shingle can be fluidly coupled and/or attached to shingles with other similar fluid transfer components on all four sides and if the shingle is damaged in the active region, the fluid can still pass through the damaged shingle to supply the other shingles (above it, below it, or further along the fluid path from it, for example) without requiring the fluid to flow in a pipe exterior to the shingle. In this embodiment, the fluid transfer components are effectively daisy chained or fluidly connected to other fluid transfer components in a serial and/or parallel fashion and can be analogous to holiday light strings where when one light bulb goes out, the others remain active and working. In this example, the fluid transfer component in the damaged shingle may optionally have a fluid safety valve operatively coupled to a detector that detects the damaged shingle (such as by optical, electrical, fluid pressure, or other means) and shuts off the liquid flow to the active region to prevent leakage. In one embodiment, the shutoff can be automatic and controlled by a fluid transfer system controller or powered and/or controlled by the shingle (such as with a shingle comprising a photovoltaic cell) or is automatic using pressure valves within the fluid transfer component without using electricity.

Transfer Fluid

In one embodiment, the fluid transfer system comprises one or more fluids in fluid communication with the fluid transfer component.

In one embodiment, one or more of the transfer fluids comprises one or more selected from the group: liquid, gas, air, nitrogen, carbon dioxide, helium, oxygen, oil, liquid state polymer, liquid crystalline polymer, gel, water, silicone fluid, heat transfer fluids, glycol, ethylene glycol, propylene glycol, ethanol, salt brine, sodium chloride water, calcium chloride solution, halocarbon, methylene chloride, trichloroethylene, hydrofluoroether, perfluoropolyethers, low molecular weight perfluoropolyether (PFPE), perfluorocarbon ether, diethyl benzene, alkylated benzene, Paraffinic type aliphatic hydrocarbons, iso-paraffinic aliphatic hydrocarbons, terpenes, d-limonene, dimethyl polysiloxane, silicone oil, R-11, colloids, organic solutions, emulsions, organic solvents, PFC, PFHC, liquid-state epoxy resin, glycerin, propylene carbonate, petroleum based heat transfer fluids, synthetic heat transfer fluids, naphthalene, proprionic acid, and xylene.

In one embodiment, the transfer fluid comprises one or more fluids selected from the group: include DOW 200, a polydimethylsiloxane polymer available from Dow Corning, polydimethylsiloxane fluids available from Gelest Corporation such as trimethylsiloxy terminated fluids DMS-T00, DMS-T01, DMS-T01.5, DMS-T02, DMS-T03, DMS-T05, DMS-T07, DMS-T11; cyclomethicone such as SIO6700.0, SID2650.0, SID4625.0 (also known as D4, D5, and D6 fluids, respectively); phenylmethylsiloxanes such as PMM-0011, PDM-7040; fluorosilicones such as SIB1816.0; polydiethylsiloxanes such as DES-T03, DES-T11; branched and low viscosity phenyltris(trimethylsiloxy)silane fluids such as SIP6827.0, phenethyltris(trimethylsiloxy)silane fluids such as SIP66722.8, and the like.

In another embodiment, the transfer fluid comprises one or more fluids selected from the group: Dupont Syltherm XLT, General Electric SF-96-50, Fluka UV-grade mineral oil, phenyl-xylyl-ethane (PXE), linear alkylbenzene (LAB), isopropyl-biphenyl (IPB), aqueous solutions of inorganic salts, polyhydric alcohols such as ethylene glycol and glycerine, silicone oils such as polydimethylsiloxane and polyphenylmethylsiloxane, hydrocarbons such as polyethers, polyesters, and liquid paraffin, halogenated hydrocarbons such as trifluorinated ethylene chloride oil, phosphates such as tris(chloroethyl) phosphate and trioctyl phosphate, solutions of polymers diluted with suitable solvents, tetrachloroethylene, bromoform, bromo-trichloromethane, α-fluoronaphthalene, α-bromonaphthalene, para-isopropylaniline, methyl diphenyl phosphate, dimethyl phthalate, diethyl phthalate, clorotrifluoroethylene (such as fluorolube, daifloil, voltalef, halocarbon CTFE), dichloromethane (methyline dichloride), hexachlorobutadiene, methyl butyl carbonate, hyvis (polybutene), mineral oil such as Marcol 82, therminol D-12 or VP-1, trimethyl propane polyol ester, butylated terphenyl, penta arithritol polyol ester, combed long chain polyol, tri xylyl phosphate ester, isopropyl phosphate ester, dimethylpolysiloxane, polyphenylmethylsiloxane (phenyltrimethacone), silicone glycol copolymer (dimethacone copolyol), methyl alkyl polysiloxane, silicone elastomer, polychlorophenylmethylsiloxane, fluorosiloxane, esters such as polyols, silahydrocarbons phthalate esters, phosphazenes, phosphate esters, dialkylcarbonates, polyalkylene glycols, cycloaliphatics, alkylated aromatics, polybutenes, perfluoroalkylpolyethers, a methylcyclohexane/trimethylpentane mixture, a synthetic hydrocarbon, an alkyl substituted aromatic hydrocarbon, an isopropyl biphenyl mixture, a modified terphenyl, a terphenyl/quaterphenyl mixture, a biphenyl/diphenyl oxide (DPO) eutectic mixture, a phenylcyclohexane and bicyclohexyl mixture, a white mineral oil, sodium chloride solution, calcium chloride solution, potassium chloride solution, ammonium chloride solution, and sodium nitrate solution.

In one embodiment, a transfer fluid in a fluid transfer system comprises two or more compatible liquids mixed to produce a liquid with a required refractive index or transmission band. For example, dimethylpolysiloxane is soluble in tetrachloroethylene in all proportions, so a core liquid may be produced from any combination of these two fluids.

In some embodiments, silicone fluids are used as they are very stable, transmit a wide range of wavelengths, and, in most cases, are not toxic or have very low toxicity. The fluids named above are examples only. There are a large number of other materials in the abovementioned categories that may have the right combination of properties to be selected for specific purposes.

Other suitable liquids may include liquids developed in recent years for such purposes as heat transfer fluids, hydraulic fluids, etc. These fluids are collectively called Synthetic Lubricants and High-Performance Functional Fluids, and each class can contain large numbers of individual members.

Transfer Fluid Properties

In one embodiment, the transfer fluid has a viscosity less than one selected from the group: 5, 4, 3, 2, 1.5, 1.4, 1.3, 1.2, 1.1, 1, 0.95, 0.9, 0.85 and 0.8 centistokes at 20 degrees Celsius. In another embodiment, the transfer fluid has a viscosity less than one selected from the group: 5, 4, 3, 2, 1.5, 1.4, 1.3, 1.2, 1.1, 1, 0.95, 0.9, 0.85 and 0.8 centistokes at 50 degrees Celsius. In one embodiment, the fluid transfer system comprises a first transfer fluid with a first density and a second transfer fluid with a second density higher than the first density. In this embodiment, for example, using valves in fluid communication with a reservoir comprising the first and second fluids, the fluids will separate themselves naturally and depending on the desired fluid, the fluid may be pumped from the top or bottom of the reservoir. In this embodiment, only one reservoir may be needed. For example, in one embodiment the first fluid is air and the second fluid is water. In another example, the first fluid is silicone fluid and the second fluid is water. In one embodiment, the first and second fluids are immiscible.

In one embodiment, the fluid transfer system comprises sealed channels in fluid communication wherein when the fluid within the channels in the active regions absorbs heat it undergoes a phase change. In one embodiment, the fluid transfer component is the heat exchange or heat receiving element of a heat pipe type heat transfer system. In one embodiment, the fluid flows by capillary action in one or more selected from the group: to the active region, within the active region, within the channels, away from the active region, to the flow source, away from the flow source, within the input coupler, within the output coupler, and within the strips of a fluid channel geometry converter input or output coupler. Examples of micro-fluid heat pipes are disclosed in U.S. Pat. Nos. 7,334,630 and 7,331,378, the entire contents of each are incorporated by reference herein.

In one embodiment, the transfer fluid is a magnetic fluid. In another embodiment, the magnetic transfer fluid flows by magnetic propulsion.

Transfer Fluid Thermal Properties

In one embodiment, the thermal expansion coefficient of the material forming one or more of the inner surfaces of one or more channels substantially matches the thermal coefficient of expansion of the transfer fluid. In another embodiment, the ratio of the thermal expansion coefficient of the material forming one or more of the inner surfaces of one or more channels to the thermal coefficient of expansion of the transfer fluid is one or more selected from the group 0.5 to 1.5, 0.6 to 1.4, 0.7 to 1.3, 0.8 to 1.2, 0.9 to 1.1, 0.95 to 1.05, 0.98 to 1.02 0.99 to 1.01 and 1 over a first temperature range. In one embodiment, the temperature range is one selected from the group–195 to 300, –100 to 200, –100 to 150, –50 to 100, 0 to 100, and –20 to 150, 0, 23, and 100 degrees Celsius at a pressure of 101.325 kilopascals.

In one embodiment the vapor pressure of the transfer fluid is less than one selected from the group 6 MPa, 1 MPa, 500 kPa, 100 kPa, 50 kPa, 10 kPa, 5 kPa, 1 kPa, 500 Pa, 200 Pa, and 100 Pa at 20 degrees Celsius. In another embodiment the vapor pressure of the transfer fluid is greater than one selected from the group 6 MPa, 1 MPa, 500 kPa, 100 kPa, 50 kPa, 10 kPa, 5 kPa, 1 kPa, 500 Pa, 200 Pa, and 100 Pa at 20 degrees Celsius.

In one embodiment, the freezing point of the transfer fluid is less than or equal to one selected from the group 0, –10, –20, –30, –40, –50, –60, –80, –90, –100, –120, –130, –140, –150, –160, –170, –180, –190, –200, –210, –220, and –230 degrees Celsius at a pressure of 101.325 kilopascals.

In one embodiment, the fluid is a salt solution with a high specific heat capacity.

Transfer Fluid Optical Properties

In one embodiment, the optical properties of the transfer fluid is one or more selected from the group: light reflecting, light scattering, light absorbing, light transmitting, and light emitting. These optical properties are discussed with respect to the active region in the active region optical properties section and the optical properties, levels, and degrees of the optical properties discussed with respect to the active region may be the properties of the transfer fluid. For example, in one embodiment, the degree or level of reflectance of the transfer fluid is one or more selected from the group 10%, 15%, 20%, 25%, 30%, 35%, 40%, 45%, 50%, 51%, 55%, 60%, 65%, 70%, 75%, 80%, 85%, 90%, 95%, and 99% of the incident light in a first wavelength or first wavelength band incident from a first angle or first angular range. In another embodiment, transfer fluid it redirects incident light of a first wavelength or first wavelength band from a first angle or first angular range such that the light has one or more properties selected from the group: the light incident from a first angle or first angular range is redirected to a second angle or second angular range different from the first angle or first angular range; the light incident from a first angle is redirected to an angular range with a full angular width at half maximum intensity in degrees greater than one selected from the group: 0.5, 1, 2, 4, 5, 10, 15, 20, 25, 30, 450, 45, 50, 60, 70, 80, and 90 when measured using laser light of the first wavelength with a divergence less than 5 milliradians; the transfer fluid has an ASTM D1003 haze greater than one selected from the group of 0.3%, 0.5%, 1%, 3%, 5%, 10%, 20%, 30%, and 40%. In another example, the transfer fluid absorbs an average of more than 5% of the incident light of a first wavelength or first wavelength band incident from a first angle or first angular range when it is a thickness at the average channel thickness within the film transfer component.

In one embodiment the refractive index of the transfer fluid is one selected from the group: 1-1.3, 1.3-2.9, 1.3-1.7, 1.33-1.7, 1.5-1.7, 1.6-1.7, and 1.7-2.9.

In one embodiment, the fluid comprises a mixture of two materials that are immiscible in a first temperature range and miscible in a second temperature range. In one embodiment, the mixture of fluids are a single phase at a first temperature range and the phases separate at a second temperature range. For example, in one embodiment, the transfer fluid is a mixture of cyclohexane and aniline. Aniline and cyclohexane are immiscible over a wide range of compositions below about 35 degrees Celsius. At temperatures below about 35 degrees Celsius, the phases can separate and scatter light. The scattering can increase such that the mixture becomes opaque. This phenomenon is called critical opalescence. Similarly, binary fluid mixtures of methanol and cyclohexane; perfluorotributylamine and isopentane; a saturated paraffin and beta, beta'-dichloroethyl ether or chlorex as the other liquid also exhibit this property. This dynamic optical property can be utilized, for example, in application where the one desires a component comprising the fluid mixture to become more cloudy, hazy, or reflectively scatter light below a first indication temperature. In another embodiment, the fluid is light absorbing and comprises a solvent such propylene carbonate or propylene carbonate and a light absorbing dye such as a 1,2-chrome complex dye or a phthalocyanine dye. The fluid may also comprise a UV stabilizer.

Transfer Fluid Additives

In one embodiment, the transfer fluid comprises one or more additive selected from the group: monohydroxy and polyhydroxy compounds, thixotropic agents, plasticizers, toughening agents, pigments, fillers, abrasive granules, stabilizers, light stabilizers, antioxidants, flow agents, bodying agents, flatting agents, colorants, dyes, pigments, binders, blowing agents, fungicides, bactericides, surfactants, glass and ceramic beads, organic and inorganic fibers, flakes, particles, microspheres, nanospheres, hollow microspheres, hollow nanospheres, non-biodegradable surfactant, fluorescent dyes or pigments, phosphorescent dyes or pigments, quantum dots, viscosity modifiers, solvents, and hydrocarbons.

In one embodiment, the average length of the additive particles, domains, or flakes in one or more direction is less than one selected from the group 2 mm, 1 mm, 0.5 mm, 0.25 mm, 0.1 mm, 50 micrometers, 25 micrometers, 20 micrometers, 15 micrometers, 10 micrometers, 5 micrometers, 2 micrometers, 1 micrometer, 0.5 micrometer, 0.2 micrometer, 0.1 micrometer, and 50 nanometers. In one embodiment, the shape or a component of the shape of the additive particles, domains, or flakes is one or more selected from the group: planar, spherical, ellipsoidal, cylindrical, tubular, hollow, fibrous, asymmetric, randomly shaped, pyramidal, and polyhedral. In one embodiment the concentration of the additive is less than one or more selected from the group of 0.001, 0.01, 0.1, 0.5, 1, 2, 5, 7, 10, 15, 20, 25, 30, 35, 40, and 50 percent by volume or weight. In one embodiment the concentration of the additive is greater than one or more selected from the group of 0.001, 0.01, 0.1, 0.5, 1, 2, 5, 7, 10, 15, 20, 25, 30, 35, 40, and 50 percent by volume or weight. In one embodiment, the average largest dimension or average size of the particles within the transfer fluid is less than one selected from the group 70%, 60%, 50%, 40%, 30%, 20%, 10%, 5%, and 2% the smallest or average channel dimension through which the transfer fluid flows. By having particles that are significantly smaller than the channels, the likelihood of one or more particles clogging a channel is reduced.

In one embodiment, the fluid transfer component comprises additives that increase the thermal transfer or thermal conductivity of the fluid. In one embodiment, the fluid comprises a ceramic material that is at least partially translucent in its sintered state. Examples of such ceramic materials include poly crystalline alumina ($Al_2O_3$), aluminium nitride (AlN), yttrium aluminium garnet ($Y_3Al_5O_{12}$, also called YAG) and luminescent ceramic materials like cerium doped yttrium aluminium garnet ($Y_3Al_5O_{12}$:Ce). These ceramic materials are translucent to transparent materials that additionally have a high thermal conductivity, which provides good heat transfer properties.

In one embodiment, the transfer fluid, a coating on a surface of the fluid transfer component or a layer thereof, the material defining one or more channels, or a surface of one or more channels comprises a surfactant. In one embodiment, the surfactant is selected from the group: potassium palmitate, oleate, stearate blend, cetyl pyridinium chloride, coconut oil derivative, and a surfactant such as disclosed in U.S. patent application publication no. US20050084681, the entire contents are incorporated by reference herein.

In one embodiment, the transfer fluid is a salt-bearing solution and comprises salts such as chlorides or phosphates. For example, in one embodiment, the transfer fluid is a liquid comprising $CaCl_2$ in water or $NaH_2PO_4$ in water.

In one embodiment, the transfer fluid comprises one or more luminescent materials selected from the group: bioluminescent materials, chemiluminescnet materials, electroluminescent materials, crystalloluminescent materials, cathodoluminescent materials, chemiluminescent materials, electrochemiluminescent materials, crystalloluminescent materials, electroluminescent materials, cathodoluminescent materials, mechanoluminescent materials, triboluminescent materials, fractoluminescent materials, piezoluminescent materials, photoluminescent materials, fluorescent materials, phosphorescent materials, radioluminescent materials, sonoluminescent materials, and thermoluminescent materials. For example, in one embodiment, the transfer fluid comprises a luminescent material and emits light when exposed to solar radiation. In another embodiment, the transfer fluid comprises wavelength conversion dyes or particles such as fluorescing dyes or pigments, fluorophores, quantum dots, phosphors, phosphorescent materials, photon upconversion materials, and photonic bandgap materials.

In one embodiment, the transfer fluid comprises particles that absorb a specific wavelength range of incident light. For example, in one embodiment, the transfer fluid comprises carbon black particles at a concentration of 0.1-40% by weight per the solution. In this example, the transfer fluid may comprise surfactants from 0.5-50% by weight of the total weight of the carbon black particles or other particles. The transfer fluid may comprise light absorbing particles that absorb more than a first average absorption percentage of incident light in the first wavelength or the first wavelength band as discussed previously in the light reflecting section, except in this context for absorbing particles. Similarly, the transfer fluid may comprise light reflecting particles that reflect an average first reflection percentage of incident light in the first wavelength or the first wavelength band as discussed previously in the light reflecting section, except in this context for reflecting particles instead of the fluid transfer component. In another embodiment, the transfer fluid comprises light scattering particles with a refractive index such that the refractive index difference between the particles and the fluid at a first wavelength greater than one selected from the group 0.01, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, and 2.0. For example, in one embodiment, the transfer fluid is a silicone fluid with a refractive index of about 1.38 and the particles are titanium dioxide particles with a refractive index of about 2.6. In another embodiment, the fluid is air with a refractive index of about 1.0 and the particles dispersed in the air are titanium dioxide particles, resulting in a refractive index difference of about 1.6.

In one embodiment, the fluid comprises a chemical or additive to prevent algae growth or the growth of other bio-fouling organisms. For example, in one embodiment, the transfer fluid comprises copper sulfate. In one embodiment, the transfer fluid comprises additives that increase the heat adsorption. In one embodiment, the transfer fluid comprises one or more zeolites.

Flow Source

In one embodiment, the fluid flow source is one or more selected from the group: inherent with the structure of the film-based fluid transfer component, comprised within or adjacent the film-based fluid transfer component, and in fluid communication with the film-based fluid transfer component. In one embodiment, the flow source actuates the fluid flow by one or more selected from the group: pressure sources, external mechanical pumps, integrated mechanical micropumps, capillary forces, electrokinetic mechanisms, phase transfer mechanisms, piezoelectric actuators, pneumatic actuators, magnetic actuators, thermoelastic actuators, mechanical actuators, linear actuators, rotary (screw-type) actuator, electroosmotic flow mechanisms, positive flow pump, rotary-type positive displacement pump, reciprocating-type positive displacement pump, linear-type positive displacement pump, rotary lobe pump, progressive cavity pump, rotary gear pump, piston pump, diaphragm pump, screw pump, gear pump, hydraulic pump, vane pump, regenerative (peripheral) pump, peristaltic pump, rope pump, impulse pump, velocity pump, centrifugal pump, radial flow pump, axial flow pump, mixed flow pump, eductor-jet pump, gravity pump, steam pump, valveless pump, wicking, magnetic propulsion, phase change, microelectromechanical systems (MEMS) propulsion, synthetic jet, convection, thermosiphon, vacuum generator, light exposure and surface plasmons, and the Marangoni effect.

MEMS type pumps include those driven by electrostatic forces such as those discussed in U.S. Pat. No. 6,485,273, MEMS structures that may provide MEMS oscillatory flap devices such as those are described in U.S. Pat. Nos. 6,057,520; 6,229,683; 6,236,491; 6,373,682; 6,396,620; and 6,456,420, all to Goodwin-Johansson, the disclosures of all of which are incorporated by reference herein. In one embodiment, the flow source is a micropump such as disclosed in WIPO patent application publication number (WO) 2012084707, the entire contents are incorporated by reference herein.

In one embodiment, the fluid source propels the fluid by low energy light illumination and either a doped semiconductor surface or a surface-plasmon supporting surface in combination that manipulating a fluid on the surface in the absence of or in addition to any applied electric fields or flow channels. Precise control of fluid flow can be achieved by applying focused or tightly collimated low energy light to the surface-fluid interface. In one embodiment, with an appropriate dopant level in the semiconductor substrate, optically excited charge carriers are made to move to the surface when illuminated. In a second embodiment, with a thin-film noble metal surface on a dispersive substrate, optically excited surface plasmons are created for fluid manipulation. This electrode-less optical control of the Marangoni effect provides re-configurable manipulations of fluid flow, thereby paving the way for reprogrammable microfluidic devices. Examples of fluid flow control by the Marangoni effect are disclosed in U.S. Pat. No. 7,939,811, the contents of which are incorporated by reference herein.

The flow source is in fluid communication with the fluid transfer component and may be located in one or more a regions selected from the group: within the fluid transfer system, external to the fluid transfer system, separately from the fluid transfer component and in fluid communication with the fluid transfer component via a fluid input coupler or a fluid output coupler, separately from the fluid transfer component and in fluid communication with the fluid transfer component via one or more fluid connectors, internal to the fluid transfer component, and internal to the channels within the active region of the fluid transfer component.

Flow Regulation of Fluid Transfer Component

In one embodiment, the fluid transfer system comprises one or more valves, switches, connectors, flow modifiers, restrictors, or gates to control direction and/or flow rate of the fluid in one or more fluid connectors, input couplers, output couplers, fluid transfer components, flow sources, or fluid channels.

The flow rate or direction may be adjusted automatically, manually, by a controller, by a controller based on feedback from one or more sensors, based on environmental conditions, or based on thermal or optical performance. In one embodiment, reservoirs comprising transfer fluids of different colors are used to adjust the color of the active region of the fluid transfer component. More than one fluid and/or reservoir comprising a fluid can permit one to "dial in" the optical, thermal or other property, level or state. Examples of fluid valves are discussed in U.S. Pat. No. 6,681,788, the entire contents are incorporated by reference herein. In one embodiment, the fluid transfer system comprises one or more one-way valves to prevent fluid from flowing in a specific direction.

Self Regulation

In one embodiment, the fluid transfer system configured to be self-regulating under specific conditions. For example, in on embodiment, when the transfer fluid reaches a specific high temperature, the flow source may be stopped such that the fluid flows, such as by gravity, away from the active region and into a different component of the system such as a reservoir. In another embodiment the fluid flow is regulated based on direct input or analysis of sensor information. For example, in one embodiment, the fluid flow may be stopped or reduced due to a drop or increase in pressure, temperature, optical property of the liquid, thermal property of the liquid, physical property of the liquid, chemical property of the liquid, optical property of the fluid transfer component, thermal property of the fluid transfer component, physical property of the fluid transfer component, environmental conditions, or other internal or external information received (such as information received and processed by a microprocessor) beyond a safe operating range.

In one embodiment, the fluid transfer system comprises a thermal overload protection feature or configuration by connecting a valve to the supply line such that with loss of fluid flow, the valve opens and the fluid in the fluid transfer component automatically drains into a reservoir (such as draining due to gravity, for example). In another embodiment, the transfer fluid is chosen such that it's boiling temperature is below and near or at the maximum safe operating temperature for the transfer fluid in the system such that when the fluid turns into a vapor, the flow of the liquid through the fluid transfer component stops, is reduced and may drain automatically.

Reservoirs

In one embodiment, the fluid transfer component comprises one or more reservoirs that comprise one or more transfer fluids in one or more optical states, thermal states, or other conditions. The reservoir may advantageously comprise an access opening to empty its contents or may be otherwise connected to conventional drainage systems. In one embodiment, more than one fluid is stored in the same reservoir.

Expansion Mechanism

In one embodiment, the fluid transfer system comprises an expansion mechanism that receives a volume of liquid from the system due to thermal expansion of the liquid. For example, in one embodiment, the fluid transfer system comprises a bladder that expands due to the volumetric expansion of the transfer fluid. In another embodiment, the fluid transfer system comprises an overflow chamber that receives the fluid overflow due to thermal expansion. Other expansion mechanisms such as those known in the fluid control industry may be used.

Manufacturing the Fluid Transfer Component

The method of making of structured surfaces, surface relief profiles, and in particular microstructured surfaces that may define one or more channels, on a polymeric layer such as a polymeric film that may be suitable for a fluid transfer component are disclosed in U.S. Pat. Nos. 5,069,403 and 5,133,516, both to Marentic et al, the contents of which are incorporated by reference herein. Structured layers may also be continuously microreplicated using the principles or steps described in U.S. Pat. No. 5,691,846 to Benson, Jr. et al. and other patents that describe microstructured surfaces include U.S. Pat. No. 5,514,120 to Johnston et al., U.S. Pat. No. 5,158,557 to Noreen et al., U.S. Pat. No. 5,175,030 to Lu et al., and U.S. Pat. No. 4,668,558 to Barber, the entire contents of each are incorporated by reference herein.

Hollow fibers maybe be manufactured by hollow fiber spinning machines, extrusion, gas assisted extrusion, injection molding, and other methods known to those in the filtration industry. Hollow fibers can also be made by spinning or other fiber making techniques. For example, methods of making hollow fibers have been described in U.S. Pat. Nos. 2,999,296 and 4,234,431, which are hereby incorporated herein in their entireties by reference.

In one embodiment, the fluid transfer component comprises surface features or layers that may comprise micro size or nano size features, corrugated microlayers, channels within the film, or high aspect ratios and their description and method of manufacture may be described in U.S. Pat. Nos. 7,531,120, 7,303,642, and U.S. patent application publication nos. 20040050532 and 20110192233, the entire contents of each are incorporated by reference herein.

In one embodiment, the fluid transfer film comprises walls such as a polycarbonate multiwall glazing sheet. In one embodiment, a fluid transfer films comprises one or more walls defining channels and the channels are prevented from collapsing in a manufacturing step (such as extrusion or stretching) by flowing air or other gas through the channels from a manufactured end of the article or the extrusion die or apertures in the channel forming device. In one embodiment, the temperature of the gas is kept lower than the temperature of the polymer or other material forming the wall or surface by 5, 10, 20, 30, 40, 50, or 60 degrees Celsius at a forming or stretching point. In one embodiment, the fluid transfer film is a multi-walled corrugated film formed by extruding one or more resins through a multi-wall dye adapted for film extrusion. In one embodiment, the fluid transfer film is a double or triple walled corrugated film formed by stretching a larger multiwall sheet. In one embodiment, a film or sheet comprising channels forms a preform that is stretched to form a thinner film or sheet with smaller channel cross-sections. In one embodiment, the preform is a collection of objects comprising channels (such as a bundle of hollow fibers) that are stretched such that the channels are reduced in size and form fluid channels for a fluid transfer component. In one embodiment, the preform is a corrugated, fluted, hollow, impregnated, embossed, or laminated film or sheet. In another embodiment, the preform comprises surface that define one or more channels or channel surfaces after stretching.

In another embodiment, the method of manufacturing a fluid transfer component comprises grouping together a plurality of hollow tubes or hollow extensions of a material with a geometric or polygonal cross-section continuous with the extension into a bundle, and stretching the bundle while applying heat. In one embodiment, the method further comprises flowing an air or liquid through the openings within the tubes or extensions.

In one embodiment, the fluid transfer component is sufficiently flexible to be used in situations that require intimate contact to irregular surfaces. In one embodiment, the fluid transfer component has a flexibility such that it can be conformed about a mandrel that has a diameter of approximately one inch (2.54 cm) or greater without significantly constricting the flow channels or the structured polymeric layer. In another embodiment, the fluid transfer component is fashioned from polymeric materials, inorganic materials, or a combination thereof, that allow the fluid transfer component to be non-detrimentally conformed about a mandrel that is approximately 1 cm in diameter when the component is at a temperature higher than one selected from the group of 35, 50, 70, 100, 120, 140, and 160 degrees Celsius.

Substrate or Support Layer

In one embodiment, the fluid transfer component comprises a substrate, superstrate, or support layer. In one embodiment, one or more substrate, superstrate, or support layer comprises one or more selected from the group: thin glass, ultra-thin glass, acrylic, fluoropolymer, glass reinforced polymer, polycarbonate, polyethylene terephthalate, polyethylene naphthalate, a composite, ethylene vinyl acetate, silicone layer, tie layer, PFA, FEP, laminate, fabric, weave, a sheet, curtain, blinds, drapes, window, door, panel, shingle, house, and building siding.

In one embodiment, the substrate, superstrate, or support layer for the fluid transfer component or a component thereof such as a surface relief layer has a thickness less than one selected from the group: 4, 3, 2, 1, 0.5, 0.4, 0.3, 0.2, 0.1, 0.075, 0.05, and 0.025 millimeters.

In another embodiment, the substrate, superstrate, or support layer for the fluid transfer component or a component thereof such as a surface relief layer comprises a barrier layer the inhibits in flow of oxygen, gas, moisture, water, or the transfer fluid from the channels to the environment or from the environment into the channels. Barrier films are known in the plastic packaging, polymer processing, polymer film processing, and solar industry and can be used with embodiments of the fluid transfer component. Barrier films can, for example, include coatings such as oxide coatings, multilayer extrusions of polymers (including films extruded with hundreds of layers) and other barrier technologies for gases or liquids.

In one embodiment, the substrate, superstrate, or support layer for the fluid transfer component or a component thereof is a reinforced layer, such as a fiber reinforced film or includes one or more domains, webs, meshes, weaves, layers (such as metal layers), that reinforce or increase the flexural or tensile modulus of the fluid transfer component.

Adhesive

In one embodiment, an adhesive is used to physically couple two or more components in the fluid transfer component. In another embodiment, a layer or region of the adhesive forms a surface of one or more fluid channels.

Power Supply or Powering Means

In one embodiment, the fluid transfer system is powered by one or more selected from the group: alternative current, direct current, battery, photovoltaic, thermoelectric, stored energy material, petroleum source, and combustion source. In one embodiment, the fluid transfer system transitions from a first state (optical, thermal, etc.) to a second state or a first level or degree of a first state to a second level or degree of a first state and only consumes power during the transition. In one embodiment, the fluid transfer system comprises a photovoltaic panel or region that generates electrical power to supply the flow source of the fluid transfer system.

Light Redirecting and Reflecting Features

In one embodiment, the fluid transfer component comprises at least one light redirecting and light reflecting feature, region, or component selected from the group: diffractive optical elements, diffusely reflecting elements, off-axis specularly reflecting elements (such as, for example without limitation, prismatic films that have been coated with a reflective coating or embossed 3M ESR film), flakes of reflective material not parallel with the high refractive index region, holographic optical elements, holograms, prismatic features, totally internally reflecting features, refractive and reflective features, reflectively coated features (such as, for example without limitation) hemispherical concave features in the high refractive index material with a reflective coating, corner cube reflectors, bead-based retroreflector, hollow microspheres, hollow or gas filled cavities (such as, for example without limitation, grooves, pits, hemispheres, etc. that can cause light to totally internally reflect), reflecting elements combined with angularly sensitive light scattering materials (such as angle dependent light control film Lumisty from Sumitomo Chemical Co., Japan), reflective polarizers, non-planar reflective features formed in reflective polarizer films, dispersed phase diffusers or reflecting films, oriented films comprising titanium dioxide or other scattering domains, and voided films.

Light Transmitting and Redirecting Features

In one embodiment, the fluid transfer component comprises at least one light redirecting and transmitting feature, region, or component selected from the group: diffractive optical elements, diffusely transmitting elements, off-axis specularly transmitting elements (such as, for example without limitation, prismatic films), flakes of transmitting materials material not parallel with the high refractive index region, holographic optical elements, holograms, prismatic features, refractive features, microspheres, beads, particles, hollow or gas filled cavities (such as, for example without limitation, grooves, pits, hemispheres, etc. that can cause light to transmit at different angles), angularly sensitive light scattering materials such as angle dependent light control film Lumisty from Sumitomo Chemical Co., Japan), dispersed phase diffusers, oriented films comprising titanium dioxide or other scattering domains, voided films, beaded films, coated films comprising microlens, or other refractive, diffractive, holographic, or scattering features.

Housing

In one embodiment, the fluid transfer system comprises at least one of a cover, housing, based that provides at least one of a fluid sealed environment, isolation from the external environment, heat conduction surface for heat extraction, and a window for light transmission.

Attachment Regions

In one embodiment, the fluid transfer component comprises one or more attachment regions for attaching the fluid transfer component to an object. In one embodiment, the attachment regions extend from or are located near the periphery of the fluid transfer component in a first direction such as the fluid flow direction. In one embodiment, for example, the fluid transfer film comprises attachment guides (such as holes or eyelets) extending from a metal foil, insulating layer, or film surface on the back of the fluid transfer film for nailing or otherwise affixing the fluid transfer film to a roof or support structure such as a wall, mount, beam, or window. In another embodiment, for example, the fluid transfer film comprises a pressure sensitive adhesive layer on the back of a metal foil, insulating layer, or film surface on the back of the fluid transfer film for affixing the fluid transfer film to an object such as a roof. In one embodiment the attachment region has a high thermal conductivity, such as an epoxy with a high thermal conductivity. In another embodiment the attachment region has a very low thermal conductivity, such as a thermally insulating layer. In one embodiment the fluid transfer component or fluid transfer film comprises a physical connector, fastener, grommet, clip, hook, or an adhesive for physically coupling it to a building, structure, device, object, or vehicle. For example, in one embodiment, the fluid transfer component comprises an adhesive that bonds to roof shingles with a first peel strength 24 hours immediately after installation at a temperature less than 30 degrees Celsius and after operating the fluid transfer component the temperature of the adhesive increases to a temperature beyond 50 degrees Celsius and the peel strength is increased over the installation peel strength. In another embodiment, the attachment mechanism or region of material comprises one or more holes in the material or pathways between the fluid transfer component and a structure for ambient air or wind to flow.

Orientation of the Fluid Transfer Component

In one embodiment, the fluid transfer component in a fluid transfer system is oriented such that the fluid channels in the active region are oriented horizontally, vertically, at an angle to the horizontal and/or vertical, in a plane parallel to the structure (such as a roof) to which the component is mounted, at a range of orientations (such as the case when the film is wrapped around a non-planar object such as a pipe), perpendicular to the solar azimuth angle, or perpendicular to the solar zenith angle. In another embodiment, the orientation of the fluid transfer component is dynamic, reconfigurable, user reconfigurable, or automatically adjusted. In one embodiment, the fluid transfer component is retractable, rollable and/or unrollable. For example, in one embodiment, a solar thermal fluid transfer system comprises a fluid transfer component with one or more fluid input and/or fluid output couplers oriented along a horizontal edge of the fluid transfer component when oriented on a tilted roof and the fluid transfer component may be manually, or automatically rolled up on the roof (such as for increased protection during high winds or a hailstorm, for example).

Surface Relief on Outer Surface

In one embodiment, the fluid transfer component comprises a light receiving surface with a surface roughness, Ra, greater than one selected from the group: 0.25 micrometers 0.5 micrometers, 1 micrometer, 2 micrometers, 5 micrometers, 10 micrometers, 20 micrometers, 25 micrometers, 50 micrometers, 100 micrometers, 200 micrometers, and 500 micrometers. By making the outer surface have a surface relief profile, more light can transmit into the fluid transfer element (such as in the case of a moth-eye type anti-reflection surface) and the glare or reflection from the outer surface can be reduce (the fluid transfer film could appear more like the diffusely reflecting and absorbing shingles on a house, for example).

Filters

In one embodiment, the fluid transfer system comprises one or more filters. Filters may remove particles that could clog, block, or partially obstruct one or more channels. Other filters may remove water, moisture, or water vapor that could cause problems when freezing or problems of material degradation. In one embodiment, the filter is service replaceable or replaceable by the user. In another embodiment, the filter is positioned in fluid communication and between the flow source and the input coupler.

Other Components

In one embodiment, the fluid transfer component includes one or more microelectronic, microoptical, and/or micromechanical elements as well. Examples of microelectronic elements include conductive traces, electrodes, electrode pads, microheating elements, electrostatically driven pumps and valves, microelectromechanical systems (MEMS), and the like. Examples of microoptical elements include reflective elements (e.g., prisms), beam splitters, lens elements, solid state light sources and detectors, and the like. Examples of micromechanical elements include filters, valves, pumps, pneumatic and hydraulic routing, and the like. The microelements may be incorporated in the cover layer, either surface of the fluid transfer component, an additional polymeric substrate bonded to the fluid transfer component, or a combination thereof.

Sensors

In one embodiment, the fluid transfer system comprising a fluid transfer component comprises one or more sensors selected from the group: acoustic sensor, microphone, chemical detector, carbon dioxide sensor, electrochemical gas sensor, hydrocarbon dew point analyzer, water sensor, moisture sensor, oxygen sensor, light sensor (sensitive to light of a first wavelength or first wavelength band as disclosed above for the light reflecting state), imager, photodetector, smoke detector, current sensor, voltage sensor, galvanometer, hall effect sensor, magnetometer, accelerometer, metal detector, radio wave detector, antenna, snow gauge, rain gauge, precipitation gauge, solar detector for tracking, air flow meter, flow sensor, mass flow sensor, water meter, gas pressure gauge, liquid pressure gauge, scintillator, altimeter, depth gauge, compass, gyroscope, magnetic compass, yaw rate sensor, auxanometer, capacitive displacement sensor, gravimeter, gyroscopic sensor, piezoelectric sensor, linear encoder, odometer, position sensor, tilt sensor, charge-coupled device, colorimeter, image sensor, electro-optical sensor, flame detector, infra-red light sensor, ultraviolet light sensor, a light emitting diode as a light sensor, fiber optic sensor, optical position sensor, photodiode, photoresistor, photoswitch, pressure sensor, pressure gauge, tactile sensor, hydrometer, force gauge, piezoelectric sensor, strain guage, torque sensor, bolometer, heat flux sensor, thermometer, infrared thermometer, resistance temperature detector, thermistor, thermocouple, motion detector, occupancy sensor, proximity sensor, passive infrared sensor, refractive index sensor, refractometer, radiometer, spectrometer, and photospectrometer. For example, in one embodiment, the fluid transfer system comprises a snow detector that reverses the flow of the fluid transfer system or turns on a heating element thermally coupled to the fluid to warm the fluid to melt the snow in the active region of the fluid transfer component.

Safety Valve

In one embodiment, the fluid transfer system comprises one or more safety valves that close one or more fluid paths, supply lines, return lines, or channels, when the system is operating in an unsafe condition, the environmental conditions change to unsafe condition, based on information or feedback from one or more sensors, based on a microprocessor analyzing the data from one or more sensors, or a component ceases to function or function efficiently. In one embodiment, for example, the fluid transfer system comprises a fluid transfer component within a plurality of roofing shingles and when the system detects a leak in the active region of the fluid transfer component of a shingle, the fluid flow to that shingle is stopped or the fluid flow to the active region is stopped while the fluid flow through channel remains open.

Applications for the Fluid Transfer System

In one embodiment, the fluid transfer system performs one or more fluid transfer operations, thermal transfer operations, or optical operations or transitions.

Fluid Transfer Applications

In one embodiment, the fluid transfer system comprises films or capillary materials to move or transfer fluid by capillary action such as those disclosed in U.S. Pat. No. 6,290,685, the contents of which are incorporated by reference herein. In one embodiment, a fluid transfer system or fluid transfer component comprises a channel structures, device configuration, layer, film, material, adhesive, coating, method of manufacturing a microstructured film, assembly, module, device, separation membrane or device, active or passive heat exchange device, fluid dispenser, absorbing device, detection article, or is used in an applications as disclosed in U.S. Pat. Nos. 6,290,685; 6,514,412; 7,422,911; 6,986,428; 5,728,446; 6,381,846; U.S. patent application publication numbers 20100318072, 20070212266, 20050123727, 20040226886, 20030211291, 20020011330; and WIPO patent application publication numbers (WO) 2005052270, (WO)2006043181, (WO)2008070048, the entire contents of each are incorporated by reference herein.

Medical

In one embodiment, the fluid transfer system provides fluid flow for medical applications such as drapes, suction matts, films, or tapes that wick away a fluid to a reservoir or pouch. Examples of fluid transfer devices and configuration using fluid transfer films are disclosed in U.S. Pat. Nos. 6,420,622 and 6,746,567, the entire contents of each are incorporated by reference herein. In another embodiment, the fluid transfer system is a device that warms or cools parenteral fluids such as disclosed in U.S. Pat. No. 5,245,693, the entire contents are incorporated by reference herein. In one embodiment, a first fluid transfer component is removable and/or disposable and a second fluid transfer component may be operatively coupled to the fluid transfer system in place of the first fluid transfer component to replace a removed first fluid transfer component.

Chemical or Biological Analysis

In one embodiment, the fluid transfer system provides fluid transfer for a biological or chemical analysis system. In one embodiment, the fluid transfer component permits the sensing or detecting of a passing fluid where the active region acts as the fluid interface component in a sensor or detector system. A fluid detection or analysis system might, for example, monitor fluid conductivity, pH, temperature, or composition, provide observation through an analytical device such as a microscope or spectrometer, and analyze fluid as it passes in a thin film through the channels.

In one embodiment, the fluid transfer system comprises a microfluidic fluid transfer component that provides fluid transfer for a biological or chemical analysis. Examples of microfluidic devices and applications are disclosed in U.S. Pat. No. 6,761,962, the contents of which are incorporated by reference herein.

Other applications for fluid management that may utilize the fluid transfer system or fluid transfer component include industrial applications which benefit from fluid management, such as aerospace (i.e., reduction of corrosion by evaporative and collective mechanisms for fluid), turbine air compressors (from improvement in condensation knockout efficiency), oil separation in industrial processes, condensate removal in refrigeration, condensate collection efficiency in appliance applications, spill control in electronic applications (i.e., computer keyboards), deicing by means of continuous fluid removal, removal and/or collection of hazardous fluids (i.e., solvents, hydraulic fluids, acidic media or basic media), delivery of fluids with increased efficiency (e.g., inks, coatings, fuels, fragrances, etc.), removal of specific liquids (e.g., water, inks or other fluid sprays) from a surface, and detection of hazardous or non-hazardous fluids by combination with detection devices.

In one embodiment, the fluid transfer component comprises a sensor, reagent, or analyte on a surface of the component (such as an outer surface or inner surface of a channel, for example), within the component, or exterior to the component such that an analysis can be made (such as for example by optical imaging, using microstructures for biological assays and reactions, liquid chromatography, analyzing polynucleotide sequences, or other sequencing) as disclosed for example, in U.S. Pat. Nos. 6,091,502, 6,585,939, U.S. patent application publication number 20010045358 and WIPO patent application publication number (WO)2001032930, the entire contents of each are incorporated by reference herein. In other embodiments, the fluid transfer component transfers fluid in a microfluidic manner for molecular biology procedures for enzymatic analysis (e.g., glucose and lactate assays), DNA analysis (e.g., polymerase chain reaction and high-throughput sequencing), proteomics, point-of-care diagnosis of diseases, continuous sampling and real-time testing of air/water samples for biochemical toxins and other dangerous pathogens, or an always-on "bio-smoke alarm" for early warning.

Gas Collection or Emission Device

In one embodiment, the fluid transfer system transfers a gas to the fluid transfer component or receives a gas from the fluid transfer component. In one embodiment, the fluid transfer system can be employed as a smoke or gas evacuator. The flexible aspirator, for example, could be used in applications where smoke plumes from laser surgery might be encountered. It could also be used to recover methane gases and permeating fluids or gases from landfills, acting as a geosynthetic membrane. In another embodiment, the fluid transfer system is used to distribute a gas or liquid from one or more channels or apertures in fluid communication with the channels out of the fluid transfer component.

Microfluidic Display

In one embodiment, the active region of the fluid transfer component or a plurality of fluid transfer components define one or more pixels, images, or graphics, of a microfluidic display. Embodiments of fluid transfer components may be used to transfer or supply fluids microfluidic display such as disclosed in European patent application publication number (EP)2116987 or a large format microdisplay such as disclosed in WIPO patent application publication number (WO) 2008070048, the entire contents of each are incorporated by reference herein.

Air Circulation Device

In one embodiment, the fluid transfer system is an air circulation device wherein air is circulated in a closed or open loop fashion through the fluid transfer component. For example, in one embodiment, the air circulation device of one embodiment flows air through a fluid transfer film to oxygenate, provide air circulation, provide heated air, provide air conditioning for a vehicle, building, room, outdoor area, or garden, for example. In this example, the air can be emitted or drawn in from a large emitting or receiving area and function as supply or return vents or openings.

Liquid Transfer Device

In one embodiment, the fluid transfer system transfers a liquid to the environment through the fluid transfer component. For example, in one embodiment, the fluid transfer component may emit water through channel openings in the active region to water a garden (from above or below) or provide water and/or water vapor to increase the humidity in an environment. In another embodiment, the fluid transfer component may be a membrane. The membrane construction of one or more embodiments comprising a fluid transfer component can be used as part of a membrane module in a fluid filtration system as disclosed in U.S. Pat. Nos. 5,639,373; 5,204,001; 6,406,629; 5,192,456, 6,375,848, and 6,303,035, the entire contents of each are incorporated by reference herein. In another embodiment, the fluid transfer component membrane can be: (1) used in a wastewater treatment or water treatment facility as part of a membrane bioreactor such as membrane bioreactors as disclosed in U.S. Pat. Nos. 6,277,209 and 5,451,317, the entire contents of each are incorporated by reference herein, (2) sparged with air bubbles of varying sizes to reduce biological fouling as disclosed in European Pat. No. 0,510,328, U.S. Pat. No. 6,193,890, U.S. Pat. App. Publication No. 20010047962, U.S. Pat. No. 5,192,456, European. Pat. No. 0,700,713-B1, U.S. Pat. No. 5,451,317, European Pat. App. 0,510,328-A2, U.S. Pat. No. 6,224,766, WIPO patent application no. (WO) 00/37369, and U.S. Pat. No. 5,944,997, the entire contents of each are incorporated herein by reference, (3) cleaned using chemicals and/or by back-washing of the membrane constructions as disclosed in U.S. Pat. App. Publication No. 20010052494, E.P. 1,166,859-A2, and European. Pat. No 0,322,753-B1, the entire contents of each are incorporated herein by reference, and (4) operated with a pressure gradient across the membrane construction either caused by pressure from water outside of a submerged membrane module, a hydrostatic pressure difference, or a vacuum or pressure source connected to a manifold.

In one embodiment, the fluid transfer component is a submerged membrane filter. A number of factors affect the performance of a submerged membrane filter device, such as the way the membrane modules are mounted in the filtering or bioreactor unit, the spacing of the membrane modules, the pore size, the membrane materials and the operating conditions of the actual filtering or bio-reactor unit. These performance factors are well known in the art and are disclosed in U.S. Pat. No. 5,192,456, and European Pat. App. 0,937,494-A3 the entire contents of each are incorporated herein by reference.

In one embodiment, the fluid transfer system comprises an absorptive (light and/or thermal radiation) fluid or liquid for thermal related processes. In another embodiment, the transfer fluid is exposed to electromagnet radiation or solar radiation and fluid transfer component performs photo chemical, photoelectrical, photoelectrochemical or photobiological processes. In another embodiment, the fluid transfer system may include active or passive control of fluid transfer. In another embodiment, the fluid transfer system, fluid transfer component, or a component or layer thereof is one or more selected from the group: diaper, pad, absorbent mat, bandage, wound management device, drain, drape, vacuum device, filter, separation media, heat exchanger, liquid dispensing devices, and other microfluidic devices for the testing and/or handling of fluid samples. Such applications may be usable with physiological fluids as described above, and/or with other fluids.

In another embodiment a vehicle (such as an aircraft, water craft, land craft and space craft) comprises the fluid transfer system or components thereof. For example, in one embodiment, the fluid transfer component of a fluid transfer system functions as a radiator to cool or heat a liquid or air flowing toward an engine in a closed or open loop. In another embodiment, a vehicle, device, object, or person is operatively coupled to a fluid transfer component that cools one or more of its surfaces by evaporative cooling. For example, in one embodiment, an electric or electronic-combustion hybrid vehicle comprises one or more fluid transfer components. In this example, a fluid transfer component may be positioned on the exterior of the vehicle (on the roof of a car, for example) or positioned to receive air from the vehicle exterior where water exiting one or more channels (such as through channel openings) evaporatively cools the active region of the fluid transfer component and the same channels or neighboring channels transfer water cooled (such as conductively cooled) from the active region to the interior of the vehicle, a heat exchanger, or one or more fluid transfer elements to distribute air cooled by the cooled water from the active region to the interior of the vehicle.

Similarly, a vehicle could comprise a fluid transfer component positioned to receive solar radiation such that the solar heated fluid flows out of the active region to the interior of the vehicle, a heat exchanger, or one or more fluid transfer elements to distribute air warmed by the heated fluid from the active region to the interior of the vehicle.

In another embodiment, a fuel cell comprises a fluid transfer component that delivers or receives a fluid (such as a gas, air, oxygen, hydrogen, natural gas, methanol, ethanol, electrolyte, solution, acid, water, hydrocarbon, microbial material, or other liquids or gases known to be supplied or emitted from fuel cells or fuel cell reactions). In another embodiment, the fuel cell comprises a fluid transfer component proton exchange membrane. In one embodiment, the fluid transfer component supplies fuel and/or electrolytic material to the cell, removes or supplies water, or supplies air for the evaporation of water for the cell. In one embodiment, the fluid transfer component is a membrane or a component of a fuel cell such as those disclosed in U.S. Pat. No. 4,758,481, the entire contents are incorporated by reference herein.

In one embodiment, a cleaning or processing device comprises a fluid transfer component that supplies hot water, steam, or other hat liquid, gas, or vapor to a cleaning pad or to the environment for cleaning or processing the an object with the emitted liquid, gas, or vapor. In this embodiment, for example, the fluid transfer component may be used to uniformly distribute, randomly distribute, or non-uniformly distribute in a defined pattern a liquid or gas onto an area or region of object (such as a large 1 meter by 1 meter area or a very small area less than 1 centimeter by 1 centimeter) or into an environment. In one embodiment, the fluid transfer component spreads a volume of fluid into and out of an area such that the fluid may treated or processed in a large area. For example, in one embodiment, water flows through the channels in an active region of the fluid transfer component where it is exposed to ultraviolet light to kill bacteria or other organisms.

Thermal Transfer Device

In one embodiment, the fluid transfer system transfers heat energy from a first location to a second location different from the first. In one embodiment, the fluid transfer component receives heat (or light) through conduction, emission, or convection and transfers the heat to second location (such as a heat exchanger). In another embodiment, heat from a first location is transmitted by fluid flow to the fluid transfer component where it is distributed to the active region of the fluid transfer component or a surface of the fluid transfer component.

In one embodiment, the fluid transfer component comprises a thermally conductive material (such as a thin metal foil) where heat may be efficiently transferred to or from the transfer fluid in channels within the active region of the fluid transfer component. In one embodiment, the channels are defined by the surface structure (such as a channel with a rectangular, elliptical, polygonal cross-section or channel defined by surface relief features) of one or more metallic materials. For example, in one embodiment, a fluid transfer component comprises a copper foil comprising fluted, corrugated channels. In this example, the fluid transfer component may transfer heat to or from the environment to or from a fluid in the channels, such as a radiator, heat sink, or heat pipe. In one embodiment, the fluid transfer component is placed within, disposed upon, or disposed adjacent a surface to be warmed or cooled. For example, the fluid transfer component could be a fluid transfer component (that may comprise metal layers and/or polymer layers) that can be positioned under, on top of, or within a floor (as a radiant floor heating element, for example); a mattress; a rug or carpet; an item of furniture or a fixture (such as a chair, couch, countertop, light fixture, or swimming pool, sauna, or hot tub) concrete (such as a sidewalk, driveway, or foundation); a roof or roofing component such as a shingle; a ceiling; a wall; a floor; a window (such as adhered to a window or positioned between two panes glass in a window); a door; a vehicle; a refrigerator; a freezer; a fireplace; a flame; a building; a home; a heater; a humidifier; a dehumidifier; an air conditioner; a fan; a furnace; a HVAC unit; a garment, accessory or article of clothing such as a shirt, fireman's coat, a hat, a sock; a semiconductor chip or electronic component (such as a microprocessor, CPU, GPU, light emitting diode, computer chip, or amplifier); or a device, object, structure, or environment known to be heated, cooled, or known to supply heating or supply cooling.

In one embodiment, the fluid transfer component can be changed from a reflecting state to a light absorbing or thermal emission state. For example, in one embodiment, a garden or farm comprises a fluid transfer film comprising light transmitting channel defining material positioned above a specularly reflective film. In this example, in the summer, the reflective film can reflect a portion of the solar radiation that would have otherwise missed the plant back toward the plant. In this state, the fluid transfer component has a reflective state due to the presence of a clear or light transmitting fluid or gas within the channels and the light passing through the material defining the channels is reflective by the reflective film. In cooler weather, the fluid transfer element may transition to a light absorbing state, for example, by flowing a light absorbing fluid into the channels to absorb the solar radiation during the day and warm the environment (such as the air and/or the ground to which it may be thermally coupled). This warmer environment may increase crop yield, production, and/or prevent frost. Alternatively, a warm fluid may be transferred through the channels to warm the environment (such as a fluid heated remotely using a boiler). The warm fluid in this alternative state may be light absorbing, light reflecting, light scattering, transparent, or a combination thereof and may transition the fluid transfer element from the light reflecting state to a different optical state.

Solar Applications

In one embodiment, the transfer fluid in the fluid transfer component receives solar radiation, absorbs a portion of the solar radiation, and transfers the heat to a heat exchanger (such as for a hot water heater) or a ground source heat pump system (such as to cool the liquid such that it could cool the roof).

In one embodiment, the fluid transfer system provides cooling (by transferring heat away from) one or more surfaces of a building or structure. In another embodiment, the fluid transfer system provides heating (such as by transferring the heated fluid to a heat exchanger where it heats water). Examples of solar heating and architectural applications for thermal transfer using fluids are disclosed in U.S. Pat. Nos. 4,327,706, 4,270,517, 4,167,934, 4,056,094, 4,521,442, and 4,055,163 the contents of each are incorporated by reference herein.

In one embodiment the fluid transfer component comprises a film and is positioned conformably on the angled roof of a building and the optical axis of the corner cubes formed on the inner surface of one or more channels in a fluid transfer film are oriented at a first angle theta, where theta is greater than zero degrees and less than 90 degrees, to the normal of the film such that solar incident radiation may be optimally retroreflected during the summer months when the refractive index of the fluid is significantly higher than that of the outer material forming the surface of the corner cube elements. Alternatively, inverted corner cube elements (where the sides of the retroreflecting surfaces of the cubes protrude into the channel) defining one or more surfaces of one or more channels may be used. In this example, a low refractive index fluid such as air may be pumped or flow into the channels such that the corner cube elements are highly retroreflective (in the summer months, for example). In the winter months, in this example, a higher refractive index fluid (such as silicone fluid comprising carbon black particles) may be pumped or flow through the channels such that solar radiation is absorbed and the heat is used in a building after the liquid passes through a heat exchanger. Alternatively, the transfer liquid could be transparent and the solar radiation in the winter months may pass through the channels and be absorbed by a light absorbing film or material behind the channels and the heat from the absorbing material conducts through the channel defining material and into the fluid. In one embodiment, the black light absorbing material forms the rear surface of the channel.

Concentrating Solar Power

In one embodiment, the fluid transfer system is used to transfer fluid in a concentrating solar power application. In one embodiment, the fluid transfer component is positioned to receive concentrated light from lenses such that one or more fluid channels receive a higher flux density solar radiation that it would without the lenses. In one embodiment, the lenses are physically and optically coupled to the fluid transfer component. In another embodiment, the lenses are external to the fluid transfer component. In one embodiment, an array or arrangement of channels are positioned to receive light from a 1:1 corresponding array or arrangement of lenses that focus light onto the channels and/or the fluid in the channels of the fluid transfer component. In another embodiment, the fluid transfer component is operatively coupled to a tracking system that orients and/or positions the fluid transfer component to receive more light on the channels as the sun moves across the sky. In one embodiment, the fluid transfer element is a variable light redirecting element for a concentrating solar power system.

Cooling Solar Panels

In one embodiment, the fluid transfer system is positioned on the light receiving side or the opposite side of a photovoltaic material (such as a photovoltaic panel, film, etc.) and the fluid flow through the active region of the fluid transfer component removes heat from the photovoltaic material through conduction.

Concentrating Photovoltaics

In one embodiment, the fluid transfer system comprises a fluid in a first channel of a fluid transfer component that functions as an optical element to focus light such as solar radiation onto a photovoltaic element (functioning as a Concentrated PhotoVoltaic (CPV) system) or onto a second channel smaller than the first channel comprising a second fluid (functioning as a Concentrated Solar Power (CSP) system). In one embodiment, one or more properties of the fluid or the fluid flow in the active region of the fluid transfer component can be changed in a predetermined, automatic, and/or user controlled manner. For example, in one configuration the pressure of the fluid or the composition of the fluid is changed to change the horizontal or vertical location of the focal point of the incident light. In this example, the pressure or composition of the fluid could be changed to track the sun across the sky. The pressure change could, for example, increase or decrease the thickness of an optical element formed from a channel defined by one or more flexible materials. By oriented one or more flexible materials or structures defining or within a channel off-axis the angle of light leaving the channel can change or the focal point of light can change due to pressure. In one embodiment, the fluid transfer element is a variable light redirecting element for a concentrating photovoltaic system. In one embodiment, the change in pressure of the fluid, the change in composition of the fluid, or the change in refractive index of the fluid changes the optical properties of the fluid transfer component such that the focus of solar radiation is maintained on one or more channels or photovoltaic elements as the sun traverses the sky. In one embodiment, the fluid transfer element comprises a variable light redirecting element and a focusing element, such as a microlens array film, a lenticular array film, a Fresnel lens array film (comprising linear or radial elements).

Thermal Transfer Heat Exchanger

In one embodiment, the fluid transfer component is a heat exchanger. Examples of fluidic device structures used as heat exchangers are disclosed in U.S. Pat. No. 6,907,921, the entire contents are incorporated by reference herein. In one embodiment, the fluid transfer component comprises a plurality of channels defined by a metal material, a conformal coating disposed upon the surfaces of the metal material, or surface relief features of a coating physically coupled to the surface of a metal material. In one embodiment, the metal material is a metal film of copper, aluminum, steel, stainless steel, aluminum alloy, lead, nickel, tin, zinc, or a combination thereof. In one embodiment, the fluid transfer component is a heat exchanger, evaporative cooler, or mass exchanger using a porous or mass permeable layer such as disclosed in WIPO patent application publication number (WO)2009020679, the entire contents are incorporated by reference herein. In one embodiment, the fluid transfer system or component is a heat exchanger or a heat exchanging system used for cooling a laptop computer, heating or cooling a vehicle seat, an airfoil skin heat exchanger, a micro-chemical reactor, and a compact heat exchanger.

Thermal Transfer Heat Pipe

In one embodiment, the fluid transfer system is a heat pipe. Examples of fluidic device structures used as heat pipes are disclosed in U.S. Pat. Nos. 7,334,630 and 7,331,378, the contents of which are incorporated by reference herein.

Thermal Transfer Fabric, Carpet, or Mat

In one embodiment the thermal transfer component comprises one or more hollow fibers comprising fluids wherein the fibers are not covered in the application and form a mat, carpet, rug, towel-like, or cloth-like material that transfers heat to or transmits heat from an external environment. For example, in one embodiment the fluid transfer component comprising hollow fibers with a heat transfer fluid flowing through the fibers may be submersed to heat or cool a liquid or environment. In one embodiment, the surface area of the fluid transfer component is greater by a magnification factor than the length of the fluid transfer element multiplied by the width of the fluid transfer component. In one embodiment, the magnification factor is greater than one selected from the group: 1, 2, 3, 4, 6, 8, 10, 15, 20, 30, and 50. In one embodiment, the fluid transfer component is a thermal transfer component that can be used to cool or heat an object or person. For example, the thermal transfer film may be used to cool a person with a fever or to warm a patient with hypothermia. In another embodiment, the thermal transfer component may cool or heat an article of clothing such as a suit (such as cooling a fireman's suit or heating an astronaut's suit), shirt, shorts, pants, dress or accessory such as a hat, helmet, shoes, coat, gloves, mask, and scarf. In another embodiment, the fluid transfer component is a mat (such as a doormat) that heats a region of a walkway or driveway to melt ice and/or snow.

Light Source Cooling Device

In one embodiment the fluid transfer system removes heat from a light source. In one embodiment, the fluid transfer component is thermally coupled along one or more sides to a light source and removes heat from the light source. For example, in one embodiment, a fluid transfer film is thermally coupled to the front (the light emitting side) of an organic light emitting diode panel or an inorganic light emitting diode. In this embodiment, the fluid transfer film may be optically transparent and/or light transmitting and optically coupled to the organic light emitting diode panel or the inorganic light emitting diode. In another embodiment, the fluid transfer film is thermally coupled to the back surface of a light emitting diode and transfers heat from the light emitting diode to lower the junction temperature and increase the efficacy of the light emitting diode.

Semiconductor Component Cooling Device

In one embodiment the fluid transfer system removes heat from a semiconductor device. In one embodiment, the fluid transfer component is thermally coupled to a semiconductor device (such as a microchip, processor, microprocessor, semiconductor laser, charged coupled detector, or complementary metal-oxide-semiconductor) and removes heat from the semiconductor.

De-Icing or De-Fogging Element

In one embodiment, the fluid transfer system defogs or defrosts a window or light transmitting surface by transferring heat to the light transmitting surface from the fluid transfer component to warm the surface. In one embodiment, a transparent or light transmitting fluid transfer film is physically and thermally coupled to a window in a vehicle or building to heat and defrost or defog the inner or outer surface of the window. In one embodiment, the fluid transfer film positioned adjacent or within a window of a vehicle (such as a car or plane) uses the warm cooling fluid from the vehicle directly (or through a heat exchanger) to heat the window.

Optically Changing Film

In one embodiment, the optical properties of the active region of the fluid transfer component change from first optical state to a second optical state. Examples of optical state changes include, but are not limited to light reflecting state, light scattering state, light absorbing state, light transmitting state, a light emitting state, and a first angular light redirecting state. The active region may also change in the degree or level of the property of the state. In one embodiment, for example, the fluid control film is coupled to a window and changes from a first light transmitting clear state with a substantially refractive index matched liquid flowing through channels in the active region defined by surface features, to a second light scattering (or reflecting) state by pumping air through the channels such that the refractive index between the air and the polymeric material forming the surface relief features scatters the incoming light. In this embodiment, the device can be used as a changeable privacy window or film that converts from transparent to opaque. Alternatively, if the scattering of the light is very high (such as by using scattering surface relief features to define the channel with average cross-sectional feature dimensions less than 10 micrometers in width and using a polymer with a high refractive index such as a polymer with a refractive index of 1.58 or higher), the second state is highly scattering and reflective such that it appears white. Also, the fluid transfer component can be used as a switchable projection screen that can change from a transparent state to a diffusely forward scattering state for a rear projection screen (or for a front projection screen when the active region is proximate a reflecting layer) or a strongly backscattering state for a reflective projection system (which may also comprise a reflecting layer proximate the active region). Other applications for the fluid transfer component include light valves, displays, and other applications that employ Polymer Dispersed Liquid Crystals (PDLC) films or materials for active optical state control.

Optically Changing Film for Thermal Control

In one embodiment, the active region of the fluid transfer component in the fluid transfer system changes from a first optical state to a second optical state in order to facilitate heat absorption and transfer or light reflection. For example, in one embodiment, the active region of the fluid transfer component in the fluid transfer system is designed to change from a light reflecting state to a light absorbing state. The optical state of the fluid transfer element, in some embodiments, may be different from the optical properties of the fluid flowing through the channels (such as in embodiments where a light absorbing or light reflecting material is positioned behind the channels in the thickness direction in the active region). For example, in one embodiment, a fluid transfer film comprises at least one substantially transparent top film with channels defined by the transparent film and a surface relief profile on an inner surface, a fluid flow source, a first reservoir comprising a light transmitting fluid and a second reservoir comprising a light reflecting fluid (such as water comprising nano- and/or micro-sized particles of titanium dioxide and a dispersant aid). The rear surface may be light absorbing material, such as a black nickel oxide coating on a stainless steel sheet. In this example, when the active region of the fluid transfer film is placed on the roof of a building, a light transmitting fluid is pumped from the first reservoir through the active region of the fluid transfer film such that the ambient light (such as sunlight) passes through the film and is absorbed by the rear light absorbing material and the heat is radiated into the fluid. In this embodiment, the fluid transfer film may further comprise a thermal insulation layer on the light receiving side of the channels and a thermal insulation layer behind the light absorbing material (such as between the light absorbing material and the roof) to insulate the transfer fluid and retain more heat in the fluid. If the fluid is light transmitting material with a high heat capacity (such as water for example), then the fluid can be carried back to a heat exchanger to provide heating, hot water, or solar hot water heating for the building (such as during the winter, for example). When the light transmitting fluid is pumped out of the channels in the active region and a light reflecting fluid is pumped into the channels, ambient light is reflected from the film and the building absorbs less radiant heat and is cooler.

In another embodiment, a first light transmitting fluid comprises a gas, such as without limitation air, and the second fluid provides a light scattering, light absorbing, or light reflecting state and the second fluid is pumped out or pulled out of the active region and air or a vacuum is generated in the active region to change it to a light transmitting state. A fluid with a high heat capacity may also be used on the back side (opposite the light incidence side) of the light absorbing rear surface to transfer heat away from the light absorbing material on one or both sides. The fluid transfer system may have fluid transfer films, components, or regions on opposite sides of a light absorbing material. Alternatively, the light absorbing material could be the roof of the building or thermally coupled to the roof such that the roof absorbs the light or solar radiation and the building is heated. In these examples, a light reflecting fluid may be pumped into the active region of the fluid transfer film (flowing or pumped in an held for a steady state reflectance) in order to reflect ambient light or electromagnetic radiation, such as in the summertime, to keep the roof cool. In these examples, the light transmitting fluid may also absorb a first portion of the incident light and allow the light not absorbed to pass through to the light absorbing material.

In another example, the rear surface may be a light reflecting surface and the active region may transition from a light reflecting state to a light absorbing state using a light transmitting fluid (such as a transparent liquid or air) or light absorbing fluid, respectively. For example, in the winter, a light absorbing fluid may be pumped into the active region of the fluid transfer film in order to absorb the heat into the liquid, film, or system. The fluid may be substantially non-flowing or flowing into other areas of the system. For example, the fluid could flow into a heat exchanger for hot water heating or HVAC system or the fluid could flow into a geothermal heat exchange or ground source heat pump to cool the water and the roof. In this example, in the summer, a light transmitting fluid could be pumped (and possibly circulated through) the active region of the fluid film to allow the light to pass through the light transmitting fluid and reflect from a light reflecting rear surface to reduce solar radiant heating on the building and/or fluid or system.

Thus, for example, a the active region of a fluid transfer film may transition from a first state to a second state; the states selected from the group of light reflecting state, light absorbing state, and light transmitting state depending on the configuration and desire to absorb (and/or optionally transfer) or reflect the light (and/or radiant heat).

In one embodiment, the active region of an optically changing fluid transfer component is positioned adjacent an interior or exterior surface, upon an interior or exterior surface, or within one or more selected from the group: roof, building, roof, wall, window, skylight, pedestrian structure, structure for vehicles, garage, and pool or fountain (including for example configurations where the transfer fluid is optionally filtered and obtained directly or indirectly from a pool or fountain or body of water). For example, in on embodiment, the active region of the fluid transfer component is positioned on the inner surface of a roof to absorb and transfer the heat collected from within the attic (from the home or from heat conduction through the roof) to a separate location (such as a ground source heat pump).

In another embodiment, the active region of the fluid transfer film is disposed within a window and the active region transitions from a light transmitting state to a light reflecting and/or light scattering state. For example, in one embodiment, the active region of the fluid transfer film disposed within a window receives a light transmitting fluid such that a first portion of the exterior sun light transmits through the window into the building to warm the interior in the winter season. In this example, in the summertime, a light reflecting fluid (such as water comprising hollow microspheres) is pumped into the active region and reflects a first portion of the sunlight to reduce solar thermal loading on the interior. In one embodiment, the active region of the fluid transfer element transitions to a state that reflects infrared light and substantially transmits visible light to allow the window to be used for visible light transmission and reduced solar loading through the window in the summertime. In another embodiment, the active region of the light transmitting film is configured to transition to a light scattering state to reduce glare in the interior of an office building. For example, in one embodiment a remote sensor detects direct solar radiation, the intensity is compared against a programmed or predetermined light level, information is sent (via a wireless or wired connection) from the sensor to the receiver and a pump and or valve is configured to flow a light scattering fluid into the active region of the fluid transfer film to reduce glare from the bright sunlight.

Optically Changing Shingles

In one embodiment, a fluid transfer system comprises one or more shingles comprising one or more fluid transfer components that change from a first optical state to a second optical state in the active regions. In another embodiment, a fluid transfer system comprises one or more shingles comprising one or more fluid transfer components that transfer heat away from the shingles by fluid flow through channels in the active regions of the fluid transfer components. As discussed above in the context a fluid transfer component for solar applications, the shingle may transition via fluid flow from a light absorbing state to a light reflecting state and the shingle may have a light absorbing material or layer or a light reflecting material or layer beneath the channels in the active region (on the side of the channels opposite the light receiving side). Similarly, the fluid transfer component with the shingles may function as an element in a CPV, CSP, or photovoltaic cell cooling system. In one embodiment, the shingle physically couple or interlock and fluidly couple with each other in one, two, three, or four directions. In one embodiment, the shingle comprises at least one fluid channel geometry converter input or output coupler positioned behind an along the bottom edge of the shingle when installed on a slanted roof. In this example, the fluid transfer component may comprise the fluid input and output couplers (such as fluid channel geometry converters) along the same lower edge of the shingle.

Colored Optical Effects of Continuous Flowing Liquid

In one embodiment, the optical properties of the fluid transfer component change to provide a decorative visual transition across the active region over time. In another embodiment, the active region of the fluid transfer component transitions from a first optical state to a second optical state or first level or degree of a first optical state to a second level or degree of a first optical state or second optical state and the active region of the fluid transfer component is positioned adjacent a roof or wall of a building roof, the inner wall of a building, the outer wall or surface of a building, ceiling of a building, or the floor of a building, or within upon, or behind a structure, building, vehicle or other device or component disclosed herein. In one embodiment, for example, the active region transitions from a non-scattering red filter to a non-scattering blue filter.

Camouflage Film or Material

In one embodiment, the fluid transfer system provides camouflage for a person or object. In one embodiment, the fluid transfer system comprises a sensor operatively configured to detect the relative intensity in one or more wavelength bands of an object or area and change the color of the light reflecting from the light transmitting region to substantially match the apparent color of the object or area. In one embodiment, the light transmitting region is positioned above a white light reflecting region such that when the color of the fluid in the active region changes, the reflected color of the active region of the fluid transfer component changes. For example, in one embodiment, a camouflage uniform comprises a color calibrated camera that detects the color of the ambient surroundings and changes the color in one or more spatial regions of the uniform to match the corresponding environment. In another embodiment, the fluid transfer system provides camouflage capabilities to a sheet, fabric, blanked, cover, tent, building, netting, article of clothing, accessory, land craft, air craft, water craft, panel, thermoformable panel, structure or component of a building, electronic device housing (such as a phone, computer, laptop, telecommunication equipment), and radar. In one embodiment, the camouflage fluid transfer system comprises a fluid transfer component physically and operatively coupled within or adjacent a panel that can be attached to a land craft, water craft, or air craft.

Color or Optical Property Changing Clothing or Article

In one embodiment, the fluid transfer system comprises a fluid transfer component in the form or operatively coupled to an article of clothing or a fabric wherein the active region of the fluid transfer component changes its color or optical state.

In one embodiment, for example, a shirt may change from white to black. In another embodiment, a chemiluminescent fluid is pumped into the active region to provide a light emitting fabric to be used on an article of safety clothing. In another embodiment, a transfer fluid system incorporated into a clothing, article, device or structure comprises an ultraviolet or blue light emitting diode or light source and the transfer fluid comprises a plurality of phosphorescent particles wherein the fluid passes by the light source, the phosphors enter an excited state, and light is emitting from the active region when the particles flow through the active region. In one embodiment, an article of clothing, a light fixture, display, or sign comprises a fluid transfer system wherein light is emitted from channels in the active region of a fluid transfer component comprising a fluid with phosphors excited from a light source in the system remote from the active region.

Privacy Film

In one embodiment, the fluid transfer system provides privacy by switching from a first optical state to a second optical state or a first degree or level of a first optical state to second degree or level of the first optical state or a second optical state. For example, in one embodiment, a fluid transfer film comprising surface features on the inner surface of the fluid channels is laminated to glass to switch from a transparent glass panel to a diffusely scattering glass panel by pumping a non-scattering transparent fluid through the active region of the fluid transfer film to effectively index-match out the surface relief features.

Optical Switch

In one embodiment, the fluid transfer system functions as an optical switch by switching from a first optical state to a second optical state or a first degree or level of a first optical state to second degree or level of the first optical state or a second optical state. Examples of optical switch configurations incorporating fluids include those discussed in U.S. Pat. No. 7,027,683, the entire contents are incorporated by reference herein.

Color Changing Sign or Display

In one embodiment, the fluid transfer system comprises an active region of a fluid transfer component that functions as a color changing sign or display. In one embodiment the active region of the sign varies spatially and is in the form of letters, characters, or indicia. In another embodiment, the active region of the display varies spatially and is in the form of pixels or sub-pixels. In one embodiment, the sign or display comprises segmented characters or pixels wherein each segment or pixel can be individually controlled by one or more flow sources or one flow source and multiple valves or switches to direct fluid flow into each active region corresponding to a segment or pixel. In a further embodiment, a display comprises a fluid transfer component disposed to receive light from a light emitting panel (such as a light emitting diode based backlight or an organic light emitting diode panel) and change the optical path, wavelength transmission, polarization state, or intensity of the light transmitted through the active region or a sub-region of the active region (such as a pixel or segment).

Color Changing Light Source

In one embodiment, a light source comprises a fluid transfer component disposed to receive light from a point light source (such as an LED), an array of light sources, or an extended light source or light emitting panel (such as a light emitting diode based backlight or an organic light emitting diode panel) and change the optical path, wavelength transmission, polarization state, or intensity of the light transmitted through the active region or a sub-region of the active region to provide a light source with varying light output properties.

Smart Window

In one embodiment, a smart window comprises a fluid transfer system comprising a fluid transfer component wherein the active region of the fluid transfer component transitions from a first optical state to a second optical state. In this embodiment, the smart window can change to or from one or more optical states such as light absorbing, light reflecting, infrared light reflecting, infrared light absorbing, light transmitting, forward light scattering, reflectively light scattering, or a combination thereof. In another embodiment, the optical state of the smart window changes based on user input, automatically based on sensors, on a programmed schedule, or in response to the environment. In one embodiment, the smart window comprises the active region of the fluid transfer component on the interior surface of the window, on the exterior surface of the window or between two panes of the window (such as in a double-glazed window or a window with an interior film laminate (such as safety glass or a glass laminate comprising a film and polyvinyl butyral).

Variable Focus Device

In one embodiment, the fluid transfer component comprises one or more flexible membrane regions in contact with the fluid in the active region that expand when the pressure on the fluid is increased and the membrane and the fluid are transparent to a first wavelength band of radiation such that the flexed membrane has focusing lens properties (such as the membrane forming a convex lens) and focuses incident light in a focal region within or proximate the active region of the fluid transfer element. In one embodiment, the channels adjacent circular (or rectangular openings) could use a flexible variable focusing film or membrane to positioned above imager or detector or in front of microdisplay, thus increasing the pressure could focus light onto imager or cell. In this embodiment, a very small array of variable focus lenses may be created where the focus of each lens changes simultaneously since they are in fluid communication with each other.

In one embodiment, an optical switch device, a varying focal device, or a device with varying optical properties includes one or more fluid transfer components, such as devices, configurations, and their methods of manufacture disclosed in U.S. Pat. Nos. 7,027,683, 6,721,104, 7,755,840 and U.S. patent application publication no. 20040169932, the entire contents of each are incorporated by reference herein.

Variable Light Redirecting Element

In one embodiment, the cross-sectional shape of one or more channels is asymmetric about a central axis parallel to the thickness direction (such as the thickness of the film in a film-based fluid transfer component). In another embodiment, the asymmetric channel surface features asymmetrically directs a portion of incident light from a first incident angle to a second angle different from the first angle when one or more channels comprises a first fluid with a first refractive index; and the asymmetric channel surface features asymmetrically direct a portion of incident light from a first incident angle to a third angle different from the first angle and second angle when one or more channels comprises a second fluid with a second refractive index different from the first refractive index. In one embodiment, the light redirection is due to refraction, total internal reflection, or a combination of refraction and total internal reflection. For example, in one embodiment, the cross sectional shape of a plurality of channels in the active region is scalene triangle (or two adjacent sides of a scalene triangle) and all of the interior angles are less than 90 degrees. In this embodiment, when the fluid in the channel is changed, the angle of refraction of incident light can change. Alternatively, if the angle of incident light changes, then angle of light output from the active region can remain constant over a range of incident light angles. In one embodiment, the angle of incidence, the angle of refraction, reflection, or a combination thereof for a variable light redirecting element in a first optical state with a first transfer fluid of a first refractive index can be the first angle or the first angular range as disclosed above in the context of a light reflecting state; and the angle of incidence, the angle of refraction, reflection, or a combination thereof for a variable light redirecting element in a second optical state with a second transfer fluid of a second refractive may be a second angle or second angular range chosen from the first angles or first angular ranges disclosed in the light reflecting state section above where the second angle or second angular range due to the refractive index of the second fluid is different from the first angle or first angular range due to refractive index of the first fluid.

Wavelength Band Reflective or Absorptive Filter

In one embodiment, the fluid transfer component is a wavelength bandwidth reflective or absorptive filter. The filter may be positioned to receive light from one more light sources and selectively transmit or reflect a portion of the incident light in the reflecting or transmitting wavelength band. In one embodiment, the reflecting wavelength or reflecting wavelength band the same as the first wavelength or the first wavelength band disclosed above in the context of the light reflecting state. Similarly, the light absorbing wavelength or light absorbing wavelength band may be the same as the first wavelength or the first wavelength band disclosed above in the context of the light reflecting state. For example, in one embodiment, a fluid transfer film changes from a first light transmitting state that transmits all visible wavelengths of light substantially uniformly due to a clear, transparent fluid in the channels in the first state and in the second state, a fluid absorbing more light in the blue wavelengths that then red wavelengths flows into the channels and the fluid transfer component filters out (absorbs) more blue light than red light. The filter in this embodiment, for example, could be placed in front of a light source such as a lamp or bulb and the fluid change could effectively change the light from having a cool white color temperature to light having a warm white color temperature in a discrete change or by gradually mixing the fluids flowing through the channel in a gradual change.

FIG. 1 is a top view of an embodiment of a fluid transfer system 100 comprising a flow source 101 operatively coupled by a fluid connector 102 to a fluid transfer component 103 comprising a fluid input coupler 104 and a fluid output coupler 105. The fluid transfer component 103 receives fluid 107 flowing 108 from the flow source 101 through the input coupler 104 and the fluid 107 flows through fluid channels (not shown) in the an active region 106 of the fluid transfer component 103 and the fluid 107 flows into the fluid output coupler 105 that couples the fluid 107 into the fluid connector 102 where the fluid 107 flows 108 back to the flow source 101.

Figure 2:
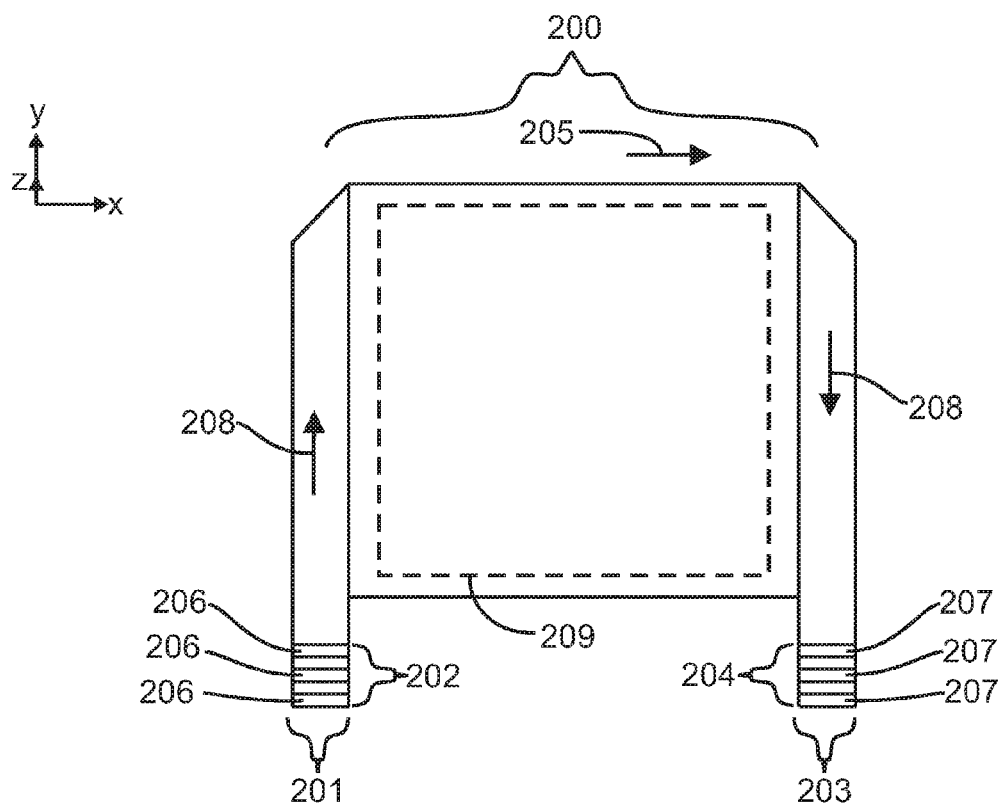
FIG. 2 is a perspective view of an embodiment of a fluid transfer film comprising a fluid channel geometry converter input coupler with an input end region defined by the ends of the folded and stacked input segments of the fluid transfer film.

FIG. 2 is a perspective view of an embodiment of a fluid transfer film 200 comprising a fluid channel geometry converter input coupler 201 with an input end region 202 defined by the ends of the folded and stacked input segments 206 of the fluid transfer film 200. The fluid transfer film 200 further comprises a fluid channel geometry converter output coupler 203 with an output end region 204 defined by the ends of the folded and stacked output segments 207 extended from the fluid transfer film 200. In this embodiment, the fluid transfer film 200 receives a fluid 208 in channels (not shown) at the input end region 202, the fluid 208 flows through the channels in the input segments 206, flows in a flow direction 205 through the channels in the active region 209, flows through the channels in the stacked output segments 207 and out of the channels at the fluid output end region 204.

FIG. 3 is a perspective view of a portion of an embodiment of a fluid transfer component 300 comprising a fluid channel geometry converter input coupler 303 formed by folding and stacking strips 302 extended from the component 300. In this embodiment, the fluid transfer component 300 is a film comprising channels 301 defined by a surface relief profile 304 and a cover layer 306 positioned above the surface relief profile 304. In this embodiment, the input end region 305 is defined by the ends of the strips 303, and fluid (not shown) coupled into the fluid transfer component 300 flows through the channels 301 in the strips 302 to the active region 307 of the fluid transfer component 300.

FIG. 4 is a side view of an input end region of an embodiment of a fluid channel geometry converter input coupler 400 comprising a stacked layer of ends of segments 408 extending from a film comprising a cover layer 401 adhered using an adhesive layer 402 to a surface relief profile 404. In this embodiment, the bottom of the adhesive layer 402 and the surface relief profile 404 define fluid channels 403. In this embodiment, a sealant 405 defines the blocked channels 407. The sealant 405 prevents fluid from entering channels that may be open due to the separation process used to separate the segments 408 before stacking them.

Figure 5:
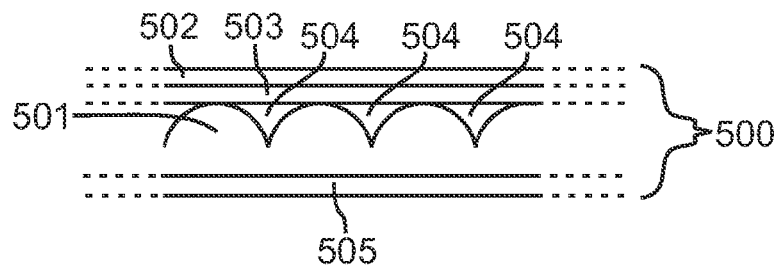
FIG. 5 is a cross-sectional side view of a portion of an embodiment of a fluid transfer film comprising a lenticular lens array film.

FIG. 5 is a cross-sectional side view of a portion of an embodiment of a fluid transfer film 500 comprising a lenticular lens array film 501 with a substrate 505 adhered to a cover layer 502 using an adhesive 503. In this embodiment, the channels 504 are defined by the lenticular lens array film 501 and the adhesive 503.

Figure 6:
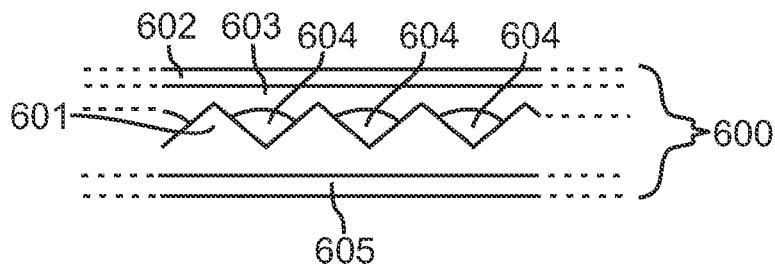
FIG. 6 is a cross-sectional side view of a portion of an embodiment of a fluid transfer film comprising a linear prismatic lens array film.

FIG. 6 is a cross-sectional side view of a portion of an embodiment of a fluid transfer film 600 comprising a linear prismatic lens array film 601 with a substrate 605 adhered to a cover layer 602 using an adhesive 603. In this embodiment, the channels 604 are defined by the prismatic lens array film 601 and the adhesive 603. In this embodiment, the lamination pressure used to adhere the cover layer 602 to the linear prismatic lens array film 601 caused the adhesive 603 to spread into the gap between the peaks of the linear prismatic lens array film 601.

Figure 7:
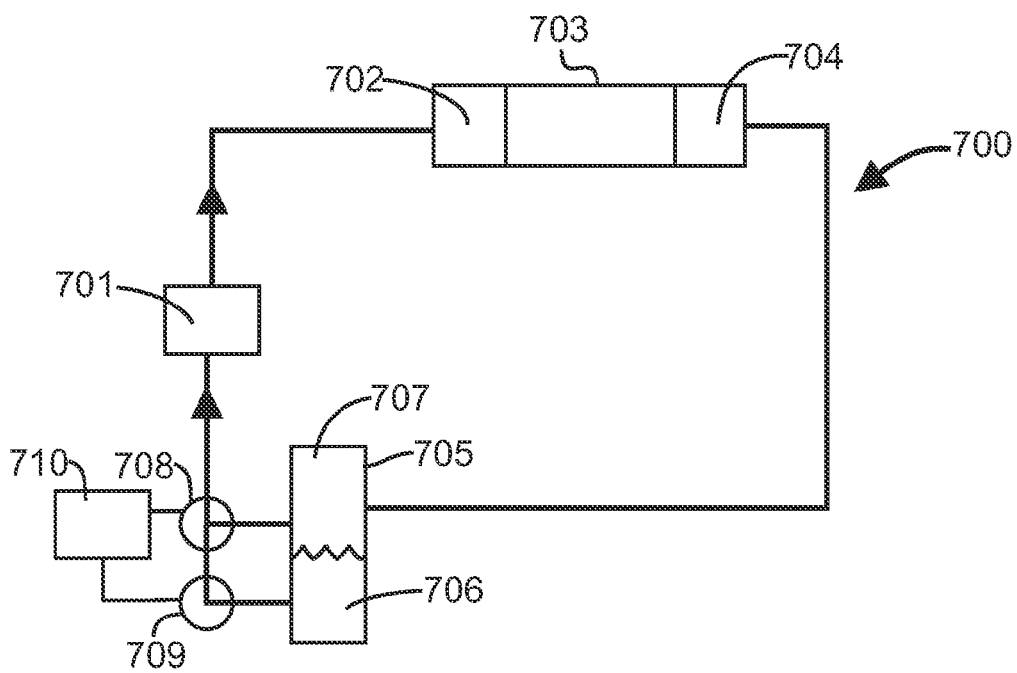
FIG. 7 is a schematic diagram of an embodiment of a fluid transfer system comprising a fluid transfer component, a flow source, and a controller.

FIG. 7 is a schematic diagram of an embodiment of a fluid transfer system 700 comprising a fluid transfer component 703, a flow source 701, a controller 710, a reservoir 705, and valves 708, 709. In this embodiment, the flow source 701 transfers a first fluid 706 or a second fluid 707 through the fluid input coupler 702 of the fluid transfer component 703, through the fluid channels (not shown) in the active region of the fluid transfer component 703, through the fluid output coupler 704, and out of the fluid transfer component 703. A controller 710 (such as a microprocessor) controls a first valve 708 and second valve 709 (such as in response to a temperature sensor or other sensor) to control the flow of the first fluid 706 and the second fluid 707 through the fluid transfer component 703. When the first valve 708 is open and the second valve 709 is closed, the flow source 701 (such as a pump) transfers the second fluid 707 (such as a low density fluid such as air) through the fluid transfer component 703 and back into the reservoir 705. When the first valve 708 is closed and the second valve 709 is open, the flow source 701 transfers the first fluid 706 (such as water or other liquid) through the fluid transfer component 703 and back into the reservoir 705. In this embodiment, since the fluids have different densities, they will separate by gravity. In this embodiment, the optical state of the fluid transfer component 703 may change when the fluid flowing through the channels changes from the first fluid 706 to the second fluid 707.

Figure 8:
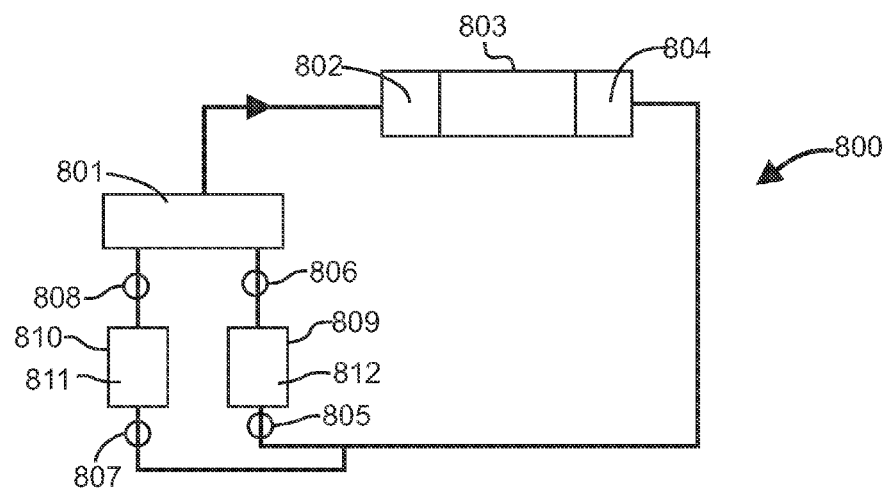
FIG. 8 is a schematic diagram of an embodiment of a fluid transfer system comprising a fluid transfer component, a flow source, and two reservoirs.

FIG. 8 is a schematic diagram of an embodiment of a fluid transfer system 800 comprising a fluid transfer component 803, a flow source 801, a first reservoir 810 comprising a first fluid 811, and a second reservoir 809 comprising a second fluid 812. In this embodiment, the flow source 801 transfers a first fluid 811 or a second fluid 812 and optionally a third fluid (not shown) such as air through the input coupler 802 of the fluid transfer component 803, through the fluid channels (not shown) in the active region of the fluid transfer component 803, through the fluid output coupler 804, and out of the fluid transfer component 803. When the second return valve 805 and the second flow valve 806 are closed, and the first return valve 807 and the first flow valve 808 are open, the flow source 801 (such as a pump) transfers the first fluid 811 through the fluid transfer component 803 and back into the first reservoir 811. When the second return valve 805 and the second flow valve 806 are open, and the first return valve 807 and the first flow valve 808 are closed, the flow source 801 transfers the second fluid 812 through the fluid transfer component 803 and back into the first reservoir 811. In this embodiment, one or more of the valves 805, 806, 807, and 808 may be controlled by a controller and a third fluid such as air may be used to purge the lines before or opening or closing one or more valves or before transitioning between the first fluid 811 and the second fluid 812. In this embodiment, the optical state of the fluid transfer component 803 may change when the fluid flowing through the channels changes from the first fluid 811 to the second fluid 812.

Figures 9, 10:
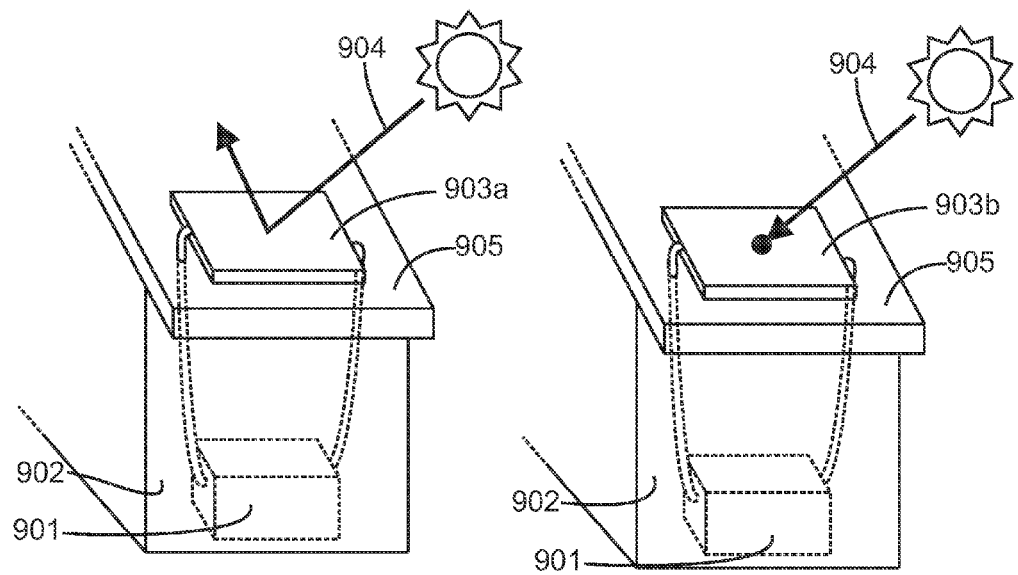
FIGS. 9 and 10 are perspective views of portions of an embodiment of a fluid transfer system comprising a fluid transfer component and in two different optical states.

FIGS. 9 and 10 are perspective views of portions of an embodiment of a fluid transfer system comprising a fluid transfer component 903a and 903b in two different optical states. In this embodiment, the fluid transfer system comprises a fluid transfer component 903a and 903b operatively connected to a flow source 901 to supply and receive a fluid from a fluid transfer component 903a and 903b mounted on the roof 905 of a house 902. On hot days, the fluid transfer component 903a is in a light reflecting optical state such that it reflects solar radiation 904 as shown in FIG. 9 to help keep the house cool. On cold days, the fluid transfer component 903b is in a light absorbing state such that it absorbs solar radiation 904 as shown in FIG. 10. In this light absorbing state, the fluid transfer component 903b may comprise a light absorbing fluid that is transferred by the flow source 901 to a heat exchanger where it may be used to warm air for a furnace. In the light reflecting state, for example, the fluid transfer component 903a may comprise a light reflecting film behind the fluid channels in the active area and air, a gas, a transparent liquid, a translucent liquid, or a light reflecting liquid may be transferred to the channels in the active region by the flow source 901.

Figure 11:
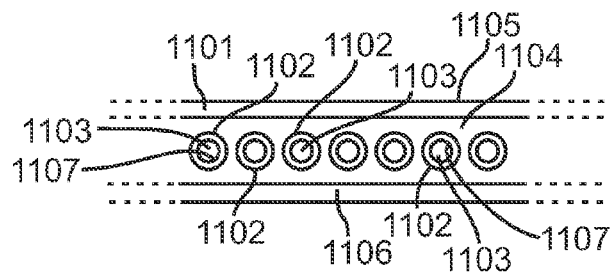
FIG. 11 is a cross-sectional side view of a portion of an embodiment of a fluid transfer component comprising an arrangement of hollow fibers.

FIG. 11 is a cross-sectional side view of a portion of an embodiment of a fluid transfer component 1105 comprising an arrangement of hollow fibers 1102 positioned between and adhered to a top substrate 1101 and a bottom substrate 1106 using an adhesive 1104. In this embodiment, the inner surface 1107 of the hollow fibers 1102 define the channels through which the transfer fluid 1103 flows in the fluid transfer component 1105.

Figure 12:
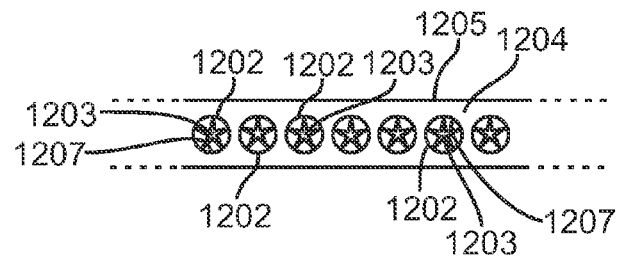
FIG. 12 is a cross-sectional side view of a portion of an embodiment of a fluid transfer component comprising an arrangement of solid, shaped fibers.

FIG. 12 is a cross-sectional side view of a portion of an embodiment of a fluid transfer component 1205 comprising an arrangement of solid, shaped fibers 1203 (star shaped in this example) embedded in a polymer 1204. In this embodiment, during the manufacturing of the fluid transfer component 1205, the structure of the of the solid, shaped fibers 1203 and/or the surface wettability of the polymer 1204 with the solid, shaped fibers 1203 prevents the polymer 1204 from wetting out with the solid, shaped fibers 1203, creating an air pocket that defines a surface 1207 of the polymer 1204 along the length of the solid, shaped fibers 1202 that defines the channels 1202 in the fluid transfer component 1205. In this embodiment, a fluid may flow through the channels 1202 in the fluid transfer component 1205.

Figure 13:
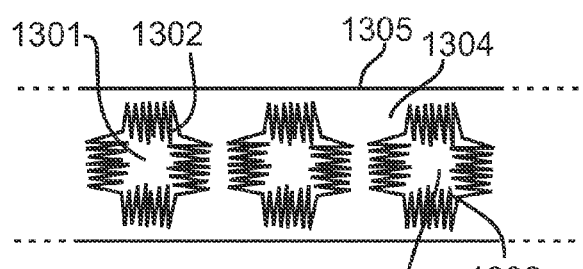
FIG. 13 is a cross-sectional side view of a portion of an embodiment of a fluid transfer component comprising a plurality of high aspect ratio surface relief features.

FIG. 13 is a cross-sectional side view of a portion of an embodiment of a fluid transfer component 1305 wherein a plurality of high aspect ratio surface relief features 1302 of a material 1304 surround and define a plurality of fluid channels 1301. In this embodiment, for example, the size and shape of the surface relief features 1302 along with wettability of the material 1304 with the fluid can enable a very low contact surface for the fluid and reduce the flow resistance through the fluid channels 1301.

Figure 14:
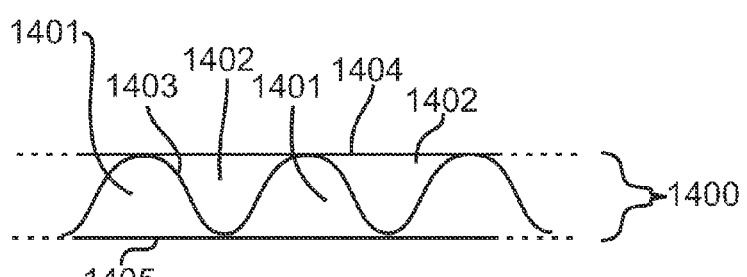
FIG. 14 is a cross-sectional side view of a portion of an embodiment of a fluid transfer film that is fluted.

FIG. 14 is a cross-sectional side view of a portion of an embodiment of a fluid transfer film 1400 that is fluted comprising first fluid channels 1401 and second fluid channels 1402 defined by a corrugated film 1403 and a top film 1404 and a bottom film 1405. In this embodiment, the volume of region between the top film 1404 and bottom film 1405 can be maximized for large cross-sectional area fluid channels 1401 and 1402.

Figure 15:
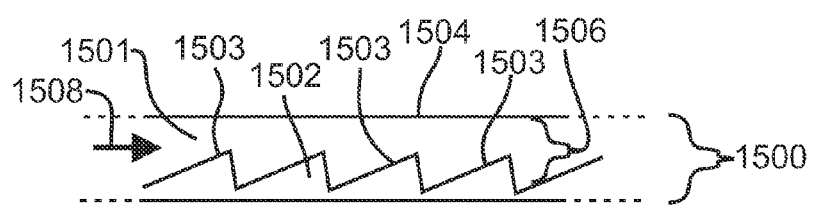
FIG. 15 is a cross-sectional side view with the cross section parallel to the flow direction of a portion of an embodiment of a channel in a fluid transfer component.

FIG. 15 is a cross-sectional side view with the cross section parallel to the flow direction of a portion of an embodiment of a channel 1506 in a fluid transfer component 1500. In this embodiment, the channel 1506 is defined by surface relief features 1503 asymmetrically shaped in the flow direction 1508 and a top surface 1504. The surface relief features 1503 are formed in the surface of a first material 1502 and have a cross sectional shape of two adjacent sides of a scalene triangle. In this embodiment, the asymmetrically shaped surface features 1503 can propel the fluid by the Leidenforst effect.

Figure 16:
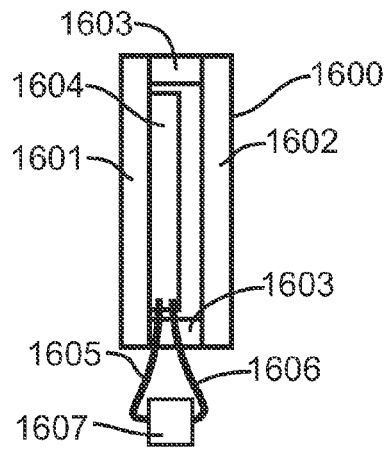
FIG. 16 is a cross-sectional side view of an embodiment of window comprising a fluid transfer component.

FIG. 16 is a cross-sectional side view of an embodiment of window 1600 comprising a fluid transfer component 1604 positioned between a first pane of glass 1601 and a second pane of glass 1602 sealed by a sealant 1603. In this embodiment, a flow source 1607 transfers a liquid through a supply conveyor 1605 (such as a pipe) to the fluid transfer element 1604 and returns the fluid through a return conveyor 1606. In this embodiment, the fluid transfer component 1604 may change from a first optical state to a second optical state when the flow source 1607 directs a second fluid to the channels (not shown) in the fluid transfer component to replace the fluid residing in the channels.

Figure 17:
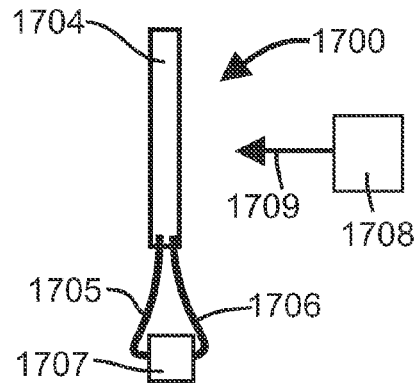
FIG. 17 is a cross-sectional side view of an embodiment of an optical filter comprising a fluid transfer component.

FIG. 17 is a cross-sectional side view of an embodiment of an optical filter 1700 to comprising a fluid transfer component 1704. In this embodiment, a flow source 1707 transfers a liquid through a supply conveyor 1705 (such as a pipe) to the fluid transfer element 1704 and returns the fluid through a return conveyor 1706. In this embodiment, the fluid transfer component 1704 may change from a first optical state to a second optical state when the flow source 1707 directs a second fluid to the channels (not shown) in the fluid transfer component to replace the fluid residing in the channels. Light 1709 from a light source 1708 may be dynamically filtered by the fluid transfer element 1704 when it changes from a first optical state to a second optical state.

Figure 18A:
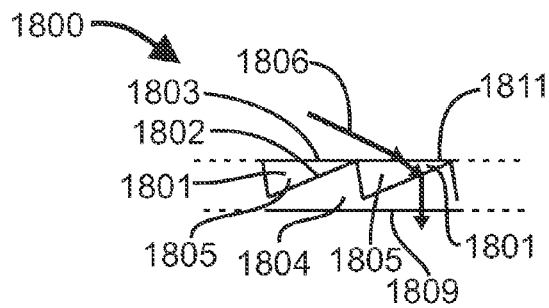
FIGS. 18a and 18b are cross sectional side views of portions of an embodiment of a variable light redirecting element.
Figure 18B:
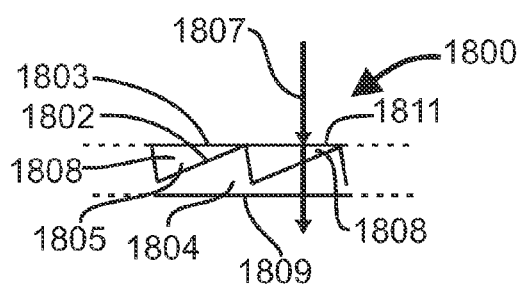

FIGS. 18*a* and 18*b* are cross sectional side views of portions of an embodiment of a variable light redirecting element 1800 comprising a fluid transfer component 1811 in two optical states. The fluid transfer component 1811 comprises channels 1805 defined between asymmetric surface relief features 1802 of a first material 1804 of a first refractive index and a second surface 1803. In FIG. 18*a*, the channel 1805 comprises a first liquid 1801 with a second refractive index larger than the first refractive index and the fluid transfer component is in a first optical state. As shown in FIG. 18*a*, the angled interface between the first liquid 1801 and the first material 1804 refracts incident light 1806 from a large angle to a direction normal to the bottom surface 1809 of the fluid transfer component 1811 in a first optical state. As shown in FIG. 18*b*, when a second fluid 1808 with a third refractive index the same as the first refractive index fills the channels 1805, the angled interface between the second liquid 1808 and the first material 1804 does not refract incident light 1807 incident on the fluid transfer component 1811 from a direction normal to the bottom surface 1809 of the fluid transfer component 1811 and the fluid transfer component is in a second optical state. In this embodiment, the light 1807 exits the fluid transfer component 1811 at the same angle as in FIG. 18*a* when the light 1806 is incident at a large angle. Thus, by changing the refractive index of the fluid (such as by changing the fluid or the fluid mixture) light incident from a range of angles can be redirected to the same angle. This can be useful, for example, when the variable light redirecting element is positioned above a photovoltaic cell or a concentrated photovoltaic system (which may comprise a Fresnel or TIR optic) where the variable light redirecting element can track the sun across the sky. Similarly, light from a constant direction can be changed to a range of angles by varying the refractive index of the fluid in the channels.

Figure 19:
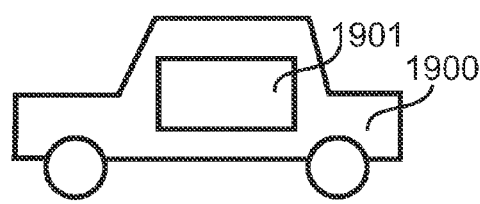
FIG. 19 is a side view of an embodiment of a vehicle comprising a fluid transfer component.

FIG. 19 is a side view of an embodiment of a vehicle 1900 comprising a fluid transfer component 1901. In this embodiment, the fluid transfer component may change from a first optical state to a second optical state to function as dynamic camouflage.

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. This application is intended to cover any adaptations or variations of the specific embodiments discussed herein. Therefore, it is intended that this disclosure be limited only by the claims and the equivalents thereof Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

What is claimed is:

1. A polymeric film comprising:
    one or more polymeric materials in one or more layers;
    a plurality of fluid channels defined by interior surfaces within the polymeric film, physically separated, and in a first geometric arrangement in an active region of the film; and
    a fluid input end of the polymeric film comprising a second geometric arrangement of the plurality of fluid channels different from the first geometric arrangement,
        wherein the first geometric arrangement of the fluid channels is converted to the second geometric arrangement of the fluid channels by an integrally formed fluid channel geometry converter;

the first geometric arrangement comprises an array of the plurality of fluid channels with a dimension of (M)×(N) where (M) is the number of rows of fluid channels in a thickness direction of the polymeric film, (N) is the number of columns of fluid channels in a direction orthogonal to the thickness direction and orthogonal to a direction of fluid flow in the fluid channels, and the second geometric arrangement of fluid channels comprises an array of the plurality of fluid channels with a dimension of (C)·(M)×(N)/(C) where (M), (C), and (N) are integers and (C) is greater than 1; and an inner shape of a cross-section of each of the plurality of fluid channels in a cross-sectional plane orthogonal to the direction of fluid flow within each of the fluid channels is constant from the fluid input end to and throughout the active region.

2. The polymeric film of claim 1 wherein each of the plurality of fluid channels has an inner cross-section of a closed shape through the active region in a plane orthogonal to the direction of fluid flow within the fluid channel.

3. A device comprising the polymeric film of claim 1 and further comprising a first fluid within the plurality of fluid channels and a flow source operatively coupled to the fluid channels to transfer the first fluid into the fluid channels or transfer the first fluid from the fluid channels.

4. The device of claim 3 wherein the flow source transfers the first fluid through the fluid channels in the active region and the first fluid transfers heat to or from the active region.

5. The device of claim 3 wherein the flow source transfers the first fluid out of the fluid channels in the active region and a second fluid into the fluid channels in the active region, and causes a first property and/or first level of light reflectivity, light scattering, light absorption, light transmission, or light emittance of the active region to transition to a second property or second level of light reflectivity, light scattering, light absorption, light transmission, or light emittance different from the first property and/or first level.

6. The polymeric film of claim 1 wherein the integrally formed fluid channel geometry converter comprises extensions from the polymeric film comprising the plurality of fluid channels.

7. A polymeric film comprising:
one or more polymeric materials in one or more layers;
a plurality of fluid channels defined by interior surfaces within the polymeric film, physically separated, and in a first geometric arrangement in an active region of the film; and
a fluid input end of the polymeric film comprising a second geometric arrangement of the plurality of fluid channels different from the first geometric arrangement,
wherein the first geometric arrangement of the fluid channels is converted to the second geometric arrangement of the fluid channels by an integrally formed fluid channel geometry converter;
the first geometric arrangement comprises an array of the plurality of fluid channels with a dimension of (M)×(N) where (M) is the number of rows of fluid channels in a thickness direction of the polymeric film, (N) is the number of columns of fluid channels in a direction orthogonal to the thickness direction and orthogonal to a direction of fluid flow in the fluid channels, and the second geometric arrangement of fluid channels comprises an array of the plurality of fluid channels with a dimension of (C)·(M)×(N)/(C) where (M), (C), and (N) are integers and (C) is greater than 1; and the fluid channel geometry converter comprises segments of the polymeric film separated into strips along a side of the polymeric film, and the strips are folded and stacked at their ends to define the fluid input end.

8. A device comprising the polymeric film of claim 7 and further comprising a fluid conveyor wherein the stacked strips of the polymeric film are inserted into the fluid conveyor, the fluid conveyor operatively configured to receive fluid transferred by a flow source and couple the fluid into the plurality of fluid channels.

9. The polymeric film of claim 7 further comprising a fluid output end of the film comprising a third geometric arrangement of the plurality of fluid channels different from the first geometric arrangement.

10. A polymeric film comprising:
one or more layers;
an active region of the polymeric film comprising a plurality of fluid channels defined by interior surfaces within the polymeric film, each of the plurality of fluid channels is separated spatially in a first geometric arrangement of a linear array in a first direction with an array dimension of 1×(N) in the active region of the polymeric film where the array dimension has 1 row of fluid channels in a thickness direction of the polymeric film and (N) fluid channels in the first direction orthogonal to the thickness direction and orthogonal to a direction of fluid flow through the fluid channels with (N) an integer greater than 1; and
an input end of the polymeric film outside of the active region of the polymeric film, the input end of the polymeric film comprises a second geometric arrangement of the plurality of fluid channels with more than one row of fluid channels in the thickness direction of the polymeric film,
wherein an inner shape of a cross-section of each of the plurality of fluid channels in a cross-sectional plane orthogonal to the direction of fluid flow within each of the fluid channels is constant from the fluid input end to and throughout the active region.

11. A polymeric film comprising:
one or more layers;
an active region of the polymeric film comprising a plurality of fluid channels defined by interior surfaces within the polymeric film, each of the plurality of fluid channels is separated spatially in a first geometric arrangement of a linear array in a first direction with an array dimension of 1×(N) in the active region of the polymeric film where the array dimension has 1 row of fluid channels in a thickness direction of the polymeric film and (N) fluid channels in the first direction orthogonal to the thickness direction and orthogonal to a direction of fluid flow through the fluid channels with (N) an integer greater than 1;
an input end of the polymeric film outside of the active region of the polymeric film, the input end of the polymeric film comprises a second geometric arrangement of the plurality of fluid channels with more than one row of fluid channels in the thickness direction of the polymeric film; and
a plurality of segments of the polymeric film extending along a side of the polymeric film into a segmented region of the polymeric film, each segment of the plurality of segments:

is physically separated from remaining segments of the plurality of segments in the first direction within the segmented region;
comprises a grouping of the plurality of fluid channels; and
comprises a segment end opposite the active region of the polymeric film,
wherein each segment of the plurality of segments is folded and the segment ends of each of the plurality of segments are stacked to define the input end.

12. The polymeric film of claim 1 further comprising a fluid output end comprising a third geometric arrangement of the plurality fluid channels different from the first geometric arrangement.

13. The polymeric film of claim 10 wherein the second arrangement is an array of fluid channels with a dimension of (C) rows of fluid channels in the thickness direction of the polymeric film by (N)/(C) fluid channels in the first direction where (C) is an integer greater than 1.

14. A method of forming a fluid input coupler for a fluid transfer system, the method comprising:
forming a film comprising one or more layers of one or more polymeric materials with a plurality of fluid channels defined by interior surfaces within the film, separated, and arranged in a first geometric arrangement in an active region of the film, the first geometric arrangement comprises an array of fluid channels with a dimension of (M)×(N) where (M) is the number of rows of fluid channels in a thickness direction of the film, and (N) is the number of fluid channels in a direction orthogonal to the thickness direction and orthogonal to a direction of fluid flow in the fluid channels;
separating segments of the film along a side of the film to form segments extending along the side of the film; and
folding and stacking the segments such that ends of the segments define a fluid input end comprising the fluid channels arranged in a second geometric arrangement different from the first geometric arrangement, the second geometric arrangement of fluid channels comprises an array of the fluid channels with a dimension of (C)·(M)×(N)/(C), where (M), (C), and (N) are integers and (C) is greater than 1.

15. The method of claim 14 wherein forming the film comprises microreplicating a surface relief structure on the one or more layers forms one or more of the interior surfaces defining the plurality of fluid channels.

16. The method of claim 14 wherein forming the film comprises extruding the one or more polymeric materials or stretching a preform of the one or more polymeric materials comprising the fluid channels.

17. The method of claim 14 wherein forming the film comprises joining hollow objects together or joining hollow objects to a layer of material.

18. The polymeric film of claim 11 wherein one or more of the interior surfaces are continuous from the input end to the active region.

19. The polymeric film of claim 11 wherein an inner shape of a cross-section of each of the plurality of fluid channels in a cross-sectional plane orthogonal to the direction of fluid flow within each of the fluid channels is constant from the fluid input end to the active region.

* * * * *